US010209637B2

United States Patent
Nishida et al.

(10) Patent No.: US 10,209,637 B2
(45) Date of Patent: Feb. 19, 2019

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Tsutomu Nishida, Mishima (JP); Akira Sakakibara, Susono (JP); Daisuke Miura, Tokyo (JP); Yota Ito, Mishima (JP); Shoma Hinata, Mishima (JP); Tatsuya Yamaai, Yokohama (JP); Nobuo Kosaka, Gotemba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/663,421

(22) Filed: Jul. 28, 2017

(65) Prior Publication Data
US 2018/0031985 A1 Feb. 1, 2018

(30) Foreign Application Priority Data
Aug. 1, 2016 (JP) .................. 2016-151194

(51) Int. Cl.
*G03G 5/05* (2006.01)
*G03G 15/00* (2006.01)

(52) U.S. Cl.
CPC ......... *G03G 5/0564* (2013.01); *G03G 5/0582* (2013.01); *G03G 15/75* (2013.01)

(58) Field of Classification Search
CPC ................ G03G 5/0564; G03G 5/0582
See application file for complete search history.

(56) References Cited

U.S. PATENT DOCUMENTS

| 9,864,284 B2 * | 1/2018 | Kawahara | G03G 5/0564 |
| 2002/0025483 A1 * | 2/2002 | Kawamura | G03G 5/047 430/59.6 |
| 2016/0252829 A1 * | 9/2016 | Kawahara | G03G 5/047 430/56 |

FOREIGN PATENT DOCUMENTS

| EP | 1375461 A1 * | 1/2004 | C07C 37/06 |
| JP | 61137157 A * | 6/1986 | |
| JP | H04-149557 A | 5/1992 | |
| JP | H05-113680 A | 5/1993 | |
| JP | H06-011877 A | 1/1994 | |
| JP | 06317917 A * | 11/1994 | |
| JP | H06-317917 A | 11/1994 | |
| JP | H07-013363 A | 1/1995 | |
| JP | H07-271062 A | 10/1995 | |
| JP | 2005-338446 A | 12/2005 | |
| JP | 2008-146089 A | 6/2008 | |
| JP | 2011-026574 A | 2/2011 | |
| JP | 2012-048174 A | 3/2012 | |
| JP | 2014-235251 A | 12/2014 | |
| JP | 2014-235273 A | 12/2014 | |
| JP | 2016045479 A * | 4/2016 | |

* cited by examiner

*Primary Examiner* — Christopher D Rodee
(74) *Attorney, Agent, or Firm* — Canon U.S.A. Inc., IP Division

(57) ABSTRACT

An electrophotographic photosensitive member includes a support, a charge generating layer containing a charge generation material, and a charge transporting layer containing a charge transport material in this order, the charge transporting layer serving as a surface layer. The charge transporting layer contains a polycarbonate resin having a particular structural unit.

7 Claims, 5 Drawing Sheets

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present disclosure relates to an electrophotographic photosensitive member, and a process cartridge and an electrophotographic apparatus that include the electrophotographic photosensitive member.

Description of the Related Art

Electrophotographic photosensitive members that undergo repeated use need to have high durability. When such an electrophotographic photosensitive member includes a charge transporting layer as a surface layer, the charge transporting layer needs to have high durability. To improve the durability of the charge transporting layer, a structure of a resin used as a binder of the charge transporting layer, in particular, a structure of a polycarbonate resin has been studied (Japanese Patent Laid-Open Nos. 7-271062, 2012-048174, 2011-026574, 5-113680, 4-149557, 6-011877, 2005-338446, 6-317917, 7-013363, 2008-146089, 2014-235251, and 2014-235273).

SUMMARY OF THE INVENTION

In all embodiments of the present disclosure, an electrophotographic photosensitive member includes a support, a charge generating layer containing a charge generation material, and a charge transporting layer containing a charge transport material in this order, and the charge transporting layer serves as a surface layer.

In an electrophotographic photosensitive member according to a first embodiment, the charge transporting layer contains a polycarbonate resin (i) having a structural unit represented by formula (1-1), a structural unit represented by formula (1-2), and a structural unit represented by formula (1-3),

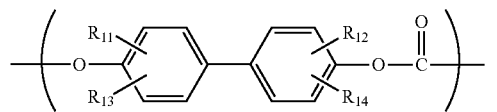
(1-1)

where in the formula (1-1), $R^{11}$ to $R^{14}$ each independently represent a hydrogen atom, an alkyl group, an aryl group, or an alkoxy group,

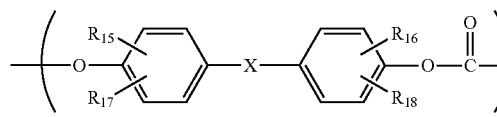
(1-2)

in the formula (1-2), $R^{15}$ to $R^{18}$ each independently represent a hydrogen atom, an alkyl group, an aryl group, or an alkoxy group, and X represents an oxygen atom, a sulfur atom, or a sulfonyl group, and

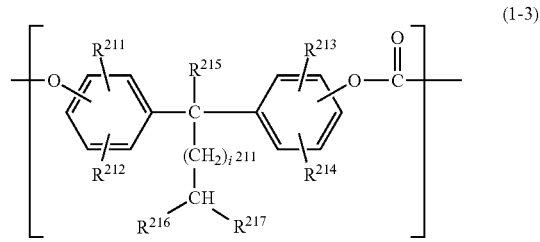
(1-3)

in the formula (1-3), $R^{211}$ to $R^{214}$ each independently represent a hydrogen atom, an alkyl group, an aryl group, or an alkoxy group; $R^{215}$ represents a hydrogen atom, an alkyl group, an aryl group, or an alkoxy group; $R^{216}$ and $R^{217}$ each independently represent an alkyl group having 1 to 9 carbon atoms; and $i^{211}$ represents an integer of 0 to 3.

In an electrophotographic photosensitive member according to a second embodiment, the charge transporting layer contains a polycarbonate resin (ii) having a structural unit represented by formula (2-1), a structural unit represented by formula (2-2), and a structural unit represented by formula (2-3),

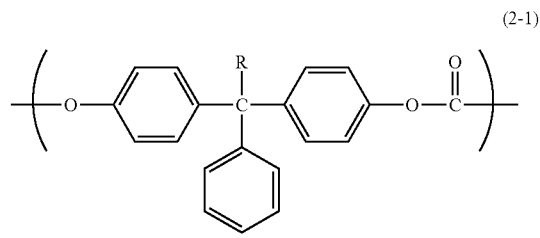
(2-1)

where in the formula (2-1), R represents a hydrogen atom, a methyl group, or a phenyl group,

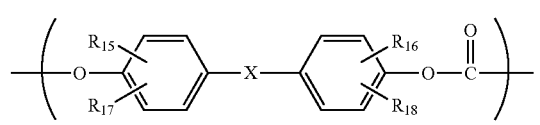
(2-2)

in the formula (2-2), $R^{15}$ to $R^{18}$ each independently represent a hydrogen atom, an alkyl group, an aryl group, or an alkoxy group, and X represents a single bond, an oxygen atom, a sulfur atom, or a sulfonyl group, and

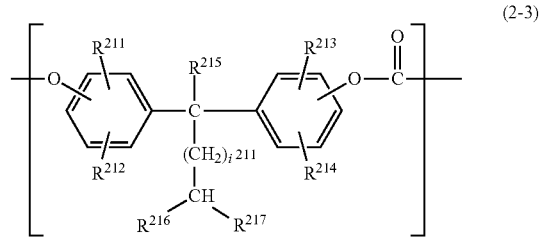
(2-3)

in the formula (2-3), $R^{211}$ to $R^{214}$ each independently represent a hydrogen atom, an alkyl group, an aryl group, or an alkoxy group; $R^{215}$ represents a hydrogen atom, an alkyl group, an aryl group, or an alkoxy group; $R^{215}$ and $R^{217}$ each independently represent an alkyl group having 1 to 5 carbon atoms; and $i^{211}$ represents an integer of 0 to 2.

In an electrophotographic photosensitive member according to a third embodiment, the charge transporting layer contains a polycarbonate resin (iii) having a structural unit represented by formula (3-1) and a structural unit represented by formula (3-2),

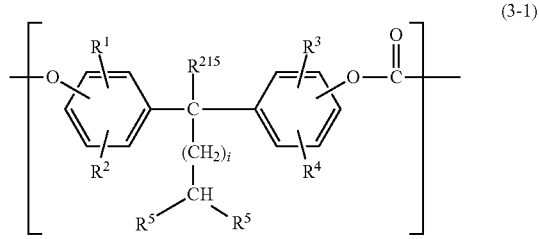
(3-1)

where in the formula (3-1), $R^1$ to $R^4$ each independently represent a hydrogen atom, an alkyl group, an aryl group, or an alkoxy group; $R^5$ represents a substituted or unsubstituted alkyl group having 1 to 9 carbon atoms; and i represents an integer of 0 to 3, and

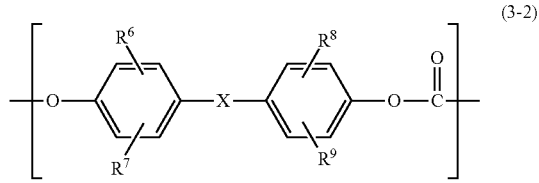
(3-2)

in the formula (3-2), $R^6$ to $R^9$ each independently represent a hydrogen atom, an alkyl group, an aryl group, or an alkoxy group, and X represents an oxygen atom or a sulfur atom.

In an electrophotographic photosensitive member according to a fourth embodiment, the charge transporting layer contains a polycarbonate resin (iv) having a structural unit represented by formula (4-1) and a structural unit represented by formula (4-2),

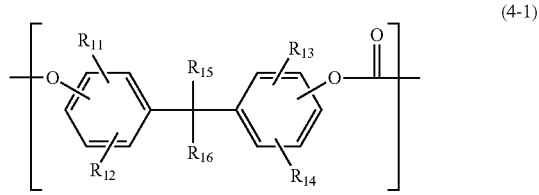
(4-1)

where in the formula (4-1), $R^{11}$ to $R^{15}$ each independently represent a hydrogen atom, a methyl group, an ethyl group, or a phenyl group, and $R^{16}$ represents a linear alkyl group having 6 to 15 carbon atoms, and

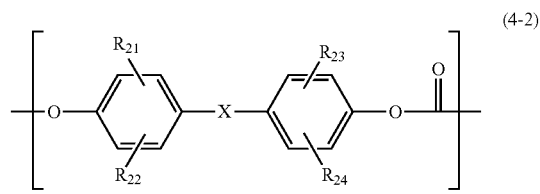
(4-2)

in the formula (4-2), $R^{21}$ to $R^{24}$ each independently represent a hydrogen atom, a methyl group, an ethyl group, or a phenyl group, X represents an oxygen atom, a sulfur atom, a single bond, or a sulfonyl group.

Further features of the present invention will become apparent from the following description of exemplary embodiments with reference to the attached drawings.

DESCRIPTION OF THE EMBODIMENTS

Figure 1:
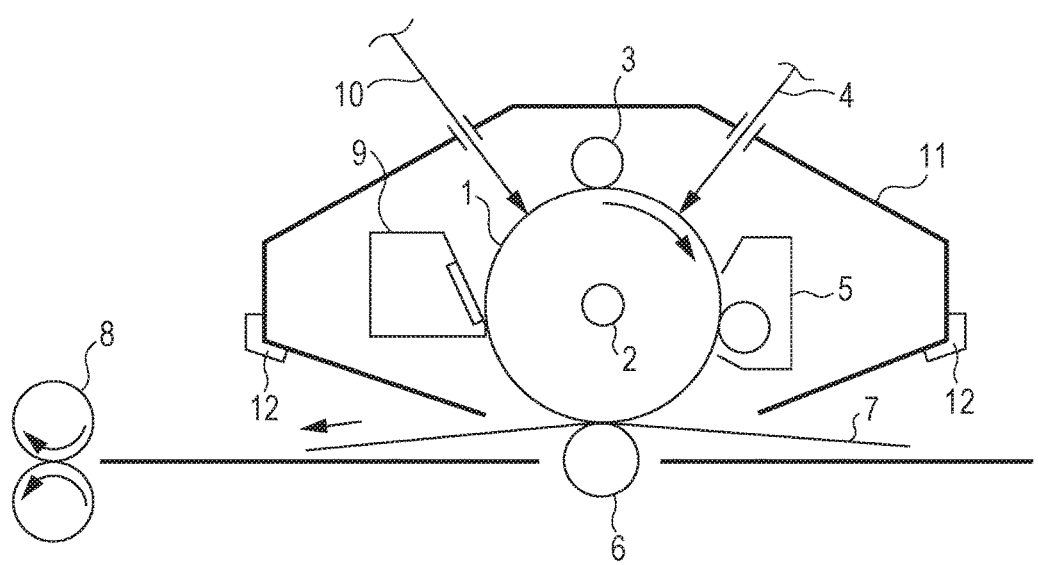
FIG. 1 illustrates an example of a schematic structure of an electrophotographic apparatus that includes a process cartridge including an electrophotographic photosensitive member.

With the realization of a high-speed electrophotographic recording process, a charge transporting layer is expected to have high durability and contribute to an improvement in the performance of an electrophotographic photosensitive member produced. Examples of the performance required for such an electrophotographic photosensitive member include effects of suppressing fogging and uneven density, effects of suppressing potential variation, and effects of suppressing photomemory.

Accordingly, the present disclosure provides an electrophotographic photosensitive member which has high durability and whose performance is sufficiently high. The present disclosure also provides a process cartridge and an electrophotographic apparatus that include the electrophotographic photosensitive member.

Hereafter, the present disclosure will be described in detail based on embodiments.

Electrophotographic Photosensitive Member

An electrophotographic photosensitive member according to an embodiment includes a support, a charge generating layer containing a charge generation material, and a charge transporting layer containing a charge transport material in this order, and the charge transporting layer serves as a surface layer. Other layers may be disposed between the support and the charge generating layer. Hereafter, each layer will be described.

The electrophotographic photosensitive member is produced by a method in which a coating solution for each layer described below is prepared, applied in a desired order, and dried. Examples of a method for applying the coating solution include dipping (dip coating), spray coating, curtain coating, and spin coating. Among them, dipping can be employed from the viewpoint of efficiency and productivity.

Support

The support is particularly a conductive support. Examples of the conductive support include metal or alloy supports made of aluminum, iron, nickel, copper, gold, or the like; and supports obtained by forming a thin metal film made of aluminum, chromium, silver, gold, or the like, a thin film of a conductive material such as indium oxide, tin oxide, or zinc oxide, or a thin film of a conductive ink containing silver nanowires on an insulating support made of polyester resin, polycarbonate resin, polyimide resin, glass, or the like.

To improve electrical properties and suppress interference fringes, the surface of the support may be subjected to electrochemical treatment such as anodic oxidation, wet honing, blasting, or cutting.

The support has a cylindrical shape or a film-like shape.

Conductive Layer

A conductive layer may be disposed on the support. By disposing a conductive layer, the unevenness and defects of the support can be covered and the interference fringes can be prevented. The average thickness of the conductive layer is preferably 5 µm or more and 40 µm or less and more preferably 10 µm or more and 30 µm or less.

The conductive layer can contain conductive particles and a binder resin. Examples of the conductive particles include carbon black, metal particles, and metal oxide particles.

Examples of the metal oxide particles include particles of zinc oxide, white lead, aluminum oxide, indium oxide, silicon oxide, zirconium oxide, tin oxide, titanium oxide, magnesium oxide, antimony oxide, bismuth oxide, indium oxide doped with tin, and tin oxide doped with antimony or tantalum. These metal oxide particles may be used in combination of two or more. Among them, particles of zinc oxide, tin oxide, or titanium oxide can be employed. In particular, titanium oxide particles can be employed from the viewpoint of increasing sensitivity because the titanium oxide particles absorb almost no visible light and near-infrared light and have a white color. In terms of crystal form, titanium oxide is classified into, for example, rutile titanium oxide, anatase titanium oxide, brookite titanium oxide, and amorphous titanium oxide, and any of the crystal forms may be used. Alternatively, titanium oxide particles having needle crystals or granular crystals may be used. Rutile titanium oxide particles can be particularly used. The number-average primary particle size of the metal oxide particles is preferably 0.05 to 1 µm and more preferably 0.1 to 0.5 µm.

Examples of the binder resin include phenolic resin, polyurethane resin, polyamide resin, polyimide resin, polyamide-imide resin, polyvinyl acetal resin, epoxy resin, acrylic resin, melamine resin, and polyester resin. These binder resins may be used in combination of two or more. Among them, a curable resin is preferably employed from the viewpoint of the resistance to solvents in coating solutions for forming other layers, the adhesiveness to the conductive support, and the dispersibility and dispersion stability of the metal oxide particles. A thermosetting resin is more preferably employed. Examples of the thermosetting resin include a thermosetting phenolic resin and a thermosetting polyurethane resin.

Undercoat Layer

An undercoat layer may be disposed on the support or the conductive layer. The presence of the undercoat layer improves a barrier function and an adhesive function. Examples of a resin used for the undercoat layer include agarose resin, acrylic resin, allyl resin, alkyd resin, ethyl cellulose resin, ethylene-acrylic acid copolymer, epoxy resin, casein resin, silicone resin, gelatin resin, cellulose resin, phenolic resin, butyral resin, polyacrylate resin, polyacetal resin, polyamide-imide resin, polyamide resin, polyallyl ether resin, polyimide resin, polyurethane resin, polyester resin, polyethylene resin, polycarbonate resin, polystyrene resin, polysulfone resin, polyvinyl alcohol resin, polyvinyl acetal resin, polybutadiene resin, polypropylene resin, melamine resin, and urea resin. The average thickness of the undercoat layer can be particularly set to 0.3 µm or more and 5.0 µm or less.

The undercoat layer may contain an electron transport material or metal oxide particles. In this structure, electrons among charged particles generated in the charge generating layer can be transported to the support. Therefore, even if the charge transportability of the charge transporting layer is improved, charge deactivation and an increase in the amount of charged particles trapped in the charge generating layer can be suppressed. This improves the initial electric properties and the electric properties during repeated use.

Examples of the electron transport material include quinone compounds, imide compounds, benzimidazole compounds, cyclopentadienylidene compounds, fluorenone compounds, xanthone compounds, benzophenone compounds, cyanovinyl compounds, naphthylimide compounds, and peryleneimide compounds. The electron transport material can particularly have a polymerizable functional group such as a hydroxy group, a thiol group, an amino group, a carboxy group, or a methoxy group.

The metal oxide particles are the same as those described regarding the conductive layer.

Charge Generating Layer

A charge generating layer is disposed between the support and the charge transporting layer. The charge generating layer can be adjacent to the charge transporting layer. The thickness of the charge generating layer is preferably 0.05 µm or more and 1 µm or less and more preferably 0.1 µm or more and 0.3 µm or less.

The charge generating layer particularly contains a charge generation material and a binder resin.

The content of the charge generation material in the charge generating layer is preferably 40 mass % or more and 85 mass % or less and more preferably 60 mass % or more and 80 mass % or less relative to the total weight of the charge generating layer.

The ratio (A/B) of the content A (mass %) of the charge generation material in the charge generating layer to the content B (mass %) of the charge transport material in the charge transporting layer is preferably 1.0 or more and 3.0 or less and more preferably 1.2 or more and 2.5 or less.

The charge generation material is preferably a titanium phthalocyanine crystal or a gallium phthalocyanine crystal. In particular, the charge generation material is more preferably an oxytitanium phthalocyanine crystal, a hydroxygallium phthalocyanine crystal, or a chlorogallium phthalocyanine crystal having high sensitivity. From the viewpoint of improving sensitivity, the charge generation material is more preferably an oxytitanium phthalocyanine crystal having a peak at a Bragg angle 2θ±0.3° of 27.2° in its CuKα X-ray diffraction pattern, a hydroxygallium phthalocyanine crystal having peaks at Bragg angles 2θ±0.30 of 7.4° and 28.3° in its CuKα X-ray diffraction pattern, or a chlorogallium phthalocyanine crystal having peaks at Bragg angles 2θ±0.30 of 7.4°, 16.6°, 25.5°, and 28.3° in its CuKα X-ray diffraction pattern.

The gallium phthalocyanine crystal is particularly a gallium phthalocyanine crystal containing an amide compound such as N,N-dimethylformamide, N-methylformamide, N-propylformamide, or N-vinylformamide therein.

The content of the amide compound is preferably 0.1 mass % or more and 3.0 mass % or less and more preferably 0.3 mass % or more and 1.9 mass % or less relative to gallium phthalocyanine in the gallium phthalocyanine crystal. The content of the amide compound can be measured by a $^1$H-NMR method.

The gallium phthalocyanine crystal containing an amide compound therein is prepared through a crystal transformation process in which gallium phthalocyanine treated by acid pasting or dry milling and a solvent containing an amide compound are subjected to wet milling.

The wet milling is performed with a milling device such as a sand mill or a ball mill using dispersing media such as glass beads, steel beads, or alumina balls.

Examples of the binder resin include polyester, acrylic resin, polycarbonate, polyvinyl butyral, polystyrene, polyvinyl acetate, polysulfone, acrylonitrile copolymer, and polyvinyl benzal. Among them, polyvinyl butyral or polyvinyl benzal can be particularly used as a resin for dispersing the gallium phthalocyanine crystal.

Charge Transporting Layer

The charge transporting layer contains a charge transport material and a polycarbonate resin having structural units described below.

Polycarbonate Resin (I) First Embodiment

Structure of Polycarbonate Resin

As a result of studies conducted by the present inventors, they have found that fogging and uneven density can be suppressed by using an electrophotographic photosensitive member including a charge transporting layer containing a particular polycarbonate resin. Specifically, the charge transporting layer contains a polycarbonate resin (i) having a structural unit represented by formula (1-1), a structural unit represented by formula (1-2), and a structural unit represented by formula (1-3).

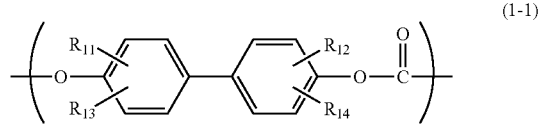
(1-1)

In the formula (1-1), $R^{11}$ to $R^{14}$ each independently represent a hydrogen atom, an alkyl group, an aryl group, or an alkoxy group.

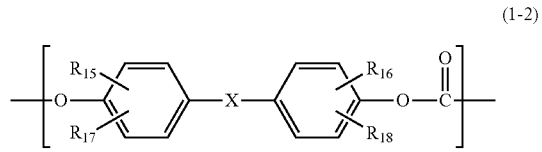
(1-2)

In the formula (1-2), $R^{15}$ to $R^{18}$ each independently represent a hydrogen atom, an alkyl group, an aryl group, or an alkoxy group, and X represents an oxygen atom, a sulfur atom, or a sulfonyl group.

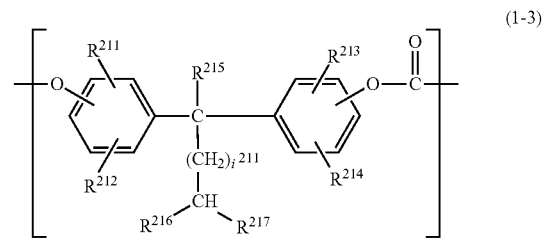
(1-3)

In the formula (1-3), $R^{211}$ to $R^{214}$ each independently represent a hydrogen atom, an alkyl group, an aryl group, or an alkoxy group; $R^{215}$ represents a hydrogen atom, an alkyl group, an aryl group, or an alkoxy group; $R^{216}$ and $R^{217}$ each independently represent an alkyl group having 1 to 9 carbon atoms; and $i^{211}$ represents an integer of 0 to 3, where when $i^{211}$ is 0, a single bond is given.

The polycarbonate resin having the structure according to an embodiment has higher wear resistance than polycarbonate resins not having the structure according to an embodiment. This suppresses wear after repeated use and improves the stability of the charged potential on a surface of a photosensitive member. Consequently, toner fogging on a full white portion of an image is believed to be suppressed.

Furthermore, when images are formed at different process speeds, an uneven density may be caused between the images. This results from the responsivity of an electrophotographic photosensitive member during high-speed recording, and thus the surface potential after exposure needs to be quickly stabilized. When the polycarbonate resin having the structure according to an embodiment is employed, the uneven density is believed to be suppressed because the responsivity during high-speed recording is improved compared with polycarbonate resins not having the structure according to an embodiment.

The reason for this is believed to be as follows. When the polycarbonate resin according to an embodiment has both the structural units represented by the formula (1-1) and the formula (1-2), an excessive orientation of the structure can be suppressed while the wear resistance is maintained. Furthermore, when the structural unit represented by the formula (1-3) and having a branched chain structure of an alkyl group is combined with the structural units represented by the formula (1-1) and the formula (1-2), the compatibility between the polycarbonate resin and a low-molecular-weight compound such as a charge transport material is improved. Consequently, the charge transport material is moderately dispersed in the charge transporting layer, resulting in formation of a molecular configuration in which carriers are smoothly transported. Thus, carriers are smoothly emitted even in a region having a low electric field intensity in the charge transporting layer, and therefore responsivity during high-speed recording is believed to be improved.

From the above viewpoint, in the formula (1-1), $R^{11}$ to $R^{14}$ preferably each independently represent a hydrogen atom, a methyl group, an ethyl group, or a phenyl group. Furthermore, $R^{11}$ to $R^{14}$ more preferably represent a hydrogen atom.

In the formula (1-2), preferably, $R^{15}$ to $R^{18}$ each independently represent a hydrogen atom, a methyl group, an ethyl group, or a phenyl group, and X represents an oxygen atom, a sulfur atom, or a sulfonyl group. More preferably, $R^{15}$ to $R^{18}$ represent a hydrogen atom and X represents an oxygen atom.

In the formula (1-3), preferably, $R^{211}$ to $R^{214}$ each independently represent a hydrogen atom, a methyl group, an ethyl group, or a phenyl group; $R^{215}$ represents a hydrogen atom, a methyl group, or an ethyl group; $R^{216}$ and $R^{217}$ each independently represent an alkyl group having 1 to 4 carbon atoms; and $i^{211}$ represents an integer of 0 to 2. More preferably, $R^{211}$ to $R^{214}$ represent a hydrogen atom, $R^{215}$ represents a hydrogen atom or a methyl group, $R^{216}$ and $R^{217}$ represent a methyl group, and $i^{211}$ represents 0 or 1.

When the numbers of repetitions of the structural unit represented by the formula (1-1), the structural unit represented by the formula (1-2), and the structural unit represented by the formula (1-3) in the resin are respectively assumed to be a, b, and c, c/(a+b+c) is preferably 0.40 to 0.80 and a/b is preferably 0.25 to 4.00. In these ranges, high wear resistance and high responsivity during high-speed recording can be maintained.

Structural units other than the structural units represented by the formula (1-1) to the formula (1-3) may also be contained. In this case, the amount of the structural units represented by the formula (1-1) to the formula (1-3) can be particularly set to 1.0 time or more the amount of the other structural units on a molar basis.

The viscosity-average molecular weight (Mv) of the polycarbonate resin according to an embodiment is preferably 30,000 or more and 80,000 or less and more preferably 40,000 or more and 70,000 or less. If the viscosity-average molecular weight of the polycarbonate resin is less than 30,000, the wear resistance may deteriorate. If the viscosity-average molecular weight of the polycarbonate resin is more than 80,000, a coating solution for charge transporting layers may have insufficient storage stability. The weight-average molecular weight (Mw) of the polycarbonate resin is preferably 30,000 or more and 110,000 or less and more preferably 40,000 or more and 90,000 or less. In Examples described below, the viscosity-average molecular weight of the polycarbonate resin was determined from the following formula. The limiting viscosity [η] was measured with an Ubbelohde viscometer using a 0.5 w/v % polycarbonate dichloromethane solution at 20° C. at a Huggins constant of 0.45.

$$[\eta]=1.23\times10-4\times(Mv)0.83$$

The weight-average molecular weight of the polycarbonate resin was determined in terms of polystyrene by gel permeation chromatography (GPC) [instrument: Alliance HPLC system (manufactured by Waters)] using two Shodex KF-805L columns (manufactured by Showa Denko K.K.), a 0.25 w/v % chloroform solution sample, and a 1 ml/min chloroform eluent with UV detection at 254 nm.

The limiting viscosity of the polycarbonate resin can be particularly set to 0.3 dL/g to 2.0 dL/g.

The content of the charge transport material (described below) in the charge transporting layer can be particularly set to 0.5 times or more and 0.9 times or less the content of the polycarbonate resin. If the content is less than 0.5 times the content of the polycarbonate resin, sufficient responsivity during high-speed recording is sometimes not achieved. If the content is more than 0.9 times the content of the polycarbonate resin, sufficient wear resistance is sometimes not achieved.

Specific Examples of Structural Unit Represented by Formula (1-1)

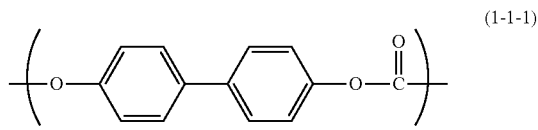

(1-1-1)

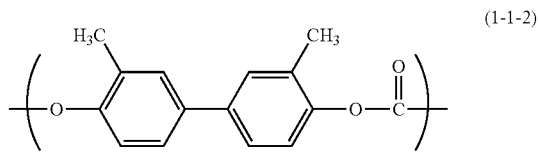

(1-1-2)

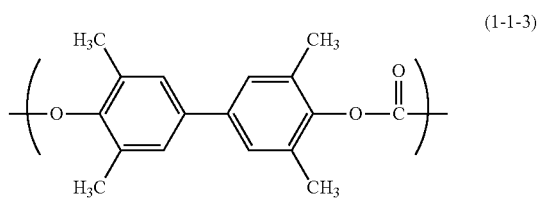

(1-1-3)

Specific Examples of Structural Unit Represented by Formula (1-2)

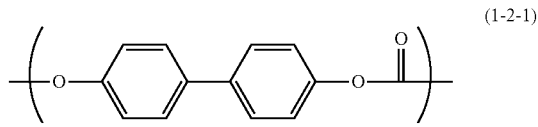

(1-2-1)

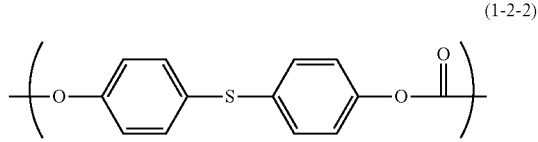

(1-2-2)

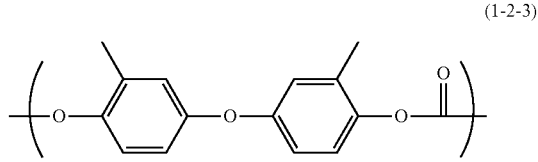

(1-2-3)

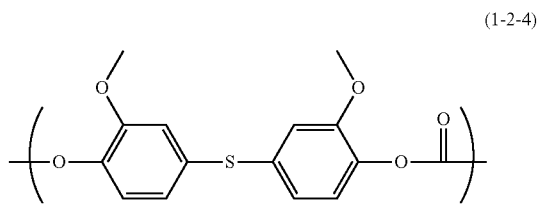

(1-2-4)

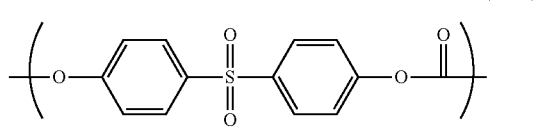

(1-2-5)

Specific Examples of Structural Unit Represented by Formula (1-3)

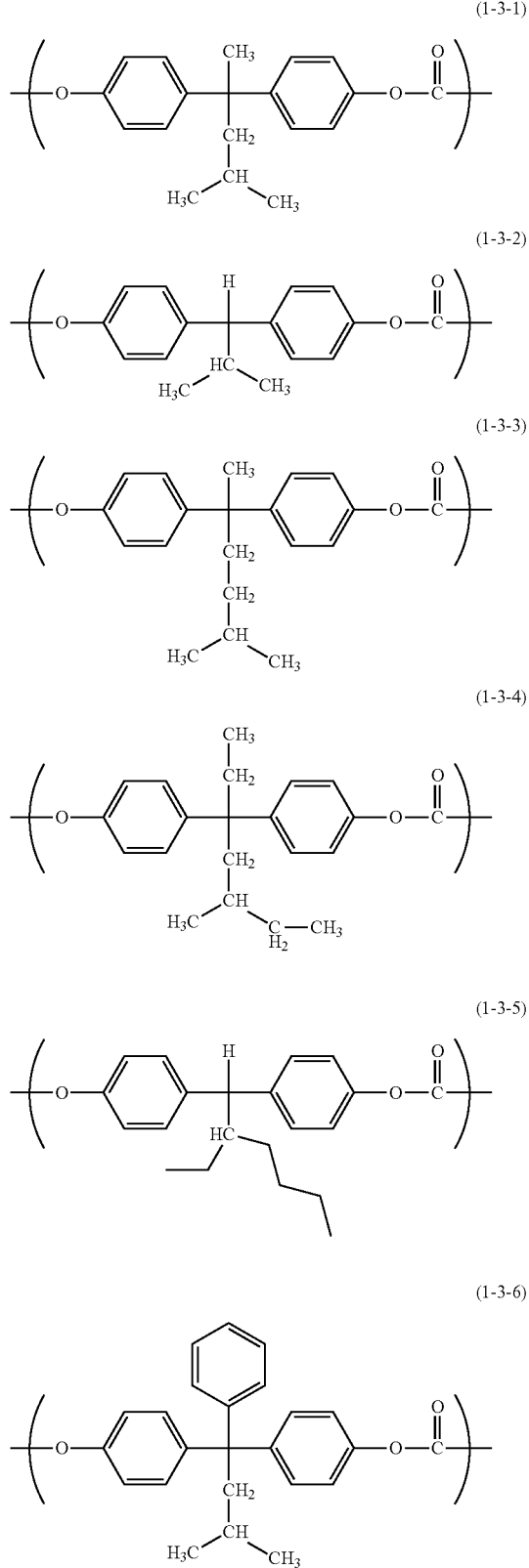

Specific Examples of Polycarbonate Resin

Table 1 shows the specific examples of the polycarbonate resin.

TABLE 1

Structural units of resins and content of each structural unit in resin

| Resin No. | Formula (1-1) Type | Content in resin (mol %) | Formula (1-2) Type | Content in resin (mol %) | Formula (1-3) Type | Content in resin (mol %) |
|---|---|---|---|---|---|---|
| Resin I-1 | (1-1-1) | 20 | (1-2-1) | 30 | (1-3-1) | 50 |
| Resin I-2 | (1-1-1) | 10 | (1-2-1) | 40 | (1-3-1) | 50 |
| Resin I-3 | (1-1-1) | 40 | (1-2-1) | 10 | (1-3-1) | 50 |
| Resin I-4 | (1-1-1) | 24 | (1-2-1) | 36 | (1-3-1) | 40 |
| Resin I-5 | (1-1-1) | 12 | (1-2-1) | 18 | (1-3-1) | 70 |
| Resin I-6 | (1-1-1) | 8 | (1-2-1) | 12 | (1-3-1) | 80 |
| Resin I-7 | (1-1-1) | 20 | (1-2-1) | 30 | (1-3-2) | 50 |
| Resin I-8 | (1-1-1) | 20 | (1-2-1) | 30 | (1-3-3) | 50 |
| Resin I-9 | (1-1-1) | 20 | (1-2-1) | 30 | (1-3-4) | 50 |
| Resin I-10 | (1-1-1) | 20 | (1-2-1) | 30 | (1-3-5) | 50 |
| Resin I-11 | (1-1-1) | 20 | (1-2-1) | 30 | (1-3-6) | 50 |
| Resin I-12 | (1-1-1) | 8 | (1-2-1) | 42 | (1-3-1) | 50 |
| Resin I-13 | (1-1-1) | 42 | (1-2-1) | 8 | (1-3-1) | 50 |
| Resin I-14 | (1-1-1) | 35 | (1-2-1) | 35 | (1-3-1) | 30 |
| Resin I-15 | (1-1-1) | 5 | (1-2-1) | 5 | (1-3-1) | 90 |
| Resin I-16 | (1-1-3) | 20 | (1-2-1) | 30 | (1-3-1) | 50 |
| Resin I-17 | (1-1-1) | 20 | (1-2-2) | 30 | (1-3-1) | 50 |
| Resin I-18 | (1-1-1) | 20 | (1-2-5) | 30 | (1-3-1) | 50 |

Method for Synthesizing Polycarbonate Resin

A method for synthesizing Resin I-1 by a phosgene method will be described below as an example. Other polycarbonate resins can be synthesized by, in the following method, appropriately changing the types of compounds serving as the structural units represented by the formula (1-1) to the formula (1-3) and the amounts of the compounds added. The viscosity-average molecular weight of the resins can be adjusted by appropriately changing the amount of a molecular weight modifier added. Alternatively, the polycarbonate resin according to an embodiment may be synthesized by a transesterification method.

In 2200 ml of a 5 mass % aqueous sodium hydroxide solution, 37.2 g (0.20 mol) of 4,4'-dihydroxybiphenyl (product code B0464 manufactured by Tokyo Chemical Industry Co., Ltd.) serving as a structural unit represented by formula (1-1-1), 60.7 g (0.30 mol) of 4,4'-dihydroxydiphenyl ether (product code D2121 manufactured by Tokyo Chemical Industry Co., Ltd.) serving as a structural unit represented by formula (1-2-1), 135.2 g (0.500 mol) of 4,4'-(1,3-dimethylbutylidene)diphenol (product code D3267 manufactured by Tokyo Chemical Industry Co., Ltd.) serving as a structural unit represented by formula (1-3-1), and 0.2 g of hydrosulfite were dissolved. To the resulting mixture, 1000 ml of methylene chloride was added. Then, 120 g of phosgene was blown into the mixture under stirring over 60 minutes while the temperature was kept at 15° C. After the blowing of the phosgene, 2.6 g of p-t-butylphenol (product code B0383 manufactured by Tokyo Chemical Industry Co., Ltd.,) serving as a molecular weight modifier was added thereto and stirred to emulsify the reaction liquid. After the emulsification, 0.8 ml of triethylamine was added, and polymerization was performed under stirring at 23° C. for 1 hour. After the completion of the polymerization, the resulting reaction liquid was separated into an aqueous phase and an organic phase. The organic phase was neutralized with phosphoric acid and repeatedly washed with water until the conductivity of the washing (aqueous phase) reached 10 μS/cm or less. The resulting polymer solution was added dropwise to warm water kept at 45° C., and the solvent was removed by evaporation to obtain a white powdery precipitate. The obtained precipitate was filtered and dried at 110° C. for 24 hours to obtain a polycarbonate resin.

The obtained polycarbonate resin was analyzed by infrared absorption spectroscopy. The spectrum had an absorption peak attributable to a carbonyl group around 1770 cm$^{-1}$ and an absorption peak attributable to an ether bond around 1240 cm$^{-1}$, which showed the presence of a polycarbonate resin. The viscosity-average molecular weight (Mv) of the obtained polycarbonate resin was 54,000 and the weight-average molecular weight (Mw) was 74,000.

(II) Second Embodiment

Structure of Polycarbonate Resin

As a result of studies conducted by the present inventors, they have found that high wear resistance and high crack resistance can be achieved by using an electrophotographic photosensitive member including a charge transporting layer containing a particular polycarbonate resin. Specifically, the charge transporting layer contains a polycarbonate resin (ii) having a structural unit represented by formula (2-1), a structural unit represented by formula (2-2), and a structural unit represented by formula (2-3).

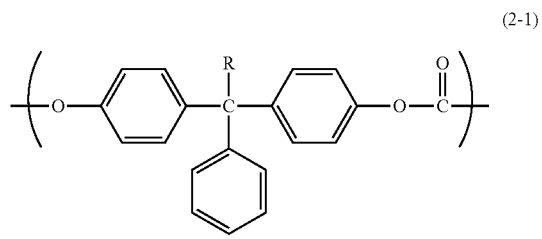

(2-1)

In the formula (2-1), R represents a hydrogen atom, a methyl group, or a phenyl group.

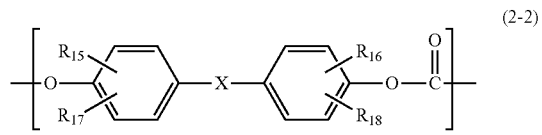

(2-2)

In the formula (2-2), $R^{15}$ to $R^{18}$ each independently represent a hydrogen atom, an alkyl group, an aryl group, or an alkoxy group, and X represents a single bond, an oxygen atom, a sulfur atom, or a sulfonyl group.

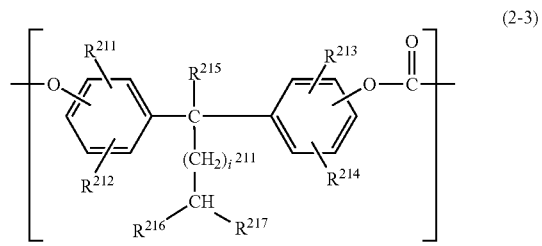

(2-3)

In the formula (2-3), $R^{211}$ to $R^{214}$ each independently represent a hydrogen atom, an alkyl group, an aryl group, or an alkoxy group; $R^{215}$ represents a hydrogen atom, an alkyl group, an aryl group, or an alkoxy group; $R^{216}$ and $R^{117}$ each independently represent an alkyl group having 1 to 5 carbon atoms; and $i^{211}$ represents an integer of 0 to 2, where when $i^{211}$ is 0, a single bond is given.

The polycarbonate resin having the structure according to an embodiment provides higher wear resistance than polycarbonate resins not having the structure according to an embodiment. This may be because the structural unit represented by the formula (2-2) is copolymerized with regularity while exhibiting high orientation. In particular, a polymer chain of a structure having an ether structure is easily folded in a flexible manner, and furthermore the structural unit represented by the formula (2-2) tends to be regularly oriented because of its high bilateral symmetry. Therefore, it is believed that the wear resistance can be considerably improved and high durability can be achieved.

It has been also found from the studies that the polycarbonate resin provides high wear resistance, but provides poor crack resistance when exposed to a chemical substance such as a plasticizer. This may be because when the polycarbonate resin that exhibits high orientation is attacked by a substance having orientation different from that of the polycarbonate resin, the regularity of a molecular chain is easily disturbed, which provides a brittle resin. Therefore, the present inventors have considered that both of high wear resistance and high crack resistance can be achieved if a part of the regularity is intentionally disturbed while most of the orientation with regularity is maintained. As a result of studies, it has been found that both of high wear resistance and high crack resistance can be achieved by appropriately mixing structural units represented by formula (2-1) and formula (2-3), which have skeleton structures similar to that of the structural unit represented by the formula (2-2).

The reason for this is believed to be as follows. First, an improvement in wear resistance is achieved by employing a structure with regularity, such as the structural unit represented by the formula (2-2). In addition, by appropriately mixing, during copolymerization, structures having a skeleton structure similar to that of the structural unit represented by the formula (2-2), such as the structural units represented by the formula (2-1) and the formula (2-3), and also having a branched chain, a part of the orientation can be intentionally disturbed while high regularity is maintained, which achieves high crack resistance. Furthermore, it is believed that, since the structural unit represented by the formula (2-1) has a structure in which a phenyl group is bonded to at least one side of a main chain, the structural unit is optimum for moderately disturbing the regularity of the main chain and is therefore essential for improving the crack resistance.

From the above viewpoint, in the formula (2-2), preferably, $R^{15}$ to $R^{18}$ each independently represent a hydrogen atom, a methyl group, an ethyl group, or a phenyl group, and X represents an oxygen atom, a sulfur atom, or a sulfonyl group. More preferably, $R^{15}$ to $R^{18}$ represent a hydrogen atom and X represents an oxygen atom.

In the formula (2-3), preferably, $R^{211}$ to $R^{214}$ each independently represent a hydrogen atom, a methyl group, an ethyl group, or a phenyl group; $R^{215}$ represents a hydrogen atom, a methyl group, or an ethyl group; $R^{216}$ and $R^{217}$ each independently represent an alkyl group having 1 to 5 carbon atoms; and $i^{211}$ represents an integer of 0 to 2. More preferably, $R^{211}$ to $R^{214}$ represent a hydrogen atom, $R^{215}$ represents a hydrogen atom or a methyl group, $R^{215}$ and $R^{217}$ represent a methyl group, and $i^{211}$ represents 0 or 1.

When the numbers of repetitions of the structural unit represented by the formula (2-1), the structural unit represented by the formula (2-2), and the structural unit represented by the formula (2-3) in the polycarbonate resin are respectively assumed to be a, b, and c, a/(a+b+c) is preferably 0.10 to 0.40 and b/(a+b+c) is preferably 0.30 to 0.60. Furthermore, when the numbers of repetitions of the structural unit represented by the formula (2-1) and the structural unit represented by the formula (2-2) are respectively assumed to be a and b, a/b is preferably 0.20 to 1.20. In these ranges, both of high wear resistance and high crack resistance can be achieved.

Structural units other than the structural units represented by the formula (2-1) to the formula (2-3) may also be contained. In this case, the amount of the structural units represented by the formula (2-1) to the formula (2-3) can be particularly set to 1.0 time or more the amount of the other structural units on a molar basis.

The viscosity-average molecular weight (Mv) of the polycarbonate resin according to an embodiment can be particularly set to 30,000 or more and 90,000 or less. If the viscosity-average molecular weight of the polycarbonate resin is less than 30,000, the wear resistance may deteriorate. If the viscosity-average molecular weight of the polycarbonate resin is more than 90,000, a coating solution for surface layers may have insufficient storage stability. The weight-average molecular weight (Mw) of the polycarbonate resin can be particularly set to 30,000 or more and 110,000 or less.

The limiting viscosity of the polycarbonate resin can be particularly set to 0.3 dL/g to 2.0 dL/g.

The content of the charge transport material (described below) in the charge transporting layer can be particularly set to 0.5 times or more and 0.9 times or less the content of the polycarbonate resin. If the content is less than 0.5 times the content of the polycarbonate resin, sufficient responsivity during high-speed recording is sometimes not achieved. If the content is more than 0.9 times the content of the polycarbonate resin, sufficient wear resistance is sometimes not achieved.

Specific Examples of Structural Unit Represented by Formula (2-1)

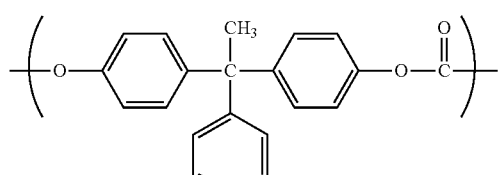

(2-1-1)

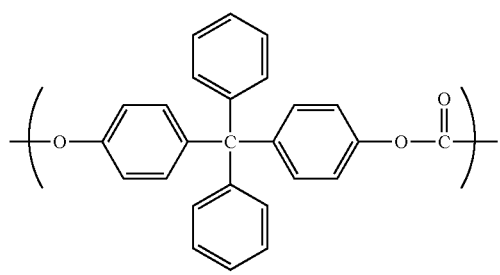

(2-1-2)

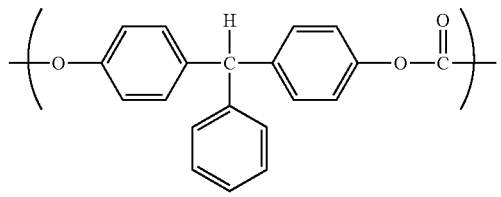

(2-1-3)

Specific examples of structural unit represented by formula (2-2)

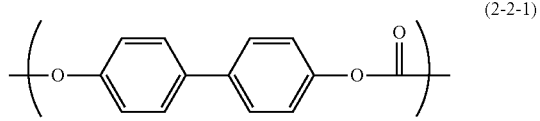

(2-2-1)

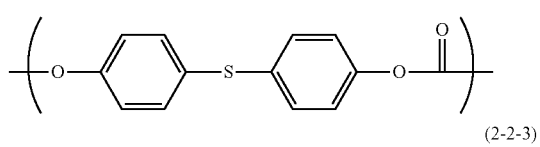

(2-2-2)

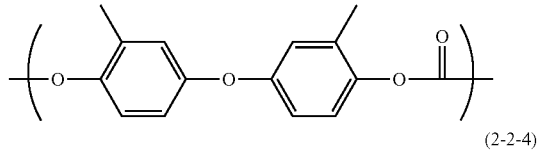

(2-2-3)

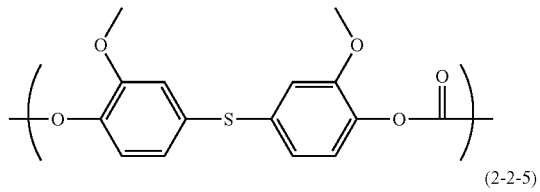

(2-2-4)

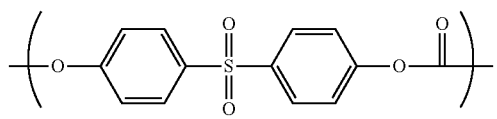

(2-2-5)

Specific examples of structural unit represented by formula (2-3)

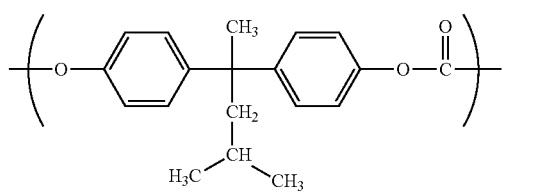

(2-3-1)

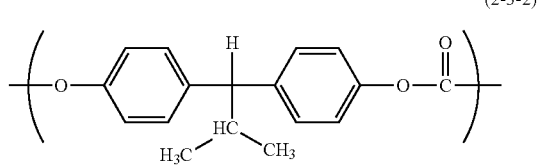

(2-3-2)

(2-3-3)

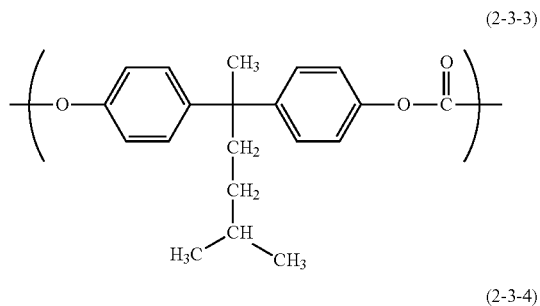

(2-3-4)

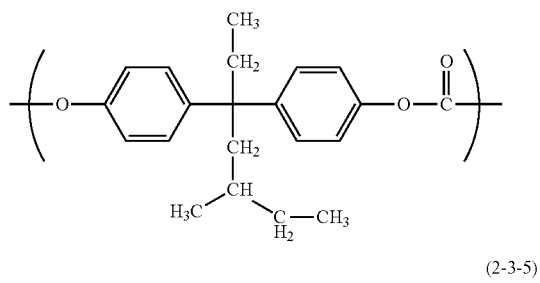

(2-3-5)

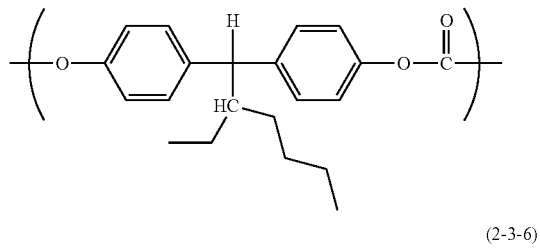

(2-3-6)

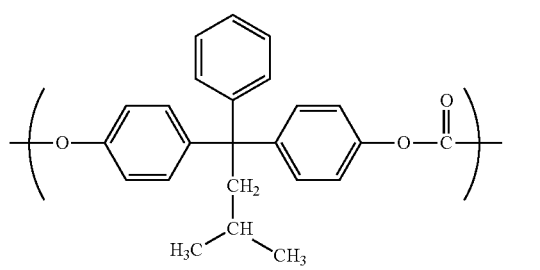

Specific examples of polycarbonate resin

Table 2 shows the specific examples of the polycarbonate resin.

TABLE 2

Structural units of resins and content of each structural unit in resin

| Resin No. | Formula (2-1) | | Formula (2-2) | | Formula (2-3) | |
|---|---|---|---|---|---|---|
| | Type | Content in resin (mol %) | Type | Content in resin (mol %) | Type | Content in resin (mol %) |
| Resin II-1 | (2-1-1) | 20 | (2-2-1) | 30 | (2-3-1) | 50 |
| Resin II-2 | (2-1-1) | 20 | (2-2-1) | 50 | (2-3-2) | 30 |
| Resin II-3 | (2-1-1) | 15 | (2-2-1) | 35 | (2-3-1) | 50 |
| Resin II-4 | (2-1-1) | 35 | (2-2-1) | 15 | (2-3-1) | 50 |
| Resin II-5 | (2-1-1) | 5 | (2-2-1) | 45 | (2-3-1) | 50 |
| Resin II-6 | (2-1-1) | 45 | (2-2-1) | 5 | (2-3-1) | 50 |
| Resin II-7 | (2-1-1) | 45 | (2-2-1) | 25 | (2-3-1) | 40 |
| Resin II-8 | (2-1-1) | 5 | (2-2-1) | 65 | (2-3-1) | 30 |
| Resin II-9 | (2-1-1) | 20 | (2-2-2) | 30 | (2-3-5) | 50 |
| Resin II-10 | (2-1-1) | 20 | (2-2-5) | 30 | (2-3-1) | 50 |

TABLE 2-continued

Structural units of resins and content of each structural unit in resin

| Resin No. | Formula (2-1) | | Formula (2-2) | | Formula (2-3) | |
|---|---|---|---|---|---|---|
| | Type | Content in resin (mol %) | Type | Content in resin (mol %) | Type | Content in resin (mol %) |
| Resin II-11 | (2-1-2) | 20 | (2-2-1) | 30 | (2-3-1) | 50 |
| Resin II-12 | (2-1-3) | 20 | (2-2-1) | 30 | (2-3-1) | 50 |

Method for Synthesizing Polycarbonate Resin

A method for synthesizing Resin II-1 by a phosgene method will be described below as an example. Other polycarbonate resins can be synthesized by, in the following method, appropriately changing the types of compounds serving as the structural units represented by the formula (2-1) to the formula (2-3) and the amounts of the compounds added. The viscosity-average molecular weight of the resins can be adjusted by appropriately changing the amount of a molecular weight modifier added. Alternatively, the polycarbonate resin according to an embodiment may be synthesized by a transesterification method.

In 2200 ml of a 5 mass % aqueous sodium hydroxide solution, 64.2 g (0.20 mol) of 4,4'-(α-methylbenzylidene)bisphenol (product code M1098 manufactured by Tokyo Chemical Industry Co., Ltd.) serving as a structural unit represented by formula (2-1-1), 60.7 g (0.30 mol) of 4,4'-dihydroxydiphenyl ether (product code D2121 manufactured by Tokyo Chemical Industry Co., Ltd.) serving as a structural unit represented by formula (2-2-1), 135.2 g (0.500 mol) of 4,4'-(1,3-dimethylbutylidene)diphenol (product code D3267 manufactured by Tokyo Chemical Industry Co., Ltd.) serving as a structural unit represented by formula (2-3-1), and 0.2 g of hydrosulfite were dissolved. To the resulting mixture, 1000 ml of methylene chloride was added. Then, 120 g of phosgene was blown into the mixture under stirring over 60 minutes while the temperature was kept at 15° C. After the blowing of the phosgene, 2.6 g of p-t-butylphenol (product code B0383 manufactured by Tokyo Chemical Industry Co., Ltd.) serving as a molecular weight modifier was added thereto and stirred to emulsify the reaction liquid. After the emulsification, 0.8 ml of triethylamine was added, and polymerization was performed under stirring at 23° C. for 1 hour. After the completion of the polymerization, the reaction liquid was separated into an aqueous phase and an organic phase. The organic phase was neutralized with phosphoric acid and repeatedly washed with water until the conductivity of the washing (aqueous phase) reached 10 μS/cm or less. The resulting polymer solution was added dropwise to warm water kept at 45° C., and the solvent was removed by evaporation to obtain a white powdery precipitate. The obtained precipitate was filtered and dried at 110° C. for 24 hours to obtain a polycarbonate resin.

The obtained polycarbonate resin was analyzed by infrared absorption spectroscopy. The spectrum had an absorption peak attributable to a carbonyl group around 1770 cm$^{-1}$ and an absorption peak attributable to an ether bond around 1240 cm$^{-1}$, which showed the presence of a polycarbonate resin. The viscosity-average molecular weight (Mv) of the obtained polycarbonate resin was 55,000 and the weight-average molecular weight (Mw) was 66,000.

(III) Third Embodiment

Structure of Polycarbonate Resin

As a result of studies conducted by the present inventors, they have found that the potential variation can be effectively suppressed by using an electrophotographic photosensitive member including a charge transporting layer containing a particular polycarbonate resin. Specifically, the charge transporting layer contains a polycarbonate resin (iii) having a structural unit represented by formula (3-1) and a structural unit represented by formula (3-2).

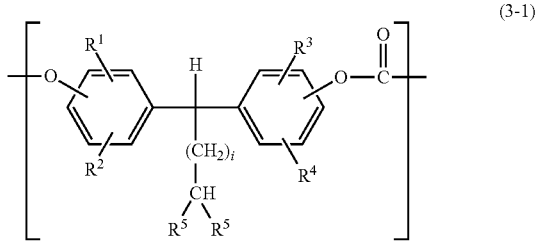

(3-1)

In the formula (3-1), $R^1$ to $R^4$ each independently represent a hydrogen atom, an alkyl group, an aryl group, or an alkoxy group; $R^5$ represents a substituted or unsubstituted alkyl group having 1 to 9 carbon atoms; and i represents an integer of 0 to 3, where when i is 0, a single bond is given.

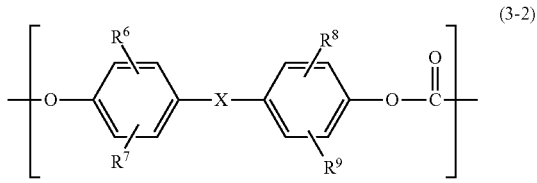

(3-2)

In the formula (3-2), $R^6$ to $R^9$ each independently represent a hydrogen atom, an alkyl group, an aryl group, or an alkoxy group, and X represents an oxygen atom or a sulfur atom.

An improvement in the mechanical strength and the suppression of failure of carrier movement can be simultaneously achieved by using the polycarbonate resin having the structure according to an embodiment as a binder for the charge transporting layer. Therefore, the endurance potential variation is believed to be suppressed. When the polycarbonate resin having the structure according to an embodiment is employed, a charge transport material is provided at an equal distance at an interface between the charge generating layer and the charge transporting layer and in the charge transporting layer. Consequently, the failure of carrier movement is believed to be suppressed. Furthermore, when the polycarbonate resin is used in combination with the charge generating layer containing a phthalocyanine crystal, the failure of carrier movement is particularly suppressed at an interface between the charge generating layer and the charge transporting layer, and thus the endurance potential variation is believed to be highly suppressed. To cause carriers to smoothly move between the charge generation material and the charge transport material, it is believed that the charge transport material needs to be present at a suitable position near the charge generation material. A phthalocyanine molecule constituting the phthalocyanine crystal is believed to have many directions suitable for carrier movement due to high symmetry of its molecular structure. When this is combined with the uniform arrangement of the charge transport material due to the polycarbonate resin having the structure according to an embodiment, it is believed that the failure of carrier movement is particularly suppressed between the charge generation material and the charge transport material and the endurance potential variation is highly suppressed. In contrast, if the charge generating layer contains only a charge generation material constituted by molecules with low symmetry, such as an azo pigment, such a pigment has the limited number of directions suitable for carrier movement. Consequently, an effect of suppressing the failure of carrier movement at an interface between the charge generating layer and the charge transporting layer, the effect being produced by the uniform arrangement of the charge transport material provided by the polycarbonate resin having the structure according to an embodiment, is believed to be not sufficiently produced.

A polycarbonate resin having the structural unit represented by the formula (3-1) and the structural unit represented by the formula (3-2) is synthesized by, for example, either of the following two methods.

The first method is a method (phosgene method) in which a bisphenol compound represented by formula (3-1)' and a bisphenol compound represented by formula (3-2)' are directly caused to react with phosgene.

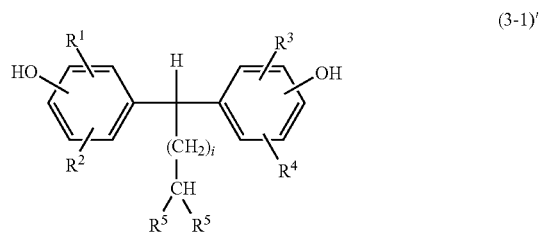

(3-1)'

In the formula (3-1)', $R^1$ to $R^4$ each independently represent a hydrogen atom, an alkyl group, an aryl group, or an alkoxy group; $R^5$ represents a substituted or unsubstituted alkyl group having 1 to 9 carbon atoms; and i represents an integer of 0 to 3, where when i is 0, a single bond is given. Specific Examples of the Bisphenol Compound represented by the formula (3-1)' include 1,1-bis(4-hydroxyphenyl)-3-methylbutane and 1,1-bis(4-hydroxyphenyl)-2-methylpropane.

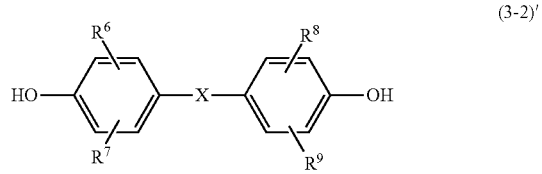

(3-2)'

In the formula (3-2)', $R^6$ to $R^9$ each independently represent a hydrogen atom, an alkyl group, an aryl group, or an alkoxy group, and X represents an oxygen atom or a sulfur atom.

Specific examples of the bisphenol compound represented by the formula (3-2)' include bis(4-hydroxyphenyl) ether, bis(3-methyl-4-hydroxyphenyl) ether, bis(3,5-dimethyl-4- hydroxyphenyl) ether, bis(3-methoxy-4-hydroxyphenyl) ether, and bis(4-hydroxyphenyl) sulfide.

The second method is a method (transesterification method) in which the above-described at least two bisphenol compounds are subjected to transesterification with a bisaryl carbonate such as diphenyl carbonate, di-p-tolyl carbonate, phenyl-p-tolyl carbonate, di-p-chlorophenyl carbonate, or dinaphthyl carbonate.

In the phosgene method, the above-described at least two bisphenol compounds are normally caused to react with phosgene in the presence of an acid-binding agent and a solvent. Examples of the acid-binding agent used herein include pyridine and alkali metal hydroxides such as potassium hydroxide and sodium hydroxide. Examples of the solvent include methylene chloride and chloroform. To promote the condensation polymerization reaction, a catalyst or a molecular weight modifier may be further added. Examples of the catalyst include tertiary amines such as triethylamine and quaternary ammonium salts. Examples of the molecular weight modifier include monofunctional compounds such as phenol, p-cumylphenol, t-butylphenol, and long-chain-alkyl-substituted phenols.

When a polycarbonate resin is synthesized, an antioxidant such as sodium sulfite or hydrosulfite or a branching agent such as phloroglucin or isatinbisphenol may be used. The reaction temperature at which the polycarbonate resin is synthesized is preferably 0° C. to 150° C. and more preferably 5° C. to 40° C. The reaction time is dependent on the reaction temperature, and is preferably 0.5 minutes to 10 hours and more preferably 1 minute to 2 hours. During the reaction, the pH in the reaction system can be particularly set to 10 or more.

The polycarbonate resin having the structural unit represented by the formula (3-1) and the structural unit represented by the formula (3-2) may further have structural units other than the structural unit represented by the formula (3-1) and the structural unit represented by the formula (3-2) for the purpose of improving the storage stability of a coating solution for charge transporting layers. Examples of the other structural units include structural units represented by formulae (3-3) to (3-5) below.

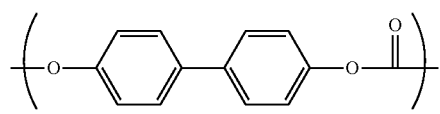
(3-3)

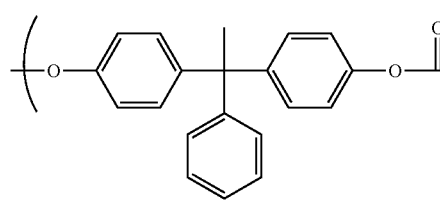
(3-4)

(3-5)

The content of the structural unit represented by the formula (3-1) in the polycarbonate resin is preferably 25 mol % or more and 70 mol % or less and more preferably 30 mol % or more and 60 mol % or less. The total content of the structural unit represented by the formula (3-1) and the structural unit represented by the formula (3-2) is preferably 70 mol % or more and more preferably 80 mol % or more.

The viscosity-average molecular weight (Mv) of the polycarbonate resin is preferably 30,000 or more and 80,000 or less and more preferably 40,000 or more and 70,000 or less. If the viscosity-average molecular weight of the polycarbonate resin is less than 30,000, the mechanical strength is low and the effect of suppressing endurance potential variation is sometimes not sufficiently produced. If the viscosity-average molecular weight of the polycarbonate resin is more than 80,000, sufficient storage stability and coatability of the coating solution for charge transporting layers are sometimes not achieved. The weight-average molecular weight (Mw) of the polycarbonate resin is preferably 30,000 or more and 110,000 or less and more preferably 40,000 or more and 90,000 or less.

The limiting viscosity of the polycarbonate resin can be particularly set to 0.3 dL/g to 2.0 dL/g.

The content of the charge transport material (described below) in the charge transporting layer is preferably 0.3 times or more and 0.7 times or less and more preferably 0.4 times or more and 0.6 times or less the content of the polycarbonate resin.

Specific Examples of Structural Unit Represented by Formula (3-1)

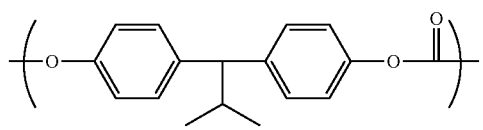
(3-1-1)

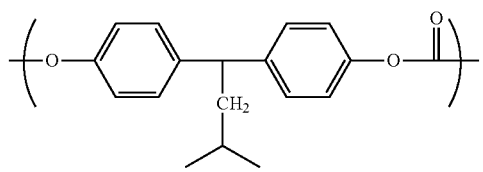
(3-1-2)

(3-1-3)

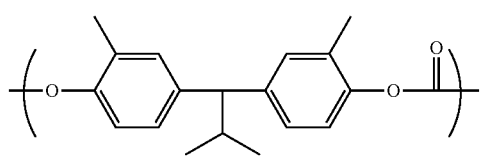
(3-1-4)

-continued

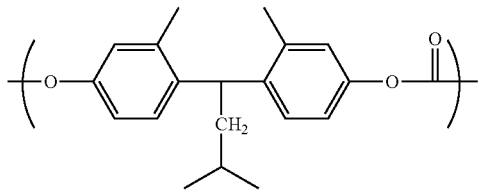
(3-1-5)

Specific Examples of Structural Unit Represented by Formula (3-2)

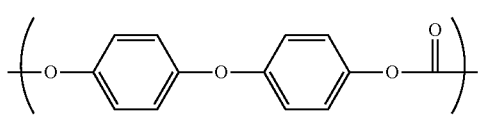
(3-2-1)

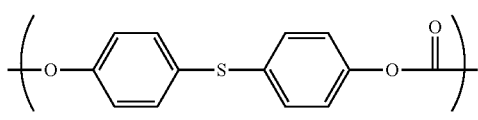
(3-2-2)

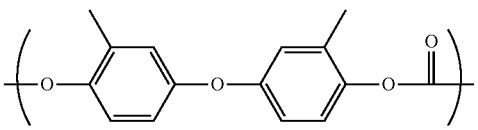
(3-2-3)

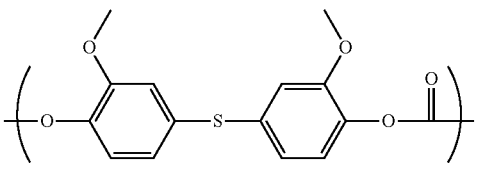
(3-2-4)

Specific Examples of Polycarbonate Resin

Table 3 shows the specific examples of the polycarbonate resin.

TABLE 3

Structural units of resins and content of each structural unit in resin

| Resin No. | Formula (3-1) Type | Content in resin (mol %) | Formula (3-2) Type | Content in resin (mol %) | Resin No. | Formula (3-1) Type | Content in resin (mol %) | Formula (3-2) Type | Content in resin (mol %) | Others Type | Content in resin (mol %) |
|---|---|---|---|---|---|---|---|---|---|---|---|
| Resin III-1 | (3-1-1) | 50 | (3-2-1) | 50 | Resin III-56 | (3-1-2) | 50 | (3-2-3) | 50 | — | — |
| Resin III-2 | (3-1-1) | 80 | (3-2-1) | 20 | Resin III-57 | (3-1-2) | 80 | (3-2-3) | 20 | — | — |
| Resin III-3 | (3-1-1) | 70 | (3-2-1) | 30 | Resin III-58 | (3-1-2) | 70 | (3-2-3) | 30 | — | — |
| Resin III-4 | (3-1-1) | 30 | (3-2-1) | 70 | Resin III-59 | (3-1-2) | 30 | (3-2-3) | 70 | — | — |
| Resin III-5 | (3-1-1) | 20 | (3-2-1) | 80 | Resin III-60 | (3-1-2) | 20 | (3-2-3) | 80 | — | — |
| Resin III-6 | (3-1-2) | 50 | (3-2-1) | 50 | Resin III-61 | (3-1-3) | 50 | (3-2-3) | 50 | — | — |
| Resin III-7 | (3-1-2) | 80 | (3-2-1) | 20 | Resin III-62 | (3-1-3) | 80 | (3-2-3) | 20 | — | — |
| Resin III-8 | (3-1-2) | 70 | (3-2-1) | 30 | Resin III-63 | (3-1-3) | 70 | (3-2-3) | 30 | — | — |
| Resin III-9 | (3-1-2) | 30 | (3-2-1) | 70 | Resin III-64 | (3-1-3) | 30 | (3-2-3) | 70 | — | — |
| Resin III-10 | (3-1-2) | 20 | (3-2-1) | 80 | Resin III-65 | (3-1-3) | 20 | (3-2-3) | 80 | — | — |
| Resin III-11 | (3-1-3) | 50 | (3-2-1) | 50 | Resin III-66 | (3-1-4) | 50 | (3-2-3) | 50 | — | — |
| Resin III-12 | (3-1-3) | 80 | (3-2-1) | 20 | Resin III-67 | (3-1-4) | 80 | (3-2-3) | 20 | — | — |
| Resin III-13 | (3-1-3) | 70 | (3-2-1) | 30 | Resin III-68 | (3-1-4) | 70 | (3-2-3) | 30 | — | — |
| Resin III-14 | (3-1-3) | 30 | (3-2-1) | 70 | Resin III-69 | (3-1-4) | 30 | (3-2-3) | 70 | — | — |
| Resin III-15 | (3-1-3) | 20 | (3-2-1) | 80 | Resin III-70 | (3-1-4) | 20 | (3-2-3) | 80 | — | — |
| Resin III-16 | (3-1-4) | 50 | (3-2-1) | 50 | Resin III-71 | (3-1-5) | 50 | (3-2-3) | 50 | — | — |
| Resin III-17 | (3-1-4) | 80 | (3-2-1) | 20 | Resin III-72 | (3-1-5) | 80 | (3-2-3) | 20 | — | — |
| Resin III-18 | (3-1-4) | 70 | (3-2-1) | 30 | Resin III-73 | (3-1-5) | 70 | (3-2-3) | 30 | — | — |
| Resin III-19 | (3-1-4) | 30 | (3-2-1) | 70 | Resin III-74 | (3-1-5) | 30 | (3-2-3) | 70 | — | — |
| Resin III-20 | (3-1-4) | 20 | (3-2-1) | 80 | Resin III-75 | (3-1-5) | 20 | (3-2-3) | 80 | — | — |
| Resin III-21 | (3-1-5) | 50 | (3-2-1) | 50 | Resin III-76 | (3-1-1) | 50 | (3-2-4) | 50 | — | — |
| Resin III-22 | (3-1-5) | 80 | (3-2-1) | 20 | Resin III-77 | (3-1-1) | 80 | (3-2-4) | 20 | — | — |
| Resin III-23 | (3-1-5) | 70 | (3-2-1) | 30 | Resin III-78 | (3-1-1) | 70 | (3-2-4) | 30 | — | — |
| Resin III-24 | (3-1-5) | 30 | (3-2-1) | 70 | Resin III-79 | (3-1-1) | 30 | (3-2-4) | 70 | — | — |
| Resin III-25 | (3-1-5) | 20 | (3-2-1) | 80 | Resin III-80 | (3-1-1) | 20 | (3-2-4) | 80 | — | — |
| Resin III-26 | (3-1-1) | 50 | (3-2-2) | 50 | Resin III-81 | (3-1-2) | 50 | (3-2-4) | 50 | — | — |
| Resin III-27 | (3-1-1) | 80 | (3-2-2) | 20 | Resin III-82 | (3-1-2) | 80 | (3-2-4) | 20 | — | — |
| Resin III-28 | (3-1-1) | 70 | (3-2-2) | 30 | Resin III-83 | (3-1-2) | 70 | (3-2-4) | 30 | — | — |
| Resin III-29 | (3-1-1) | 30 | (3-2-2) | 70 | Resin III-84 | (3-1-2) | 30 | (3-2-4) | 70 | — | — |
| Resin III-30 | (3-1-1) | 20 | (3-2-2) | 80 | Resin III-85 | (3-1-2) | 20 | (3-2-4) | 80 | — | — |
| Resin III-31 | (3-1-2) | 50 | (3-2-2) | 50 | Resin III-86 | (3-1-3) | 50 | (3-2-4) | 50 | — | — |
| Resin III-32 | (3-1-2) | 80 | (3-2-2) | 20 | Resin III-87 | (3-1-3) | 80 | (3-2-4) | 20 | — | — |
| Resin III-33 | (3-1-2) | 70 | (3-2-2) | 30 | Resin III-88 | (3-1-3) | 70 | (3-2-4) | 30 | — | — |
| Resin III-34 | (3-1-2) | 30 | (3-2-2) | 70 | Resin III-89 | (3-1-3) | 30 | (3-2-4) | 70 | — | — |
| Resin III-35 | (3-1-2) | 20 | (3-2-2) | 80 | Resin III-90 | (3-1-3) | 20 | (3-2-4) | 80 | — | — |
| Resin III-36 | (3-1-3) | 50 | (3-2-2) | 50 | Resin III-91 | (3-1-4) | 50 | (3-2-4) | 50 | — | — |

TABLE 3-continued

Structural units of resins and content of each structural unit in resin

| Resin No. | Formula (3-1) Type | Content in resin (mol %) | Formula (3-2) Type | Content in resin (mol %) | Resin No. | Formula (3-1) Type | Content in resin (mol %) | Formula (3-2) Type | Content in resin (mol %) | Others Type | Content in resin (mol %) |
|---|---|---|---|---|---|---|---|---|---|---|---|
| Resin III-37 | (3-1-3) | 80 | (3-2-2) | 20 | Resin III-92 | (3-1-4) | 80 | (3-2-4) | 20 | — | — |
| Resin III-38 | (3-1-3) | 70 | (3-2-2) | 30 | Resin III-93 | (3-1-4) | 70 | (3-2-4) | 30 | — | — |
| Resin III-39 | (3-1-3) | 30 | (3-2-2) | 70 | Resin III-94 | (3-1-4) | 30 | (3-2-4) | 70 | — | — |
| Resin III-40 | (3-1-3) | 20 | (3-2-2) | 80 | Resin III-95 | (3-1-4) | 20 | (3-2-4) | 80 | — | — |
| Resin III-41 | (3-1-4) | 50 | (3-2-2) | 50 | Resin III-96 | (3-1-5) | 50 | (3-2-4) | 50 | — | — |
| Resin III-42 | (3-1-4) | 80 | (3-2-2) | 20 | Resin III-97 | (3-1-5) | 80 | (3-2-4) | 20 | — | — |
| Resin III-43 | (3-1-4) | 70 | (3-2-2) | 30 | Resin III-98 | (3-1-5) | 70 | (3-2-4) | 30 | — | — |
| Resin III-44 | (3-1-4) | 30 | (3-2-2) | 70 | Resin III-99 | (3-1-5) | 30 | (3-2-4) | 70 | — | — |
| Resin III-45 | (3-1-4) | 20 | (3-2-2) | 80 | Resin III-100 | (3-1-5) | 20 | (3-2-4) | 80 | — | — |
| Resin III-46 | (3-1-5) | 50 | (3-2-2) | 50 | Resin III-101 | (3-1-1) | 40 | (3-2-1) | 40 | (3-3) | 20 |
| Resin III-47 | (3-1-5) | 80 | (3-2-2) | 20 | Resin III-102 | (3-1-1) | 50 | (3-2-1) | 30 | (3-3) | 20 |
| Resin III-48 | (3-1-5) | 70 | (3-2-2) | 30 | Resin III-103 | (3-1-1) | 30 | (3-2-1) | 50 | (3-3) | 20 |
| Resin III-49 | (3-1-5) | 30 | (3-2-2) | 70 | Resin III-104 | (3-1-1) | 40 | (3-2-1) | 40 | (3-4) | 20 |
| Resin III-50 | (3-1-5) | 20 | (3-2-2) | 80 | Resin III-105 | (3-1-1) | 30 | (3-2-1) | 50 | (3-4) | 20 |
| Resin III-51 | (3-1-1) | 50 | (3-2-3) | 50 | Resin III-106 | (3-1-1) | 50 | (3-2-1) | 30 | (3-4) | 20 |
| Resin III-52 | (3-1-1) | 80 | (3-2-3) | 20 | Resin III-107 | (3-1-1) | 10 | (3-2-1) | 50 | (3-5) | 40 |
| Resin III-53 | (3-1-1) | 70 | (3-2-3) | 30 | Resin III-108 | (3-1-1) | 20 | (3-2-1) | 50 | (3-5) | 30 |
| Resin III-54 | (3-1-1) | 30 | (3-2-3) | 70 | Resin III-109 | (3-1-1) | 30 | (3-2-1) | 40 | (3-5) | 30 |
| Resin III-55 | (3-1-1) | 20 | (3-2-3) | 80 | Resin III-110 | (3-1-1) | 20 | (3-2-1) | 40 | (3-5) | 40 |

Method for Synthesizing Polycarbonate Resin

A method for synthesizing Resin III-1 will be described below as an example. Other polycarbonate resins can be synthesized by, in the following method, appropriately changing the types of compounds serving as the structural units represented by the formula (3-1) and the formula (3-2) and the amounts of the compounds added. The viscosity-average molecular weight of the resins can be adjusted by appropriately changing the amount of a molecular weight modifier added.

In 1100 ml of a 5 mass % aqueous sodium hydroxide solution, 48.5 g (0.200 mol) of 1,1-bis(4-hydroxyphenyl)-2-methylpropane (product code 131-11331 manufactured by Wako Pure Chemical Industries, Ltd.) serving as a structural unit represented by formula (3-1-1), 40.4 g (0.200 mol) of bis(4-hydroxyphenyl) ether (product code D2121 manufactured by Tokyo Chemical Industry Co., Ltd.) serving as a structural unit represented by formula (3-2-1), and 0.1 g of hydrosulfite were dissolved. To the resulting mixture, 500 ml of methylene chloride was added. Then, 60 g of phosgene was blown into the mixture under stirring over 60 minutes while the temperature was kept at 15° C. After the blowing of the phosgene, 1.3 g of p-t-butylphenol (product code B0383 manufactured by Tokyo Chemical Industry Co., Ltd.) serving as a molecular weight modifier was added thereto and stirred to emulsify the reaction liquid. After the emulsification, 0.4 ml of triethylamine was added, and polymerization was performed under stirring at 23° C. for 1 hour. After the completion of the polymerization, the reaction liquid was separated into an aqueous phase and an organic phase. The organic phase was neutralized with phosphoric acid and repeatedly washed with water until the conductivity of the washing (aqueous phase) reached 10 μS/cm or less. The resulting polymer solution was added dropwise to warm water kept at 45° C., and the solvent was removed by evaporation to obtain a white powdery precipitate. The obtained precipitate was filtered and dried at 110° C. for 24 hours to obtain a polycarbonate resin.

The obtained polycarbonate resin was analyzed by infrared absorption spectroscopy. The spectrum had an absorption peak attributable to a carbonyl group around 1770 cm$^{-1}$ and an absorption peak attributable to an ether bond around 1240 cm$^{-1}$, which showed the presence of a polycarbonate resin.

(IV) Fourth Embodiment

Structure of Polycarbonate Resin

As a result of studies conducted by the present inventors, they have found that high wear resistance and a good effect of suppressing photomemory are achieved by using an electrophotographic photosensitive member including a charge transporting layer containing a particular polycarbonate resin. Specifically, the charge transporting layer contains a polycarbonate resin (iv) having a structural unit represented by formula (4-1) and a structural unit represented by formula (4-2).

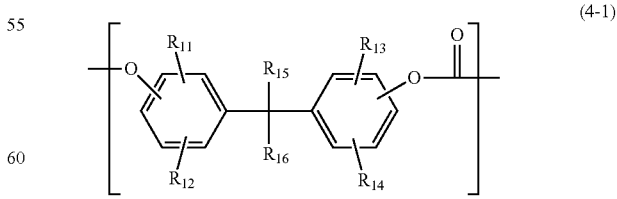

(4-1)

In the formula (4-1), $R^{11}$ to $R^{15}$ each independently represent a hydrogen atom, a methyl group, an ethyl group, or a phenyl group, and $R^{16}$ represents a linear alkyl group having 6 to 15 carbon atoms.

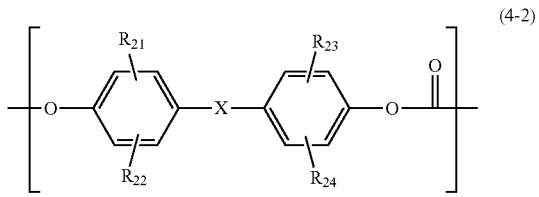

(4-2)

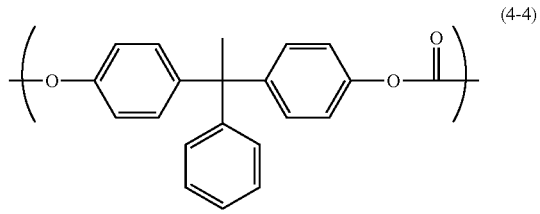

(4-4)

In the formula (4-2), $R^{21}$ to $R^{24}$ each independently represent a hydrogen atom, a methyl group, an ethyl group, or a phenyl group, and X represents an oxygen atom, a sulfur atom, a single bond, or a sulfonyl group.

The polycarbonate resin having the structural unit represented by the formula (4-2) has high mechanical strength, but easily causes aggregation of a charge transport material. Therefore, if the copolymerization ratio of the structural unit represented by the formula (4-2) is increased to improve the mechanical strength, the charge transport material aggregates and failure of carrier movement occurs, which easily causes photomemory. The polycarbonate resin according to an embodiment has the structural unit represented by the formula (4-1) and thus the linear alkyl group suppresses the aggregation of the charge transport material. Consequently, it is believed that both of high wear resistance and a good effect of suppressing photomemory can be achieved even when the copolymerization ratio of the structural unit represented by the formula (4-2) is increased. To produce these effects, the number of carbon atoms of the linear alkyl group is preferably 6 to 15 and more preferably 8 to 12. If the number of carbon atoms is small, the aggregation of the charge transport material cannot be suppressed. If the number of carbon atoms is excessively large, the alkyl group itself causes steric hindrance and an effect of suppressing the aggregation of the charge transport material is believed to be not produced.

From the above viewpoint, in the formula (4-1), preferably, $R^{11}$ to $R^{15}$ represent a hydrogen atom and $R^{16}$ represents a linear alkyl group having 8 to 12 carbon atoms. In the formula (4-2), preferably, $R^{21}$ to $R^{24}$ represent a hydrogen atom and X represents an oxygen atom.

The content of the structural unit represented by the formula (4-2) in the polycarbonate resin is preferably 20 to 80 mol % and more preferably 50 mol % or more and 80 mol % or less. In this range, both of high wear resistance and a good effect of suppressing photomemory can be achieved.

The polycarbonate resin having the structural unit represented by the formula (4-1) and the structural unit represented by the formula (4-2) may further have structural units other than the structural units represented by the formulae (4-1) and (4-2) for the purpose of improving the storage stability of a coating solution for charge transporting layers. Examples of the other structural units include structural units represented by formulae (4-3) and (4-4) below.

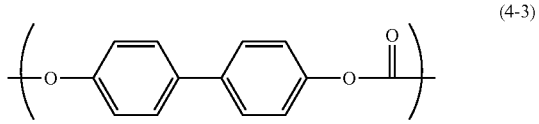

(4-3)

The viscosity-average molecular weight (Mv) of the polycarbonate resin according to an embodiment is preferably 30,000 or more and 80,000 or less and more preferably 40,000 or more and 70,000 or less. If the viscosity-average molecular weight of the polycarbonate resin is less than 30,000, the wear resistance may deteriorate. If the viscosity-average molecular weight of the polycarbonate resin is more than 80,000, a coating solution for charge transporting layers may have insufficient storage stability. The weight-average molecular weight (Mw) of the polycarbonate resin is preferably 30,000 or more and 110,000 or less and more preferably 40,000 or more and 90,000 or less.

The limiting viscosity of the polycarbonate resin can be particularly set to 0.3 dL/g to 2.0 dL/g.

The content of the charge transport material (described below) in the charge transporting layer is preferably 0.3 times or more and 1.2 times or less and more preferably 0.3 times or more and 0.6 times or less the content of the polycarbonate resin.

The number of moles of the structural unit represented by the formula (4-1) in the polycarbonate resin can be particularly set to 0.2 times or more and 7.0 times or less the number of moles of the charge transport material. In this range, high wear resistance and a good effect of suppressing photomemory can be achieved.

Specific Examples of Structural Unit Represented by Formula (4-1)

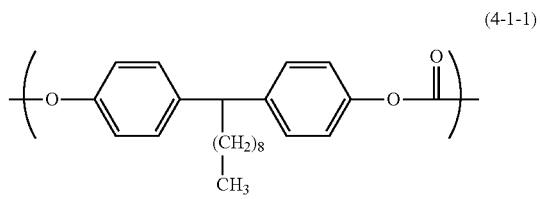

(4-1-1)

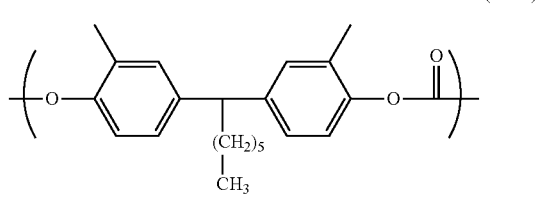

(4-1-2)

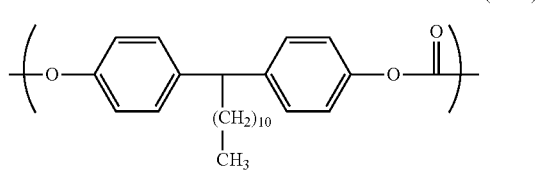

(4-1-3)

(4-1-4)

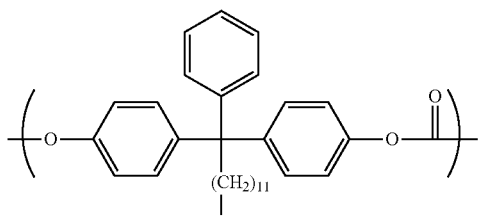

(4-1-5)

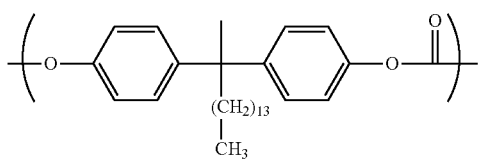

Specific Examples of Structural Unit Represented by Formula (4-2)

(4-2-1)

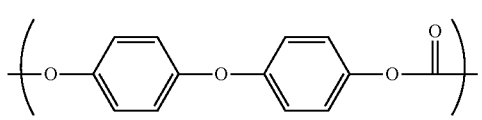

(4-2-2)

(4-2-3)

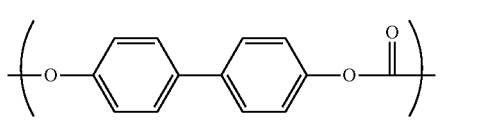

(4-2-4)

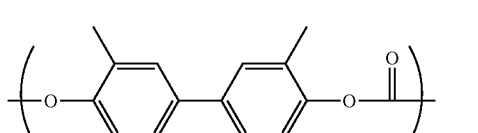

(4-2-5)

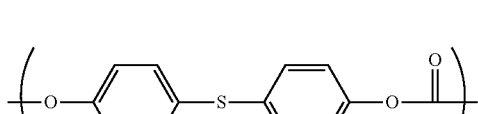

(4-2-6)

(4-2-7)

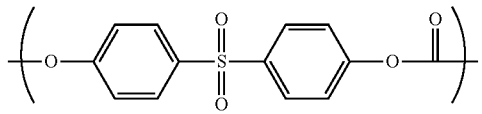

(4-2-8)

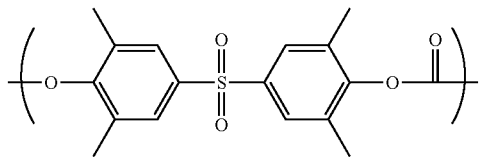

Specific Examples of Polycarbonate Resin

Table 4 shows the specific examples of the polycarbonate resin.

TABLE 4

Structural units of resins and content of each structural unit in resin

| | Formula (4-1) | | Formula (4-2) | | Others | |
|---|---|---|---|---|---|---|
| Resin No. | Type | Content in resin (mol %) | Type | Content in resin (mol %) | Type | Content in resin (mol %) |
| Resin IV-1 | (4-1-1) | 30 | (4-2-1) | 70 | — | 0 |
| Resin IV-2 | (4-1-1) | 50 | (4-2-1) | 50 | — | 0 |
| Resin IV-3 | (4-1-1) | 20 | (4-2-1) | 80 | — | 0 |
| Resin IV-4 | (4-1-1) | 40 | (4-2-3) | 60 | — | 0 |
| Resin IV-5 | (4-1-1) | 50 | (4-2-5) | 50 | — | 0 |
| Resin IV-6 | (4-1-1) | 50 | (4-2-7) | 50 | — | 0 |
| Resin IV-7 | (4-1-2) | 40 | (4-2-1) | 60 | — | 0 |
| Resin IV-8 | (4-1-5) | 20 | (4-2-1) | 80 | — | 0 |
| Resin IV-9 | (4-1-1) | 60 | (4-2-1) | 40 | — | 0 |
| Resin IV-10 | (4-1-1) | 10 | (4-2-1) | 90 | — | 0 |
| Resin IV-11 | (4-1-4) | 20 | (4-2-6) | 80 | — | 0 |
| Resin IV-12 | (4-1-2) | 80 | (4-2-3) | 20 | — | 0 |
| Resin IV-13 | (4-1-1) | 50 | (4-2-1) | 30 | (4-4) | 20 |

Method for Synthesizing Polycarbonate Resin

A method for synthesizing Resin IV-1 by a phosgene method will be described below as an example. Other polycarbonate resins can be synthesized by, in the following method, appropriately changing the types of compounds serving as the structural units represented by the formula (4-1) and the formula (4-2) and the amounts of the compounds added. The viscosity-average molecular weight of the resins can be adjusted by appropriately changing the amount of a molecular weight modifier added. Alternatively, the polycarbonate resin according to an embodiment may be synthesized by a transesterification method.

In 1100 ml of a 5 mass % aqueous sodium hydroxide solution, 39.1 g (0.12 mol) of 1,1-bis(4-hydroxyphenyl) decane derived from decanal (product code 049-21535 manufactured by Wako Pure Chemical Industries, Ltd.) and serving as a structural unit represented by formula (4-1-1), 56.6 g (0.28 mol) of bis(4-hydroxyphenyl) ether (product code D2121 manufactured by Tokyo Chemical Industry Co., Ltd.) serving as a structural unit represented by formula (4-2-1), and 0.1 g of hydrosulfite were dissolved. To the resulting mixture, 500 ml of methylene chloride was added. Then, 60 g of phosgene was blown into the mixture under stirring over 60 minutes while the temperature was kept at 15° C. After the blowing of the phosgene, 1.3 g of p-t-butylphenol (product code B0383 manufactured by Tokyo Chemical Industry Co., Ltd.) serving as a molecular weight modifier was added thereto and stirred to emulsify the reaction liquid. After the emulsification, 0.4 ml of triethylamine was added, and polymerization was performed under stirring at 23° C. for 1 hour. After the completion of the polymerization, the reaction liquid was separated into an aqueous phase and an organic phase. The organic phase was neutralized with phosphoric acid and repeatedly washed with water until the conductivity of the washing (aqueous phase) reached 10 μS/cm or less. The resulting polymer solution was added dropwise to warm water kept at 45° C., and the solvent was removed by evaporation to obtain a white powdery precipitate. The obtained precipitate was filtered and dried at 110° C. for 24 hours to obtain a polycarbonate resin.

The obtained polycarbonate resin was analyzed by infrared absorption spectroscopy. The spectrum had an absorption peak attributable to a carbonyl group around 1770 cm$^{-1}$ and an absorption peak attributable to an ether bond around 1240 cm$^{-1}$, which showed the presence of a polycarbonate resin. The viscosity-average molecular weight (Mv) of the obtained polycarbonate resin was 56,000 and the weight-average molecular weight (Mw) was 75,000.

Charge Transport Material

Examples of the charge transport material include triarylamine compounds, hydrazone compounds, stilbene compounds, pyrazoline compounds, oxazole compounds, thiazole compounds, and triallylmethane compounds. These compounds may be used in combination of two or more. Among them, triarylamine compounds can be particularly used.

The weight-average molecular weight of the charge transport material is preferably 300 or more and 1,000 or less and more preferably 600 or more and 800 or less from the viewpoint of improving electric characteristics and long-term storage stability.

Hereafter, specific examples of the charge transport material are shown with their general formulae and example compounds that satisfy the general formulae.

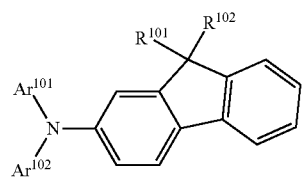
(CTM-1)

In the above formula, $Ar^{101}$ and $Ar^{102}$ each independently represent an aryl group that may have a substituent, and $R^{101}$ and $R^{102}$ each independently represent a hydrogen atom, an alkyl group, or an aryl group that may have a substituent. The substituent of the substituted aryl group is an alkyl group, an alkoxy group, or a halogen atom.

Example compounds of (CTM-1) are shown below. The oxidation potential of a compound (102) is 0.76 V.

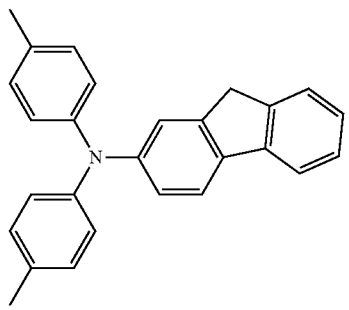
(101)

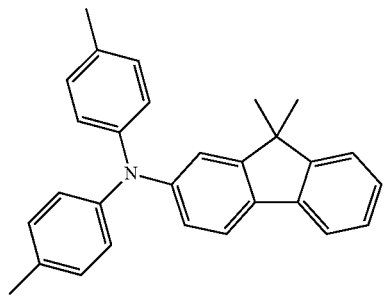
(102)

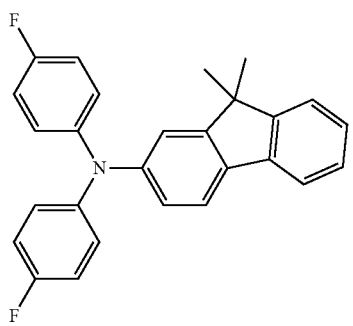
(103)

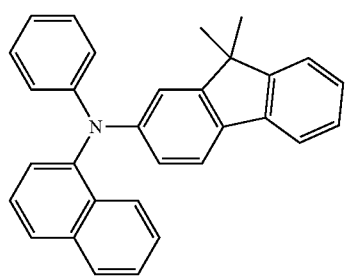
(104)

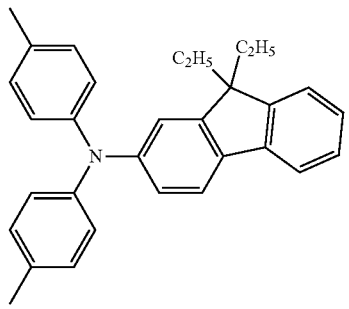
(105)

(106)

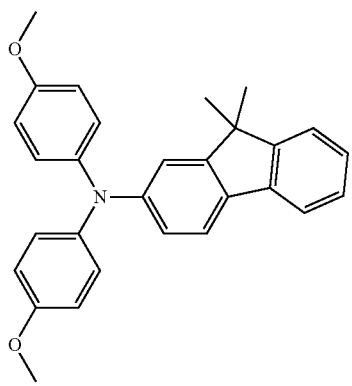

(107)

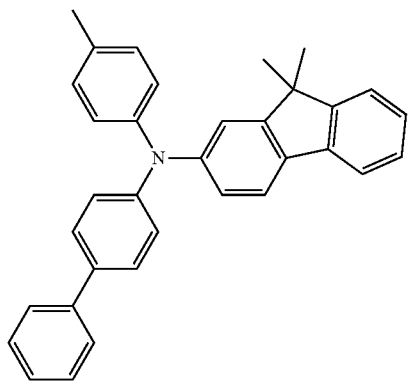

(108)

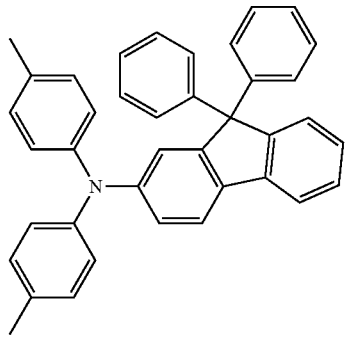

(CTM-2)

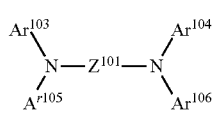

In the above formula, $Ar^{103}$ to $Ar^{106}$ each independently represent an aryl group that may have a substituent, and $Z^{101}$ represents an arylene group that may have a substituent or a divalent group formed by bonding a plurality of arylene groups through a vinylene group. Two adjacent substituents on $Ar^{103}$ to $Ar^{106}$ may be bonded to each other to form a ring. The substituents of the substituted aryl group and arylene group are each an alkyl group, an alkoxy group, or a halogen atom.

Example compounds of (CTM-2) are shown below. The oxidation potentials of a compound (201) and a compound (212) are 0.74 V and 0.72 V, respectively.

(201)

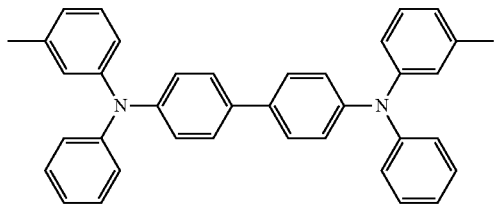

(202)

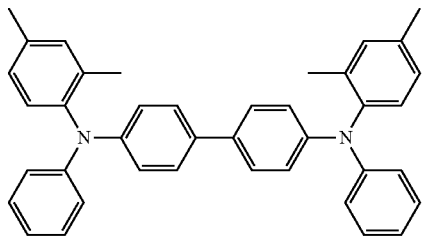

(203)

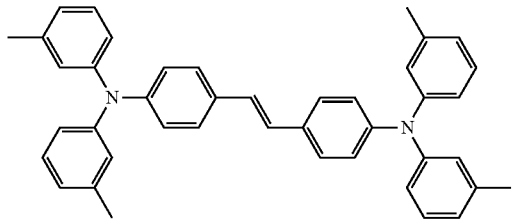

(204)

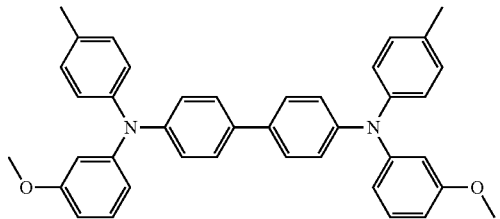

(205)

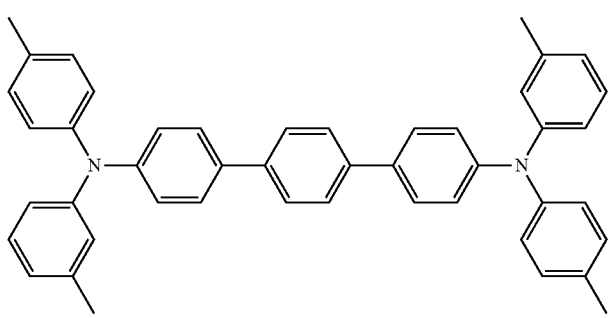

-continued
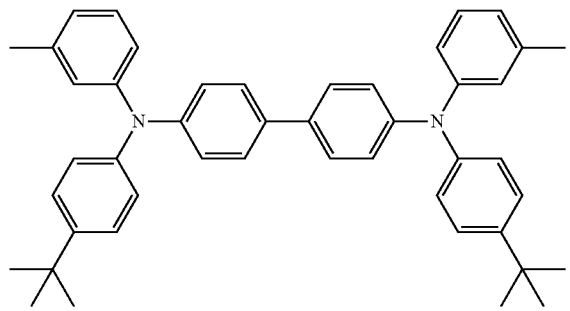
(206)
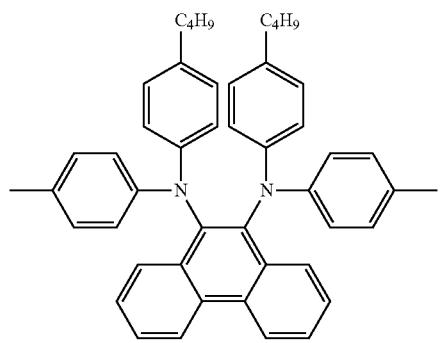
(207)
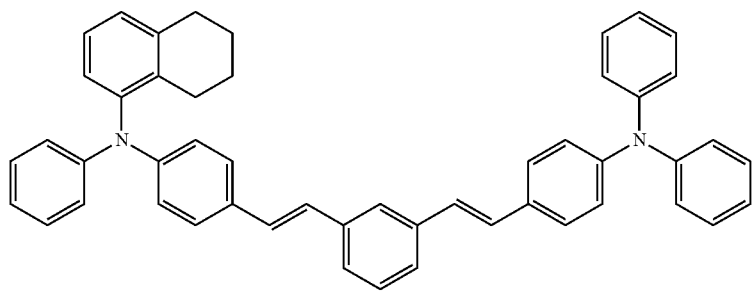
(208)
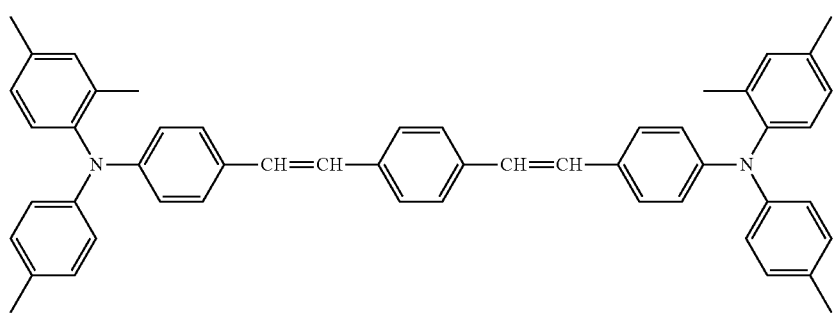
(209)
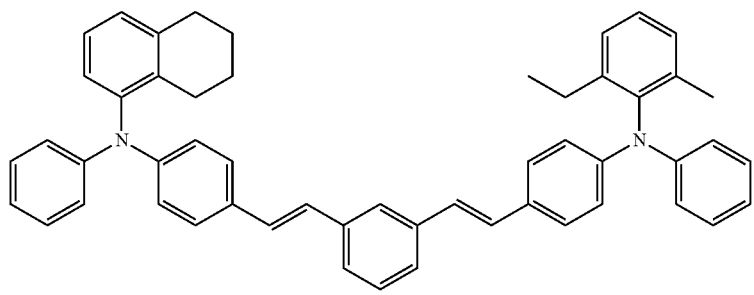
(210)

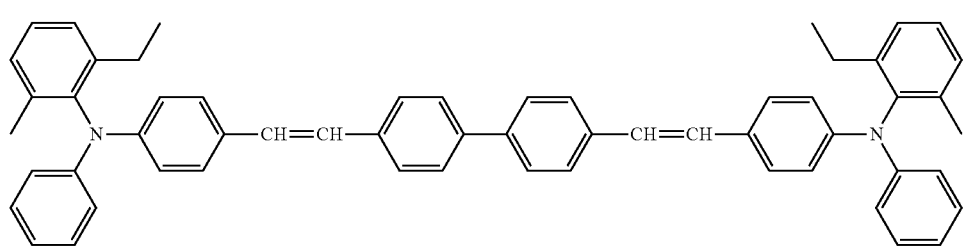

(211)

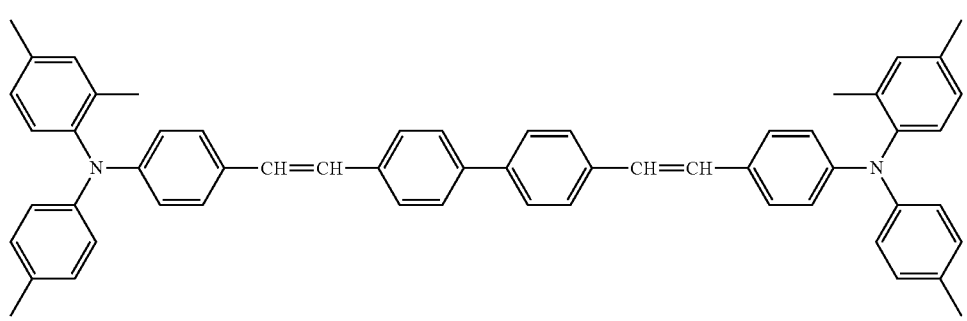

(212)

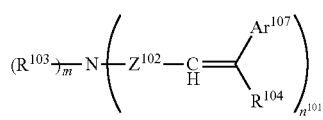

(CTM-3)

In the above formula, $R^{103}$ represents an alkyl group, a cycloalkyl group, or an aryl group that may have a substituent; $R^{104}$ represents a hydrogen atom, an alkyl group, or an aryl group that may have a substituent; $Ar^{107}$ represents an aryl group that may have a substituent; $Z^{102}$ represents an arylene group that may have a substituent; $n^{101}$ represents an integer of 1 to 3; and m represents an integer of 0 to 2, where $m+n^{101}=3$. When m represents 2, $R^{103}$ may be the same or different. Two adjacent substituents on $R^{103}$ may be bonded to each other to form a ring. $R^{103}$ and $Z^{102}$ may be bonded to each other to form a ring. $Ar^{107}$ and $R^{104}$ may be bonded to each other through a vinylene group to form a ring. The substituents of the substituted aryl group and arylene group are each an alkyl group, an alkoxy group, or a halogen atom.

Example compounds of (CTM-3) are shown below. The oxidation potentials of a compound (304) and a compound (305) are 0.76 V and 0.81 V, respectively.

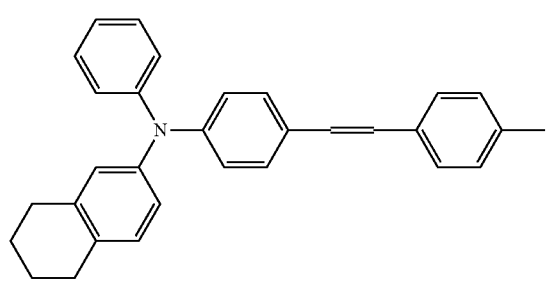

(301)

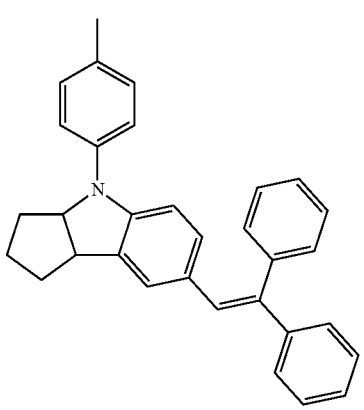

(302)

-continued
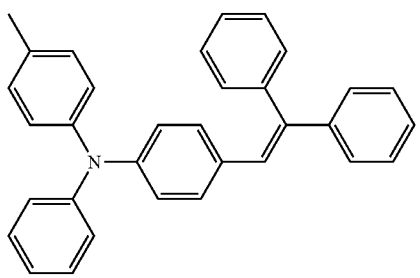
(303)
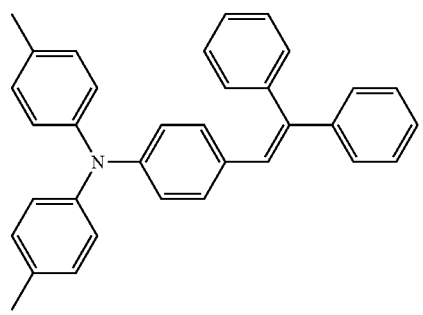
(304)
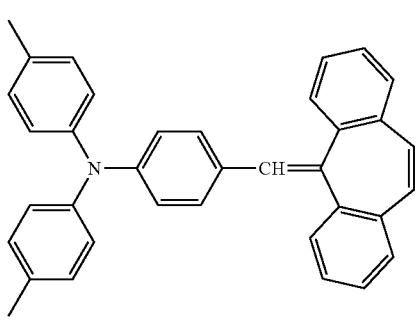
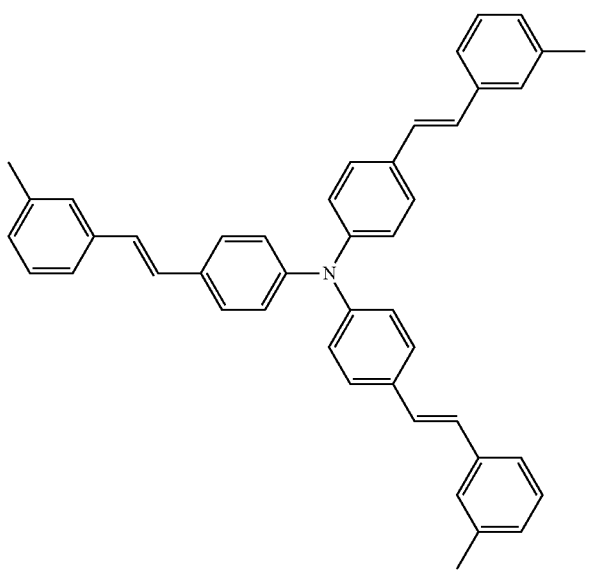
(305)
(306)
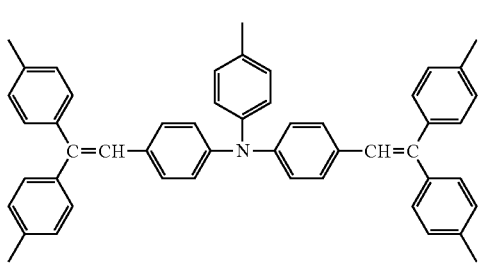
(307)
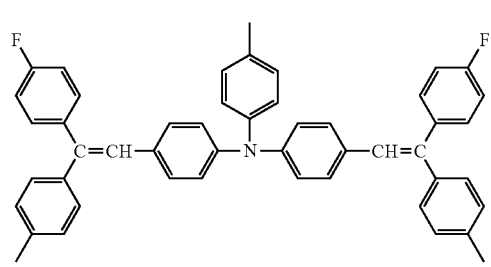
(308)

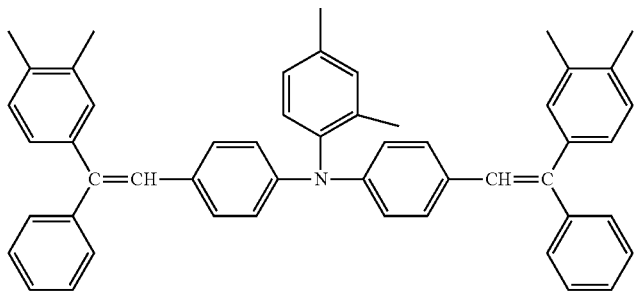

(309)

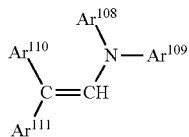

(CTM-4)

In the above formula, $Ar^{109}$ to $Ar^{111}$ each independently represent an aryl group that may have a substituent. The substituent of the substituted aryl group is an alkyl group, an alkoxy group, a halogen atom, or a 4-phenyl-buta-1,3-dienyl group.

Example compounds of (CTM-4) are shown below.

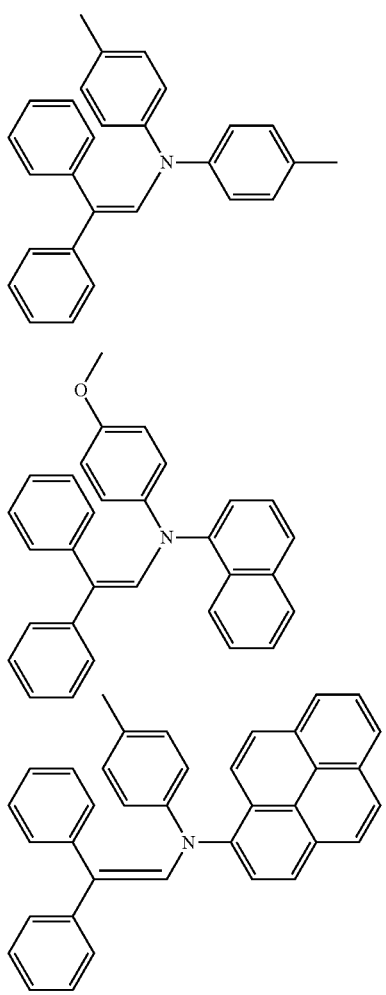

(401)

(402)

(403)

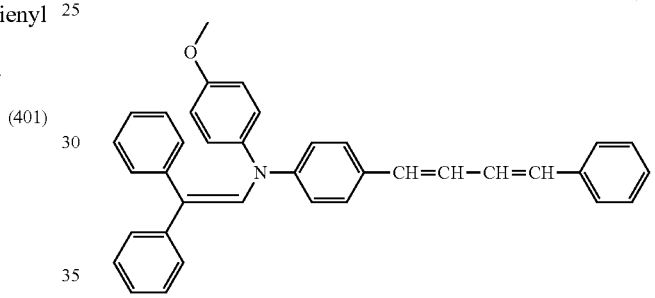

(404)

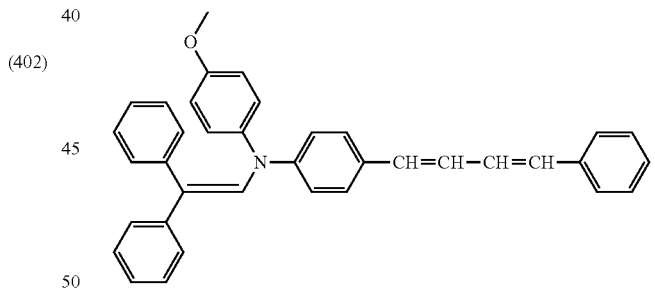

(405)

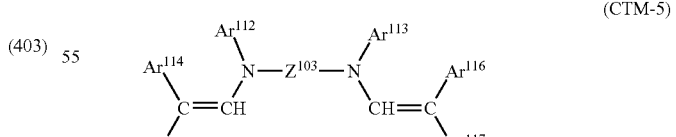

(CTM-5)

In the above formula, $Ar^{112}$ to $Ar^{117}$ each independently represent an aryl group that may have a substituent, and $Z^{103}$ represents a phenylene group, a biphenylene group, or a divalent group formed by bonding two phenylene groups through an alkylene group. The substituent of the substituted aryl group is an alkyl group, an alkoxy group, or a halogen atom.

Example compounds of (CTM-5) are shown below.

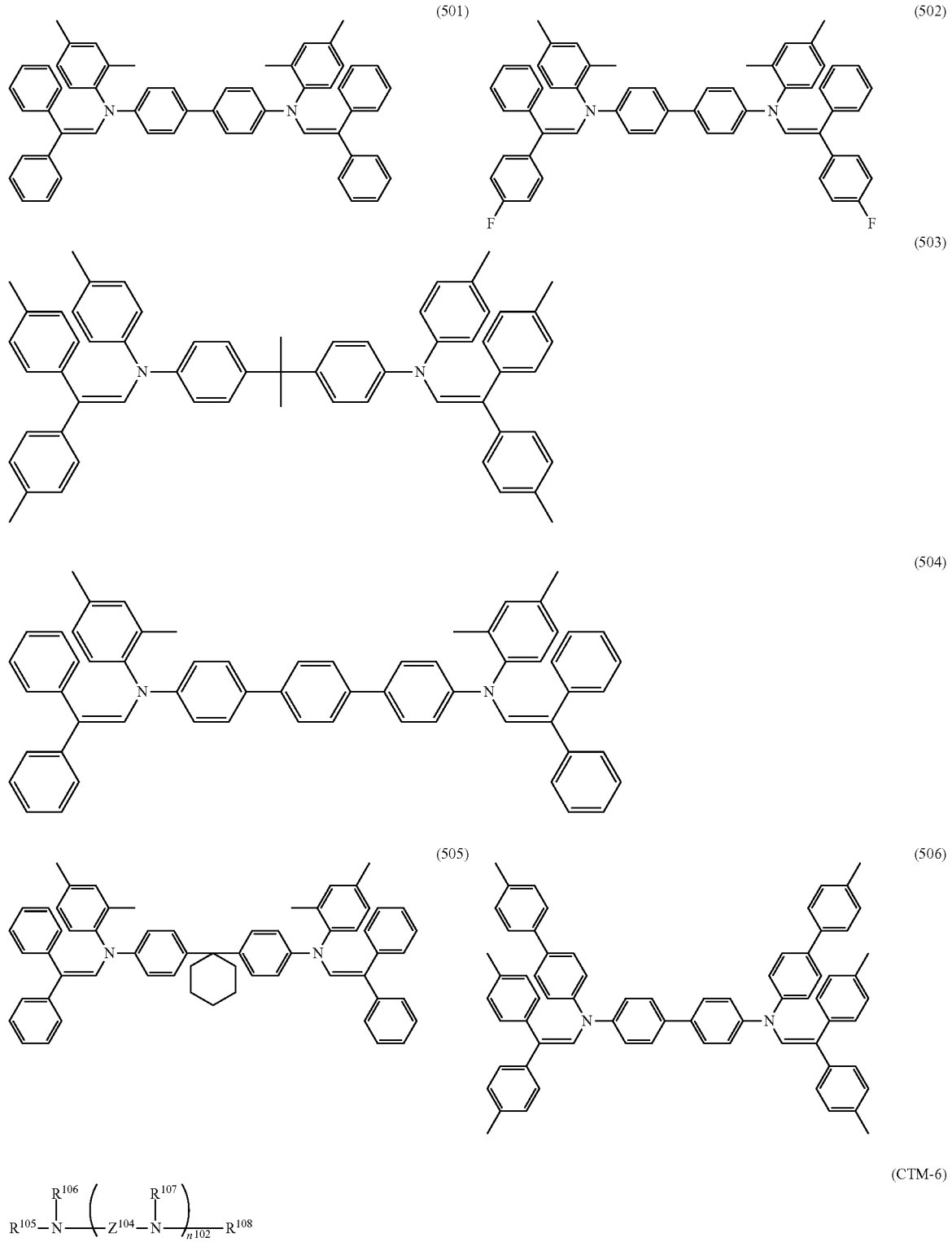

In the above formula, at least one of $R^{105}$ to $R^{108}$ represents a monovalent group represented by formula below, and the other each independently represent an alkyl group or an aryl group that may have a substituent; $Z^{104}$ represents an arylene group that may have a substituent or a divalent group formed by bonding a plurality of arylene groups through a vinylene group; and $n^{102}$ represents 0 or 1. The substituents of the substituted aryl group and arylene group are each an alkyl group, an alkoxy group, or a halogen atom.

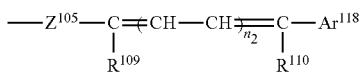

In the above formula, $R^{109}$ and $R^{110}$ each independently represent a hydrogen atom, an alkyl group, or an aryl group that may have a substituent; $Ar^{116}$ represents an aryl group that may have a substituent; $Z^{105}$ represents an arylene group that may have a substituent; and $n_2$ represents an integer of 1 to 3. The substituent of the substituted aryl group is an alkyl group, an alkoxy group, a dialkylamino group, or a diarylamino group. The substituent of the substituted arylene group is an alkyl group, an alkoxy group, or a halogen atom.

Example compounds of (CTM-6) are shown below. The oxidation potential of a compound (603) is 0.67 V.

(601)

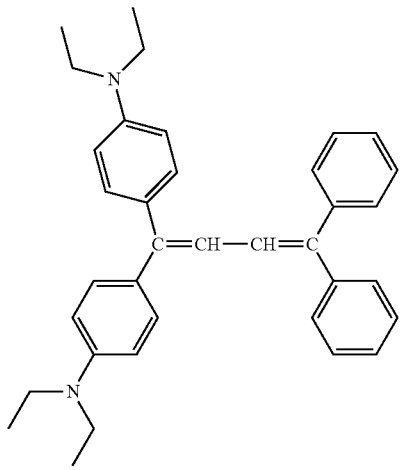

(602)

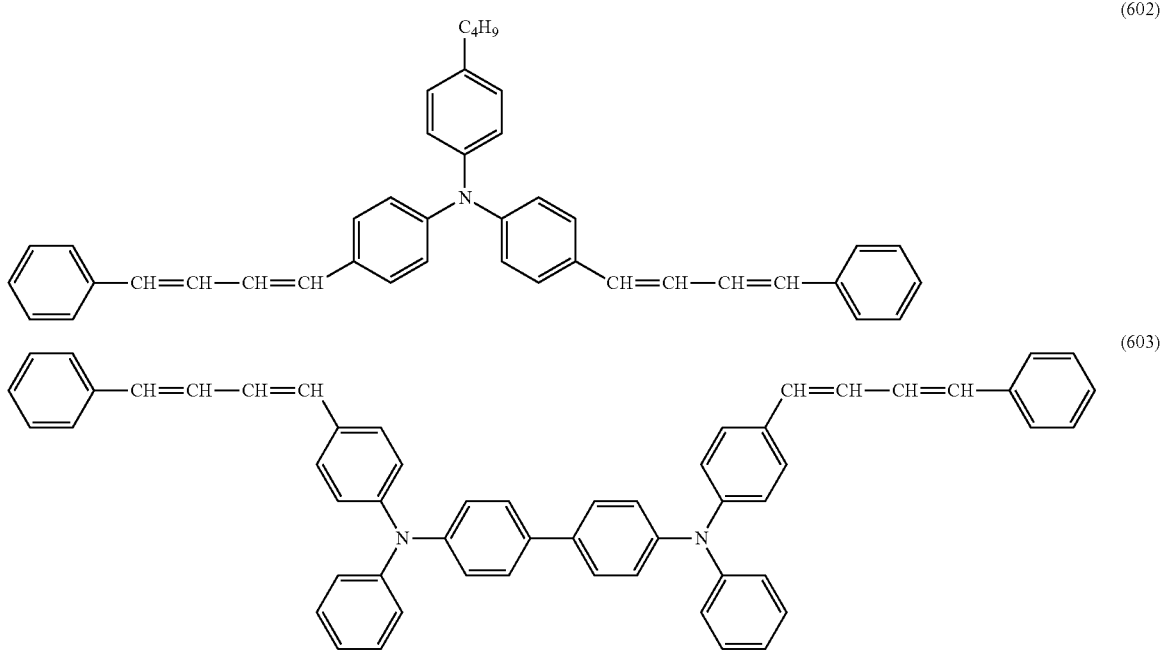

(603)

(604)

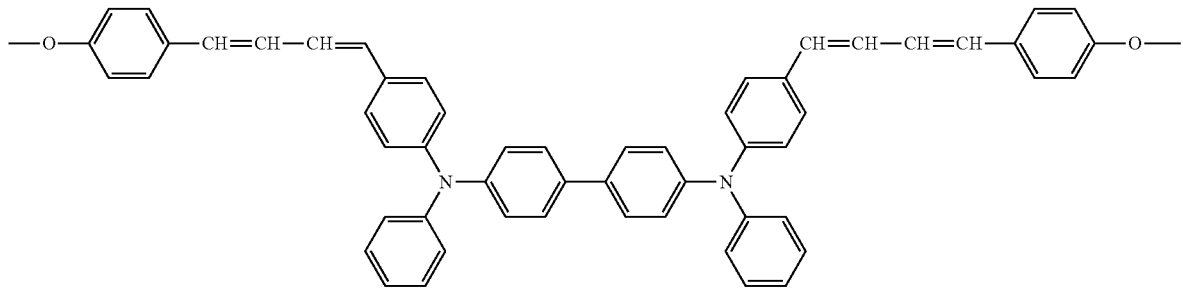

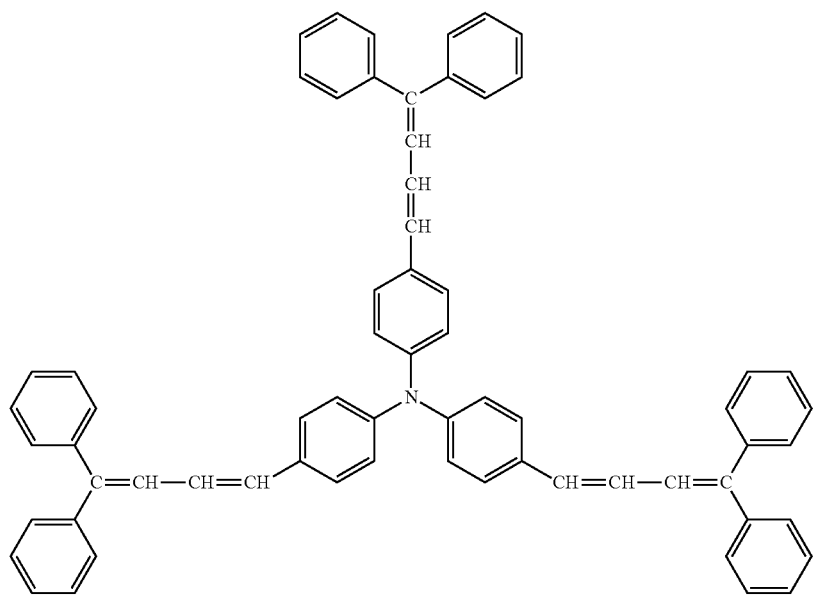
(605)

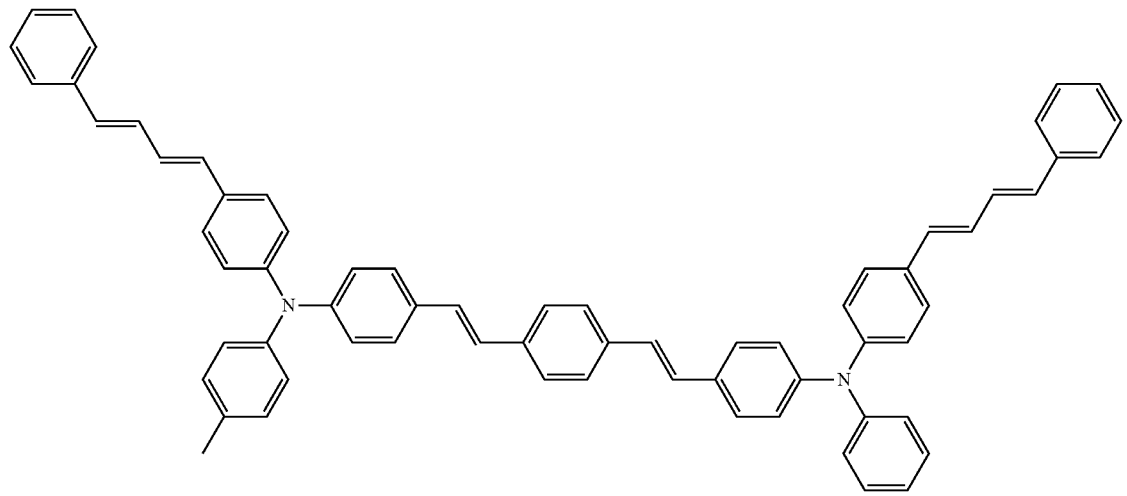
(606)

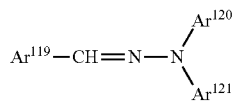
(CTM-7)

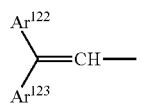
(7-1)

In the above formula, $Ar^{119}$ represents an aryl group that may have a substituent or a monovalent group represented by formula (7-1) or formula (7-2). $Ar^{120}$ and $Ar^{121}$ each independently represent an aryl group that may have a substituent. The substituent of the substituted aryl group is an alkyl group, an alkoxy group, or a halogen atom.

In the above formula, $Ar^{122}$ and $Ar^{123}$ each independently represent an aryl group that may have a substituent or an aralkyl group that may have a substituent. The substituents of the substituted aryl group and aralkyl group are each an alkyl group, an alkoxy group, or a halogen atom.

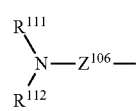
(7-2)

In the above formula, $R^{111}$ and $R^{112}$ each independently represent an aryl group that may have a substituent, and $Z^{106}$ represents an arylene group that may have a substituent. The substituents of the substituted aryl group and arylene group are each an alkyl group, an alkoxy group, or a halogen atom.

Example compounds of (CTM-7) are shown below.

(701) 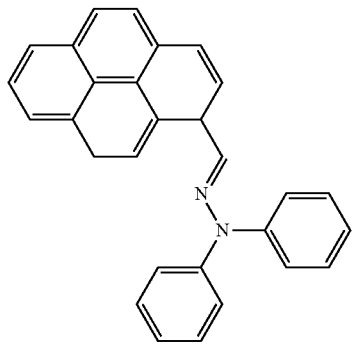

(702) 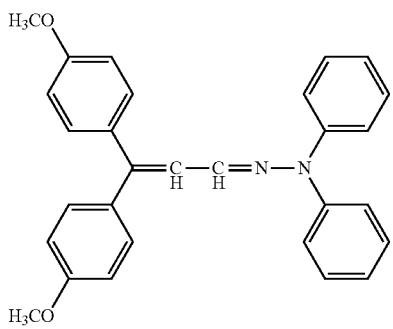

(703) 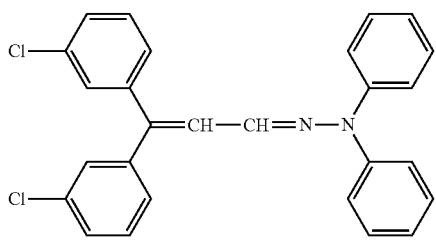

(704) 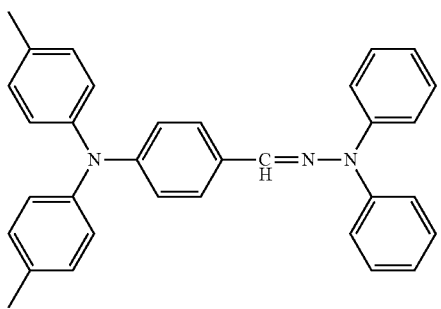

(705) 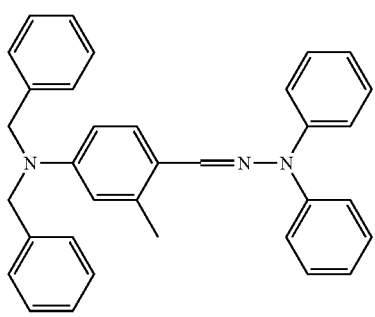

(706) 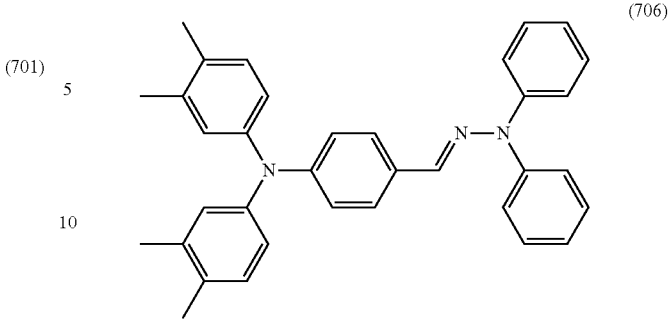

The oxidation potential of the charge transport material is preferably 0.80 V or less, and is more preferably 0.77 V or less from the viewpoint of electric characteristics. If the oxidation potential of the charge transport material is more than 0.80 V, failure of carrier movement is believed to occur at an interface between the charge generating layer and the charge transporting layer, and thus an effect of suppressing endurance potential variation is sometimes not sufficiently produced. The oxidation potential is measured as follows. The potential of a working electrode is swept with a potential sweeper using a saturated calomel electrode as a reference electrode and a 0.1 N $(n\text{-Bu})_4N^+ClO_4^-$ acetonitrile solution as an electrolyte. The potential at a peak position on the obtained current-potential curve is defined as an oxidation potential.

Specifically, a sample is dissolved in a 0.1 N $(n\text{-Bu})_4N^+ClO_4^-$ acetonitrile solution so as to have a concentration of 5 to 10 mmol %. Then, a voltage is applied to the sample solution, and the voltage is linearly changed from a low potential to measure a change in electric current. Thus, a current-potential curve is obtained. The potential at which an electric current reaches its peak value on the current-potential curve is defined as an oxidation potential.

The charge transporting layer may further contain additives such as a release agent for improving transfer efficiency of toner, an anti-fingerprint agent for suppressing soiling or the like, a filler for suppressing scraping, and a lubricant for improving lubricity. The lubricant can be particularly a resin having a siloxane structure. Specifically, the resin having a siloxane structure refers to a resin having a moiety below.

Siloxane Moiety

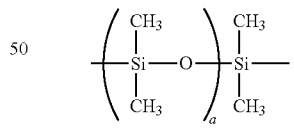

In the formula, a represents the numbers of repetitions of a structure inside the parentheses. The average of a in the resin having a siloxane structure can be particularly set to 20 or more and 200 or less.

When the resin having a siloxane structure is used, the content of the resin having a siloxane structure can be particularly set to 0.1 mass % or more and 30 mass % or less relative to the content of the polycarbonate resin. If the content is less than 0.1 mass %, the lubricant does not sufficiently work and sufficient crack resistance is sometimes not achieved. If the content is more than 30 mass %, the regular orientation of the polycarbonate resin may be disturbed, which may deteriorate the wear resistance. The content of the siloxane moiety can be determined by a typical analytical method. An example of the analytical method is described below. First, a charge transporting layer serving as a surface layer of an electrophotographic photosensitive member is dissolved in a solvent. Then, materials contained in the charge transporting layer serving as a surface layer are fractionated with a fractionation apparatus, such as a size exclusion chromatograph or a high-performance liquid chromatograph, capable of separately collecting components. The resin having a siloxane structure, which is the fractionated component, is subjected to $^1$H-NMR measurement. The structures and contents of constituent materials can be determined from the peak positions and the conversion of peak area ratios of hydrogen atoms (the hydrogen atoms of the resin). From these results, the numbers of repetitions and molar ratio of the siloxane moiety are calculated and converted into the content (mass ratio). Alternatively, the resin having a siloxane structure, which is the fractionated component, may be hydrolyzed in the presence of alkali to be separated into a carboxylic acid portion and a bisphenol portion. The obtained bisphenol portion is subjected to nuclear magnetic resonance spectroscopy or mass spectrometry. The numbers of repetitions and molar ratio of the siloxane moiety are calculated and converted into the content (mass ratio).

The charge transporting layer can be formed as follows. A coating solution for charge transporting layers is prepared by mixing a charge transport material and a polycarbonate resin with a solvent. The coating solution for charge transporting layers is applied to form a wet coating, and the wet coating is dried.

Examples of the solvent used for the coating solution for charge transporting layers include ketone solvents such as acetone, methyl ethyl ketone, methyl isobutyl ketone, and cyclohexanone; ester solvents such as methyl acetate and ethyl acetate; aromatic hydrocarbon solvents such as benzene, toluene, xylene, and chlorobenzene; hydrocarbon solvents substituted with a halogen atom, such as dichloromethane, dichloroethane, chloroform, and carbon tetrachloride; ethers such as dimethyl ether, diethyl ether, tetrahydrofuran, dioxane, dioxolane, dimethoxymethane, ethylene glycol dimethyl ether, and diethylene glycol dimethyl ether; and aprotic polar organic solvents such as N,N-dimethylformaldehyde, N,N-dimethylformamide, and dimethylsulfoxide. These solvents may be used in combination of two or more.

The thickness of the charge transporting layer is preferably 5 µm or more and 40 µm or less and more preferably 7 µm or more and 30 µm or less.

Process Cartridge and Electrophotographic Apparatus

FIG. 1 illustrates an example of a schematic structure of an electrophotographic apparatus that includes a process cartridge including the electrophotographic photosensitive member according to an embodiment.

A cylindrical (drum-shaped) electrophotographic photosensitive member 1 is rotated about a shaft 2 at a predetermined circumferential velocity (process speed) in a direction indicated by an arrow. In the rotation, the surface of the electrophotographic photosensitive member 1 is charged at a predetermined positive or negative potential by a charging device 3. The surface of the charged electrophotographic photosensitive member 1 is then irradiated with exposure light 4 emitted from an exposure device (not illustrated). Thus, an electrostatic latent image corresponding to intended image information is formed on the surface of the electrophotographic photosensitive member 1. The exposure light 4 is, for example, intensity-modulated light emitted from an exposure device such as a slit exposure device or a laser beam scanning exposure device, in response to the time-sequence electric digital pixel signals of the intended image information.

The electrostatic latent image formed on the surface of the electrophotographic photosensitive member 1 is developed (normal or reversal development) with toner contained in a developing device 5, and thus a toner image is formed on the surface of the electrophotographic photosensitive member 1. The toner image on the surface of the electrophotographic photosensitive member 1 is transferred onto a transfer medium 7 by a transfer device 6. Herein, a bias voltage having polarity opposite to the polarity of the electric charge of the toner is applied to the transfer device 6 from a bias power supply (not illustrated). When the transfer medium 7 is paper, the transfer medium 7 is discharged from a paper feeding unit (not illustrated) and fed to a space between the electrophotographic photosensitive member 1 and the transfer device 6 in synchronism with the rotation of the electrophotographic photosensitive member 1.

The transfer medium 7 onto which the toner image has been transferred from the electrophotographic photosensitive member 1 is separated from the surface of the electrophotographic photosensitive member 1 and conveyed to a fixing device 8. After the toner image is fixed, the transfer medium 7 is output from the electrophotographic apparatus as an image-formed article (print or copy).

The surface of the electrophotographic photosensitive member 1 after the toner image has been transferred onto the transfer medium 7 is cleaned by removing deposits such as toner (residual toner) with a cleaning device 9. In recent years, a cleanerless system has been developed, and the residual toner can be directly removed with a developing device or the like. Furthermore, the electricity on the surface of the electrophotographic photosensitive member 1 is removed with pre-exposure light 10 from a pre-exposure device (not illustrated), and then the electrophotographic photosensitive member 1 is repeatedly used for image forming. In the case where the charging device 3 is a contact charging device that uses a charging roller or the like, the pre-exposure device is not necessarily required.

A plurality of components selected from the components such as the above-described electrophotographic photosensitive member 1, charging device 3, developing device 5, transfer device 6, and cleaning device 9 may be incorporated in a container and integrally supported to provide a process cartridge. The process cartridge may be detachably attachable to the main body of an electrophotographic apparatus. For example, the electrophotographic photosensitive member 1 and at least one selected from the charging device 3, the developing device 5, and the cleaning device 9 are integrally supported to provide a process cartridge 11, which is detachably attachable to the main body of an electrophotographic apparatus using a guiding unit 12 such as a rail of the main body.

In the case where the electrophotographic apparatus is a copying machine or a printer, the image exposure light 4 may be reflected light from a document or transmitted light. Alternatively, the image exposure light 4 may be light applied by, for example, scanning with a laser beam according to signals into which a document read by a sensor is converted, driving of an LED array, or driving of a liquid-crystal shutter array.

The electrophotographic photosensitive member 1 according to an embodiment also has a wide range of applications in the field of applied electrophotography, such as laser beam printers, CRT printers, LED printers, fax machines, liquid-crystal printers, and laser platemaking.

EXAMPLES

Hereafter, the present disclosure will be further described in detail based on Examples and Comparative Examples. The present disclosure is not limited to Examples below. In the following description in Examples, "part" means "part by mass" unless otherwise specified.

Example Corresponding to First Embodiment

Production of Electrophotographic Photosensitive Member

Example I-1

A solution containing 60 parts of barium sulfate particles coated with tin oxide (trade name: Passtran PC1, manufactured by MITSUI MINING & SMELTING Co., Ltd.), 15 parts of titanium oxide particles (trade name: TITANIX JR, manufactured by TAYCA Corporation), 43 parts of resole phenolic resin (trade name: Phenolite J-325, manufactured by DIC Corporation, solid content: 70 mass %), 0.015 parts of silicone oil (trade name: SH28PA, manufactured by Dow Corning Toray Co., Ltd.), 3.6 parts of silicone resin (trade name: Tospearl 120, manufactured by Toshiba Silicone Co., Ltd.), 50 parts of 1-methoxy-2-propanol, and 50 parts of methanol was subjected to dispersion treatment using a ball mill for 20 hours to prepare a coating liquid for conductive layers.

The coating liquid for conductive layers was applied onto, by dipping, an aluminum cylinder (JIS-A3003, aluminum alloy) serving as a support and having a length of 261.5 mm and a diameter of 24 mm. The resulting wet coating was dried at 140° C. for 30 minutes to form a conductive layer having a thickness of 30 µm.

Subsequently, 10 parts of copolymer nylon resin (trade name: Amilan CM8000, manufactured by Toray Industries, Inc.) and 30 parts of methoxymethylated 6 nylon resin (trade name: Toresin EF-30T, manufactured by Teikoku Chemical Industries Co., Ltd.) were dissolved in a mixed solvent of methanol 400 parts/n-butanol 200 parts to prepare a coating solution for undercoat layers. The coating solution for undercoat layers was applied onto the conductive layer by dipping. The resulting wet coating was dried to form an undercoat layer (UCL-1) having a thickness of 0.8 µm.

Subsequently, 10 parts of oxytitanium phthalocyanine crystal having a peak at a Bragg angle 2θ of 27.2° in its CuKα X-ray diffraction pattern, 5 parts of polyvinyl butyral resin (trade name: S-LEC BX-1, manufactured by SEKISUI CHEMICAL Co., Ltd.), and 250 parts of cyclohexanone were dispersed in a sand mill using glass beads having a diameter of 1.0 mm for 6 hours. The resulting dispersion liquid was diluted by adding 250 parts of ethyl acetate to prepare a coating liquid for charge generating layers. The coating liquid for charge generating layers was applied onto the undercoat layer by dipping. The resulting wet coating was dried at 100° C. for 10 minutes to form a charge generating layer having a thickness of 0.20 µm.

Subsequently, 10 parts of Resin I-1 serving as a polycarbonate resin and 5 parts of a compound represented by formula (602) and serving as a charge transport material were dissolved in 35 parts of tetrahydrofuran and 35 parts of toluene to prepare a coating solution for charge transporting layers. The coating solution for charge transporting layers was applied onto the charge generating layer by dipping. The resulting wet coating was dried at 120° C. for 40 minutes to form a charge transporting layer having a thickness of 20 µm. Thus, an electrophotographic photosensitive member in Example I-1 was produced.

Other Examples and Comparative Examples

An electrophotographic photosensitive member was produced by changing the polycarbonate resin, the charge transport material, and the ratio of the content of the charge transport material to the content of the polycarbonate resin in the charge transporting layer in Example I-1 to those listed in Table 6. Table 5 shows the structures of polycarbonate resins used in Comparative Examples. Note that Resin I-19 was not dissolved in the coating solution for charge transporting layers and a photosensitive member was not produced, and therefore the evaluation described below was not performed.

TABLE 5

Structural units of resins and content of each structural unit in resin

| Resin No. | Formula (1-1) Type | Content in resin (mol %) | Formula (1-2) Type | Content in resin (mol %) | Formula (1-3) or Others Type | Content in resin (mol %) |
|---|---|---|---|---|---|---|
| Resin I-19 | (1-1-1) | 50 | — | 0 | (1-3-6) | 50 |
| Resin I-20 | — | 0 | (1-2-1) | 50 | (1-3-6) | 50 |
| Resin I-21 | (1-1-1) | 50 | (1-2-1) | 50 | — | 0 |
| Resin I-22 | (1-1-1) | 40 | (1-2-1) | 40 | (I-1') | 20 |
| Resin I-23 | (1-1-1) | 40 | (1-2-1) | 40 | (I-2') | 20 |
| Resin I-24 | (1-1-1) | 15 | — | 0 | (I-3') | 85 |

The structural units of the polycarbonate resins used in Comparative Examples are shown below.

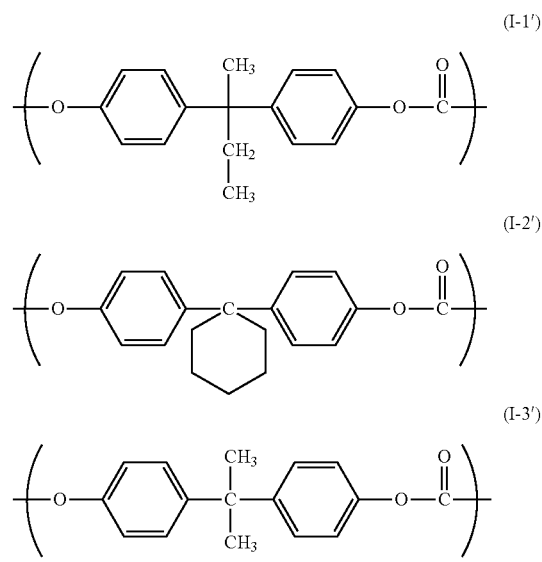

Evaluation

The following evaluations were performed using the electrophotographic photosensitive members produced above. Table 6 shows the evaluation results.

Effect of Suppressing Uneven Density

A test apparatus X and a test apparatus Y were provided. The test apparatus X was obtained by modifying a laser beam printer CP-4525 (manufactured by Hewlett Packard) such that the charged potential (dark-area potential), exposure light amount, and developing bias of an electrophotographic photosensitive member could be adjusted. The test apparatus Y was obtained by modifying the test apparatus X such that the process speed (the rotational speed of the electrophotographic photosensitive member) increased 1.5-fold.

Figure 2:
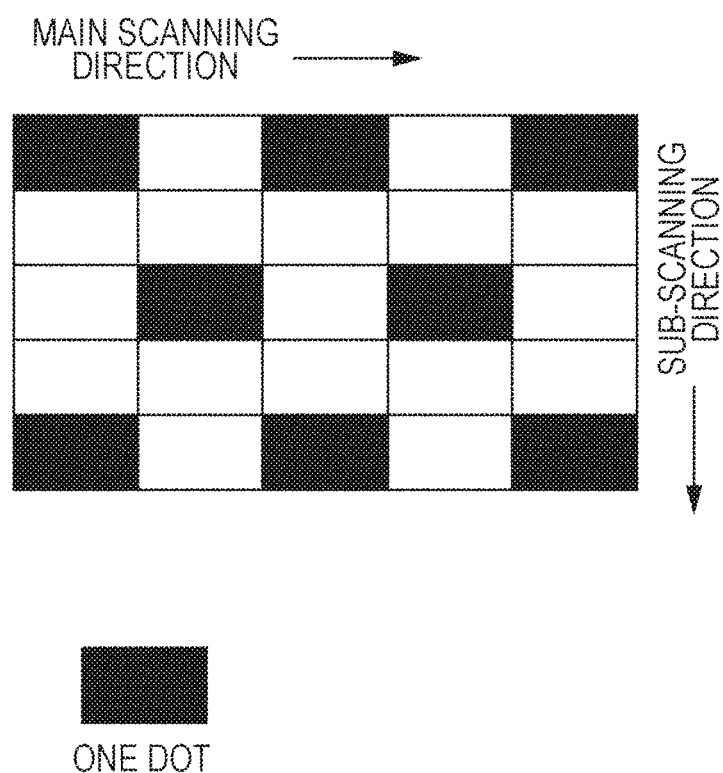
FIG. 2 is a diagram for describing a similar knight jump pattern image.

The produced electrophotographic photosensitive members were each installed in process cartridges (cyan) of the test apparatuses X and Y. "Halftone images with a similar knight jump pattern" in FIG. 2 were output as evaluation images X and Y on A4 plain paper in an environment of 23° C. and 50% RH. Regarding the charging conditions, the bias applied was adjusted such that the surface potential (dark-area potential) of the electrophotographic photosensitive member was −700 V. The exposure conditions were adjusted such that the exposure light amount was 0.4 μJ/cm². The developing conditions were adjusted so that the developing bias was −350 V.

The difference in image density (Macbeth density) between the evaluation images X and Y was measured with a densitometer RD-918 (manufactured by Macbeth) to evaluate the effect of suppressing uneven density. Specifically, the reflection density of an image in a 5-mm diameter circle was measured using an SPI filter at freely selected ten points in an image region corresponding to one rotation of the electrophotographic photosensitive member, and the average of the reflection densities at the ten points was defined as an image density of the evaluation image. The effect of suppressing uneven density increases as the difference in image density decreases. In the following criteria, A to D are favorable levels, and E and F are unacceptable levels.

A: The difference in image density was less than 0.02.
B: The difference in image density was 0.02 or more and less than 0.04.
C: The difference in image density was 0.04 or more and less than 0.06.
D: The difference in image density was 0.06 or more and less than 0.08.
E: The difference in image density was 0.08 or more and less than 0.10.
F: The difference in image density was 0.10 or more.

Effect of Suppressing Fogging

A laser beam printer CP-4525 (manufactured by Hewlett Packard) was modified such that the charged potential (dark-area potential) of the electrophotographic photosensitive member could be adjusted. The charged potential (dark-area potential) was set to −700 V to obtain a test apparatus.

The produced electrophotographic photosensitive member was installed in a process cartridge (cyan) of the test apparatus. A test chart having a printing rate of 1% was continuously printed on 30,000 sheets of A4 plain paper in an environment of 23° C. and 50% RH. Herein, 3-sheet continuous printing with a 6-second pause was repeatedly performed.

After the printing of 30,000 sheets, the lowest reflection density $F_1$ in a white portion of the image and the average reflection density $F_0$ of plain paper before image formation were measured, and $F_1-F_0$ was defined as a "fogging value". The density was measured with a reflectometer TC-6DS (manufactured by TokyoDenshoku. Co., Ltd.) serving as a reflection densitometer. The effect of suppressing fogging increases as the fogging value decreases. In the following criteria, A to D are favorable levels, and E and F are unacceptable levels.

A: The fogging value was less than 1.5.
B: The fogging value was 1.5 or more and less than 2.0.
C: The fogging value was 2.0 or more and less than 2.5.
D: The fogging value was 2.5 or more and less than 3.0.
E: The fogging value was 3.0 or more and less than 4.0.
F: The fogging value was 4.0 or more.

TABLE 6

| | Polycarbonate resin | | | | Evaluation results | |
|---|---|---|---|---|---|---|
| Example No. | Type | Viscosity-average molecular weight Mv | Charge transport material Type* | Charge transport material/resin (mass ratio) | Effect of suppressing uneven density | Effect of suppressing fogging |
| Example I-1 | Resin I-1 | 54,000 | (602) | 0.50 | A | A |
| Example I-2 | Resin I-1 | 54,000 | (209) | 0.50 | A | A |
| Example I-3 | Resin I-1 | 54,000 | (602) | 0.90 | A | A |
| Example I-4 | Resin I-2 | 50,000 | (602) | 0.50 | A | A |
| Example I-5 | Resin I-3 | 61,000 | (602) | 0.50 | A | A |
| Example I-6 | Resin I-4 | 52,000 | (602) | 0.50 | A | A |
| Example I-7 | Resin I-5 | 56,000 | (602) | 0.50 | A | A |
| Example I-8 | Resin I-6 | 55,000 | (602) | 0.50 | A | A |
| Example I-9 | Resin I-1 | 54,000 | (102)/(201) | 0.50 | A | A |
| Example I-10 | Resin I-1 | 54,000 | (603) | 0.50 | A | A |
| Example I-11 | Resin I-7 | 51,000 | (602) | 0.50 | A | A |
| Example I-12 | Resin I-1 | 54,000 | (602) | 0.50 | A | B |
| Example I-13 | Resin I-1 | 54,000 | (602) | 0.50 | A | B |
| Example I-14 | Resin I-8 | 53,000 | (602) | 0.50 | A | B |
| Example I-15 | Resin I-9 | 56,000 | (602) | 0.50 | A | B |
| Example I-16 | Resin I-10 | 54,000 | (602) | 0.50 | A | B |
| Example I-17 | Resin I-11 | 58,000 | (602) | 0.50 | B | A |
| Example I-18 | Resin I-1 | 54,000 | (602) | 0.40 | B | B |
| Example I-19 | Resin I-1 | 54,000 | (602) | 1.00 | A | C |
| Example I-20 | Resin I-12 | 56,000 | (602) | 0.50 | A | D |
| Example I-21 | Resin I-13 | 55,000 | (602) | 0.50 | C | B |
| Example I-22 | Resin I-14 | 57,000 | (602) | 0.50 | C | C |
| Example I-23 | Resin I-15 | 55,000 | (602) | 0.50 | B | D |
| Example I-24 | Resin I-1 | 54,000 | (302) | 0.50 | D | B |

TABLE 6-continued

| | | Polycarbonate resin | | | Evaluation results | |
|---|---|---|---|---|---|---|
| | | Viscosity- | | | | |
| Example No. | Type | average molecular weight Mv | Charge transport material Type* | Charge transport material/resin (mass ratio) | Effect of suppressing uneven density | Effect of suppressing fogging |
| Comparative Example I-1 | Resin I-17 | 51,000 | (602) | 0.50 | F | E |
| Comparative Example I-2 | Resin I-18 | 50,000 | (602) | 0.50 | E | F |
| Comparative Example I-3 | Resin I-19 | 62,000 | (602) | 0.50 | — | — |
| Comparative Example I-4 | Resin I-20 | 52,000 | (602) | 0.50 | F | E |
| Comparative Example I-5 | Resin I-21 | 56,000 | (602) | 0.50 | F | E |
| Comparative Example I-6 | Resin I-22 | 49,000 | (602) | 0.50 | F | F |

*In the case of a mixture, the mass ratio is 9/1.

Example Corresponding to Second Embodiment

Synthesis of Gallium Phthalocyanine Crystal

A gallium phthalocyanine crystal to be used as a charge generation material was synthesized as follows.

In an atmosphere of nitrogen flow, 5.46 parts of phthalonitrile and 45 parts of α-chloronaphthalene were charged into a reaction vessel and heated to a temperature of 30° C., and then the temperature was maintained. Subsequently, 3.75 parts of gallium trichloride was charged at the temperature (30° C.). The moisture content of the mixture solution at the moment of the charging was 150 ppm. The temperature was then increased to 200° C. Subsequently, the reaction was caused to proceed in an atmosphere of nitrogen flow at 200° C. for 4.5 hours, and then the temperature was decreased. When the temperature reached 150° C., the reaction product was filtered. The filter residue was washed by performing dispersion using N,N-dimethylformamide at 140° C. for two hours and then filtered. The resulting filter residue was washed with methanol and then dried to obtain 4.65 parts of a chlorogallium phthalocyanine (ClGaPc) with a yield of 71%.

Then, 4.65 parts of ClGaPc was dissolved in 139.5 parts of concentrated sulfuric acid at 10° C. The mixture was dropped into 620 parts of ice water under stirring to perform reprecipitation, and filtration was performed with a filter press. The resulting wet cake (filter residue) was washed by performing dispersion with 2% ammonia water and then filtered with a filter press. Subsequently, the resulting wet cake (filter residue) was washed by performing dispersion with ion-exchanged water and then repeatedly filtered with a filter press three times. Thus, a hydroxygallium phthalocyanine pigment (hydrous hydroxygallium phthalocyanine pigment) having a solid content of 23% was obtained.

Then, 6.6 kg of the obtained hydroxygallium phthalocyanine pigment (hydrous hydroxygallium phthalocyanine pigment) was dried as follows using a Hyper-Drier HD-06R (manufactured by Biocon (Japan) Ltd., frequency (oscillation frequency): 2455 MHz±15 MHz).

The obtained hydroxygallium phthalocyanine pigment in a lump state (hydrous cake thickness: 4 cm or less), as taken out from the filter press, was put on a dedicated circular plastic tray of the dryer set such that the far infrared was off and the temperature of the inner wall was 50° C. A vacuum pump and a leak valve were adjusted to give a degree of vacuum of 4.0 to 10.0 kPa during microwave irradiation.

As a first step, the hydroxygallium phthalocyanine pigment was irradiated with a microwave of 4.8 kW for 50 minutes. The irradiation with microwave was then stopped and the leak valve was closed for a moment so as to give a high degree of vacuum of 2 kPa or less. At this point, the hydroxygallium phthalocyanine pigment had a solid content of 88%. As a second step, the leak valve was adjusted so as to give a degree of vacuum (pressure inside the dryer) within the above-mentioned setting value (4.0 to 10.0 kPa). The hydroxygallium phthalocyanine pigment was then irradiated with a microwave of 1.2 kW for 5 minutes. The irradiation with microwave was then stopped and the leak valve was closed for a moment so as to give a high degree of vacuum of 2 kPa or less. The second step was further performed once (twice in total). At this point, the hydroxygallium phthalocyanine pigment had a solid content of 98%. As a third step, irradiation with microwave was performed as in the second step, except that a microwave of 0.8 kW was used instead of the microwave of 1.2 kW in the second step. The third step was further performed once (twice in total). As a fourth step, the leak valve was adjusted so as to give a degree of vacuum (pressure inside the dryer) within the above-mentioned setting value (4.0 to 10.0 kPa) again. The hydroxygallium phthalocyanine pigment was then irradiated with a microwave of 0.4 kW for 3 minutes. The irradiation with microwave was then stopped and the leak valve was closed for a moment so as to give a high degree of vacuum of 2 kPa or less. The fourth step was further repeated seven times (eight times in total). As a result, 1.52 kg of a hydroxygallium phthalocyanine having a water content of 1% or less was obtained for 3 hours in total.

Production of Electrophotographic Photosensitive Member

Example II-1

A solution containing 60 parts of barium sulfate particles coated with tin oxide (trade name: Passtran PC1, manufactured by MITSUI MINING & SMELTING Co., Ltd.), 15 parts of titanium oxide particles (trade name: TITANIX JR, manufactured by TAYCA Corporation), 43 parts of resole phenolic resin (trade name: Phenolite J-325, manufactured by DIC Corporation, solid content: 70 mass %), 0.015 parts of silicone oil (trade name: SH28PA, manufactured by Dow Corning Toray Co., Ltd.), 3.6 parts of silicone resin (trade name: Tospearl 120, manufactured by Toshiba Silicone Co., Ltd.), 50 parts of 1-methoxy-2-propanol, and 50 parts of methanol was subjected to dispersion treatment using a ball mill for 20 hours to prepare a coating liquid for conductive layers.

The coating liquid for conductive layers was applied onto, by dipping, an aluminum cylinder (JIS-A3003, aluminum alloy) serving as a support and having a length of 261.5 mm and a diameter of 24 mm. The resulting wet coating was dried at 140° C. for 30 minutes to form a conductive layer having a thickness of 30 μm.

Subsequently, 10 parts of copolymer nylon resin (trade name: Amilan CM8000, manufactured by Toray Industries, Inc.) and 30 parts of methoxymethylated 6 nylon resin (trade name: Toresin EF-30T, manufactured by Teikoku Chemical Industries Co., Ltd.) were dissolved in a mixed solvent of methanol 400 parts/n-butanol 200 parts to prepare a coating solution for undercoat layers. The coating solution for undercoat layers was applied onto the conductive layer by dipping. The resulting wet coating was dried to form an undercoat layer (UCL-1) having a thickness of 0.8 μm.

Subsequently, 10 parts of the gallium phthalocyanine crystal (charge generation material) synthesized above, 5 parts of polyvinyl butyral resin (trade name: S-LEC BX-1, manufactured by SEKISUI CHEMICAL Co., Ltd.), and 250 parts of cyclohexanone were dispersed in a sand mill using glass beads having a diameter of 1.0 mm for 6 hours. The resulting dispersion liquid was diluted by adding 250 parts of ethyl acetate to prepare a coating liquid for charge generating layers. The coating liquid for charge generating layers was applied onto the undercoat layer by dipping. The resulting wet coating was dried at 100° C. for 10 minutes to form a charge generating layer having a thickness of 0.23 m.

Subsequently, 10 parts of Resin II-1, which was a polycarbonate resin, 5 parts of a mixture (mixing ratio 9:1) of a compound (oxidation potential: 0.76 V) represented by formula (102) and a compound (oxidation potential: 0.74 V) represented by formula (201), the mixture serving as a charge transport material, and 0.2 parts of a resin having a siloxane structure, serving as a lubricant, and represented by formula (PCSi-1) below were dissolved in 70 parts of o-xylene (Xy) and 20 parts of dimethoxymethane (DMM) to prepare a coating solution for charge transporting layers.

The coating solution for charge transporting layers (coating solution for surface layers) was applied onto the charge generating layer by dipping. The resulting wet coating was dried at 120° C. for 40 minutes to form a charge transporting layer (surface layer) having a thickness of 18 μm. Thus, an electrophotographic photosensitive member in Example II-1 was produced.

Other Examples and Comparative Examples

An electrophotographic photosensitive member was produced by changing the polycarbonate resin, the charge transport material, and the ratio of the content of the charge transport material to the content of the polycarbonate resin in the surface layer in Example II-1 to those listed in Table 8. Table 7 shows the structures of polycarbonate resins used in Comparative Examples.

TABLE 7

Structural units of resins and content of each structural unit in resin

| Resin No. | Formula (2-1) Type | Content in resin (mol %) | Formula (2-2) Type | Content in resin (mol %) | Formula (2-3) or Others Type | Content in resin (mol %) |
|---|---|---|---|---|---|---|
| Resin II-13 | (2-1-1) | 40 | (2-2-1) | 60 | — | 0 |
| Resin II-14 | — | 0 | (2-2-1) | 40 | (II-1') | 60 |
| Resin II-15 | (2-1-1) | 70 | (2-2-1) | 20 | (II-1') | 10 |
| Resin II-16 | — | 0 | (2-2-1) | 50 | (2-3-6) | 50 |

The structural unit of the polycarbonate resin used in Comparative Examples is shown below.

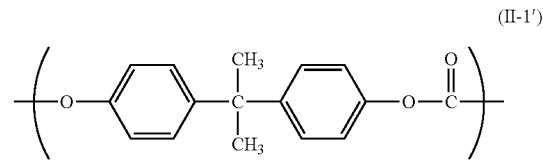

(II-1')

Evaluation

The following evaluations were performed using the electrophotographic photosensitive members produced above. Table 8 shows the evaluation results.

Wear Resistance

A laser beam printer CP-4525 (manufactured by Hewlett Packard) was modified such that the charged potential (dark-area potential) and exposure light amount of the electrophotographic photosensitive member could be adjusted, and was used as a test apparatus.

The produced electrophotographic photosensitive member was installed in a process cartridge (cyan) of the test apparatus. In a sheet passing durability test, a test chart having a printing rate of 6% was printed on 10,000 sheets of A4 plain paper in an environment of 23° C. and 50% RH in an intermittent mode in which printing was stopped each

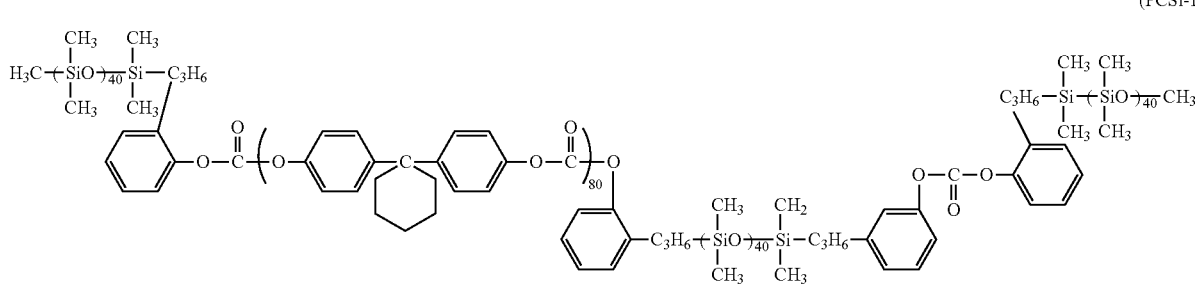

(PCSi-1)

time an image was printed on one sheet. Regarding the charging conditions, the bias applied was adjusted such that the charged potential (dark-area potential) of the electrophotographic photosensitive member was −700 V. The exposure conditions were adjusted such that the exposure light amount was 0.4 μJ/cm².

The thickness of the photosensitive member before the sheet passing durability test was measured (thickness S). After the sheet passing durability test was performed using 10000 sheets in the intermittent mode, another continuous sheet passing durability test was performed using 10000 sheets in an environment of 15° C. and 10% RH. Then, the thickness of the photosensitive member was measured in the same manner (thickness L). The "thickness S-thickness L" was defined as a "wear loss". The wear resistance was evaluated using the wear loss on the basis of the following evaluation criteria. In the following criteria, A to C are favorable levels, and D is an unacceptable level.

A: The wear loss was less than 1.0 μm.
B: The wear loss was 1.0 μm or more and less than 1.5 μm.
C: The wear loss was 1.5 μm or more and less than 2.0 μm.
D: The wear loss was 2.0 μm or more.

Crack Resistance

The evaluation was performed by the evaluation method 1 and the evaluation method 2.

(1) Evaluation Method 1

As an initial evaluation, an oil-containing film was produced and brought into close contact with the electrophotographic photosensitive member according to an embodiment. A change was observed over time from 10 seconds to 12 hours after the close contact in a normal-temperature and normal-humidity environment of 23° C. and 50% RH. The oil-containing film was formed by applying a coating solution containing 1 part of KF99 (manufactured by Shin-Etsu Chemical Co., Ltd.), 10 parts of N-methoxymethylated nylon, and 50 parts of methanol onto a sheet-shaped aluminum support having a thickness of about 100 μm by dipping and drying the wet coating at 100° C. for 5 minutes. The formed oil-containing film had a thickness of 0.2 μm. The oil-containing film was cut out so as to have a length of 20 mm and a width of 20 mm and brought into close contact with the electrophotographic photosensitive member to perform the evaluation. The evaluation criteria of crack resistance are as follows. In the following criteria, A to C are favorable levels and D is an unacceptable level.

A: The occurrence of cracking was not observed even after 12 hours.
B: The occurrence of cracking was observed within a time period of 5 hours or longer and shorter than 12 hours.
C: The occurrence of cracking was observed within a time period of 30 minutes or longer and shorter than 5 hours.
D: The occurrence of cracking was observed within a time period of shorter than 30 minutes.

(2) Evaluation Method 2

The electrophotographic photosensitive member that had been evaluated by the evaluation method 1 was installed in the test apparatus. A solid black image was recorded at the first rotation of the electrophotographic photosensitive member. Then, the image density of a solid black image recorded after the second rotation of the electrophotographic photosensitive member was measured with a Macbeth densitometer (manufactured by Macbeth) to evaluate the crack resistance. When cracking occurs on the electrophotographic photosensitive member, the image density decreases. That is, in this evaluation, the crack resistance increases as the image density increases. In the following criteria, A to C are favorable levels, and D is an unacceptable level.

A: The image density was 1.45 or more.
B: The image density was 1.35 or more and less than 1.45.
C: The image density was 1.20 or more and less than 1.35.
D: The image density was less than 1.20.

TABLE 8

Production conditions of electrophotographic photosensitive member and Evaluation results

| | Polycarbonate resin | | Charge transport material Type* | Charge transport material/resin (mass ratio) | Resin having siloxane structure | Evaluation results | | |
|---|---|---|---|---|---|---|---|---|
| | | Viscosity-average molecular weight Mv | | | | | Crack resistance | |
| Example No. | Type | | | | | Wear resistance | Evaluation method 1 | Evaluation method 2 |
| Example II-1 | Resin II-1 | 55,000 | (102)/(201) | 0.50 | Presence | A | A | A |
| Example II-2 | Resin II-2 | 85,000 | (102)/(201) | 0.50 | Presence | A | A | B |
| Example II-3 | Resin II-3 | 55,000 | (602) | 0.50 | Presence | A | A | A |
| Example II-4 | Resin II-4 | 57,000 | (602) | 0.50 | Presence | A | A | A |
| Example II-5 | Resin II-5 | 55,000 | (602) | 0.50 | Presence | A | A | A |
| Example II-6 | Resin II-6 | 52,000 | (602) | 0.50 | Presence | B | A | B |
| Example II-7 | Resin II-7 | 56,000 | (602) | 0.50 | Presence | B | C | B |
| Example II-8 | Resin II-8 | 55,000 | (602) | 0.50 | Presence | C | A | A |
| Example II-9 | Resin II-9 | 51,000 | (602) | 0.50 | Presence | A | A | B |
| Example II-10 | Resin II-10 | 53,000 | (602) | 0.50 | Presence | A | C | C |
| Example II-11 | Resin II-1 | 65,000 | (602) | 0.50 | — | B | C | C |
| Example II-12 | Resin II-1 | 35,000 | (602) | 0.50 | Presence | B | B | B |
| Example II-13 | Resin II-9 | 56,000 | (209) | 0.50 | Presence | B | A | A |
| Example II-14 | Resin II-1 | 55,000 | (603) | 0.50 | Presence | A | A | A |
| Example II-15 | Resin II-11 | 55,000 | (102)/(201) | 0.50 | Presence | A | A | A |
| Example II-16 | Resin II-12 | 55,000 | (102)/(201) | 0.50 | Presence | A | A | A |
| Example II-17 | Resin II-13 | 55,000 | (102)/(201) | 0.50 | Presence | A | A | A |
| Comparative Example II-1 | Resin II-14 | 51,000 | (602) | 0.50 | Presence | C | D | D |

TABLE 8-continued

Production conditions of electrophotographic photosensitive member and Evaluation results

| | Polycarbonate resin | | | | | Evaluation results | | |
|---|---|---|---|---|---|---|---|---|
| | | Viscosity-average molecular weight Mv | Charge transport material Type* | Charge transport material/resin (mass ratio) | Resin having siloxane structure | Wear resistance | Crack resistance | |
| Example No. | Type | | | | | | Evaluation method 1 | Evaluation method 2 |
| Comparative Example II-2 | Resin II-15 | 50,000 | (602) | 0.50 | Presence | A | D | C |
| Comparative Example II-3 | Resin II-16 | 62,000 | (602) | 0.50 | Presence | D | A | B |
| Comparative Example II-4 | Resin II-16 | 62,000 | (602) | 0.50 | — | D | B | C |
| Comparative Example II-5 | Resin II-17 | 52,000 | (602) | 0.50 | Presence | A | D | C |

*In the case of a mixture, the mass ratio is 9/1.

Example Corresponding to Third Embodiment

Synthesis of Gallium Phthalocyanine Crystal

A gallium phthalocyanine crystal used as a charge generation material was synthesized as follows.

Synthesis of Hydroxygallium Phthalocyanine Ga-0

In an atmosphere of nitrogen flow, 5.46 parts of phthalonitrile and 45 parts of α-chloronaphthalene were charged into a reaction vessel and heated to a temperature of 30° C., and then the temperature was maintained. Subsequently, 3.75 parts of gallium trichloride was charged at the temperature (30° C.). The moisture content of the mixture solution at the moment of the charging was 150 ppm. The temperature was then increased to 200° C. Subsequently, the reaction was caused to proceed in an atmosphere of nitrogen flow at 200° C. for 4.5 hours, and then the temperature was decreased. When the temperature reached 150° C., the reaction product was filtered. The filter residue was washed by performing dispersion using N,N-dimethylformamide at 140° C. for two hours and then filtered. The resulting filter residue was washed with methanol and then dried to obtain 4.65 parts of a chlorogallium phthalocyanine (ClGaPc) with a yield of 71%.

Then, 4.65 parts of ClGaPc was dissolved in 139.5 parts of concentrated sulfuric acid at 10° C. The mixture was dropped into 620 parts of ice water under stirring to perform reprecipitation, and filtration was performed with a filter press. The resulting wet cake (filter residue) was washed by performing dispersion with 2% ammonia water and then filtered with a filter press. Subsequently, the resulting wet cake (filter residue) was washed by performing dispersion with ion-exchanged water and then repeatedly filtered with a filter press three times. Thus, a hydroxygallium phthalocyanine pigment (hydrous hydroxygallium phthalocyanine pigment) having a solid content of 23% was obtained.

Then, 6.6 kg of the obtained hydroxygallium phthalocyanine pigment (hydrous hydroxygallium phthalocyanine pigment) was dried as follows using a Hyper-Drier HD-06R (manufactured by Biocon (Japan) Ltd., frequency (oscillation frequency): 2455 MHz±15 MHz).

The obtained hydroxygallium phthalocyanine pigment in a lump state (hydrous cake thickness: 4 cm or less), as taken out from the filter press, was put on a dedicated circular plastic tray of the dryer set such that the far infrared was off and the temperature of the inner wall was 50° C. A vacuum pump and a leak valve were adjusted to give a degree of vacuum of 4.0 to 10.0 kPa during microwave irradiation.

As a first step, the hydroxygallium phthalocyanine pigment was irradiated with a microwave of 4.8 kW for 50 minutes. The irradiation with microwave was then stopped and the leak valve was closed for a moment so as to give a high degree of vacuum of 2 kPa or less. At this point, the hydroxygallium phthalocyanine pigment had a solid content of 88%. As a second step, the leak valve was adjusted so as to give a degree of vacuum (pressure inside the dryer) within the above-mentioned setting value (4.0 to 10.0 kPa). The hydroxygallium phthalocyanine pigment was then irradiated with a microwave of 1.2 kW for 5 minutes. The irradiation with microwave was then stopped and the leak valve was closed for a moment so as to give a high degree of vacuum of 2 kPa or less. The second step was further performed once (twice in total). At this point, the hydroxygallium phthalocyanine pigment had a solid content of 98%. As a third step, irradiation with microwave was performed as in the second step, except that a microwave of 0.8 kW was used instead of the microwave of 1.2 kW in the second step. The third step was further performed once (twice in total). As a fourth step, the leak valve was adjusted so as to give a degree of vacuum (pressure inside the dryer) within the above-mentioned setting value (4.0 to 10.0 kPa) again. The hydroxygallium phthalocyanine pigment was then irradiated with a microwave of 0.4 kW for 3 minutes. The irradiation with microwave was then stopped and the leak valve was closed for a moment so as to give a high degree of vacuum of 2 kPa or less. The fourth step was further repeated seven times (eight times in total). As a result, 1.52 kg of a hydroxygallium phthalocyanine (Ga-0) having a water content of 1% or less was obtained for 3 hours in total.

Synthesis of Gallium Phthalocyanine Crystal Ga-1

Figure 3:
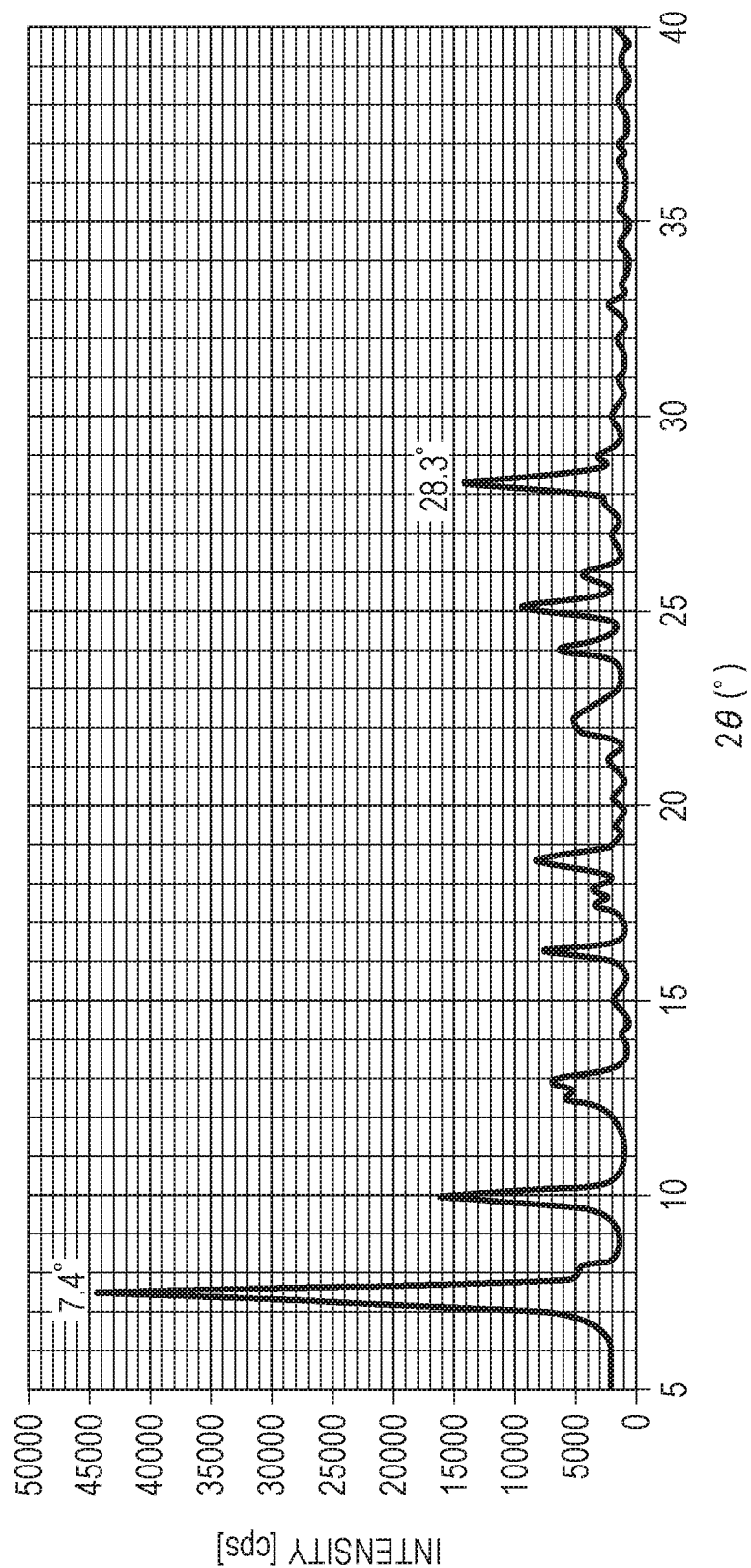
FIG. 3 illustrates a powder X-ray diffraction pattern of a hydroxygallium phthalocyanine crystal used in Example.

Then, 0.5 parts of the obtained hydroxygallium phthalocyanine Ga-0 and 10 parts of N-methylformamide were subjected to milling treatment with a ball mill using 20 parts of glass beads having a diameter of 0.8 mm at room temperature (23° C.) at 120 rpm for 300 hours. A gallium phthalocyanine crystal was separated from the dispersion liquid using N,N-dimethylformamide and filtered, and the filter residue on the filter was thoroughly washed with tetrahydrofuran. The filter residue was vacuum-dried to obtain 0.45 parts of hydroxygallium phthalocyanine crystal Ga-1. FIG. 3 illustrates a powder X-ray diffraction pattern of the obtained crystal.

$^1$H-NMR measurement [instrument: AVANCE III 500 (manufactured by Bruker Corporation)] was performed using deuterated sulfuric acid as a solvent. Consequently, it was confirmed that the crystal of Ga-1 contained 0.9 mass % of N-methylformamide.

Synthesis of Gallium Phthalocyanine Crystal Ga-2

A hydroxygallium phthalocyanine crystal Ga-2 was obtained in the same manner as in the synthesis of the gallium phthalocyanine crystal Ga-1, except that 10 parts of N-methylformamide was changed to 10 parts of N,N-dimethylformamide and the milling treatment time was changed from 300 hours to 400 hours. This yielded 0.40 parts of hydroxygallium phthalocyanine crystal Ga-2. The powder X-ray diffraction pattern of Ga-2 was similar to that in FIG. 3. As a result of NMR measurement, it was confirmed that the crystal of Ga-2 contained 1.4 mass % of N,N-dimethylformamide in terms of proton ratio.

Synthesis of Gallium Phthalocyanine Crystal Ga-3

A hydroxygallium phthalocyanine crystal Ga-3 was obtained in the same manner as in the synthesis of the gallium phthalocyanine crystal Ga-1, except that 10 parts of N-methylformamide was changed to 10 parts of N-propylformamide and the milling treatment time was changed from 300 hours to 500 hours. This yielded 0.40 parts of hydroxygallium phthalocyanine crystal Ga-3. The powder X-ray diffraction pattern of Ga-3 was similar to that in FIG. 3. As a result of NMR measurement, it was confirmed that the crystal of Ga-3 contained 1.4 mass % of N-propylformamide in terms of proton ratio.

Synthesis of Gallium Phthalocyanine Crystal Ga-4

A hydroxygallium phthalocyanine crystal Ga-4 was obtained in the same manner as in the synthesis of the gallium phthalocyanine crystal Ga-1, except that 10 parts of N-methylformamide was changed to 10 parts of N-vinylformamide and the milling treatment time was changed from 300 hours to 100 hours. This yielded 0.40 parts of hydroxygallium phthalocyanine crystal Ga-4. The powder X-ray diffraction pattern of Ga-4 was similar to that in FIG. 3. As a result of NMR measurement, it was confirmed that the crystal of Ga-4 contained 1.8 mass % of N-vinylformamide in terms of proton ratio.

Synthesis of Gallium Phthalocyanine Crystal Ga-5

Figure 4:
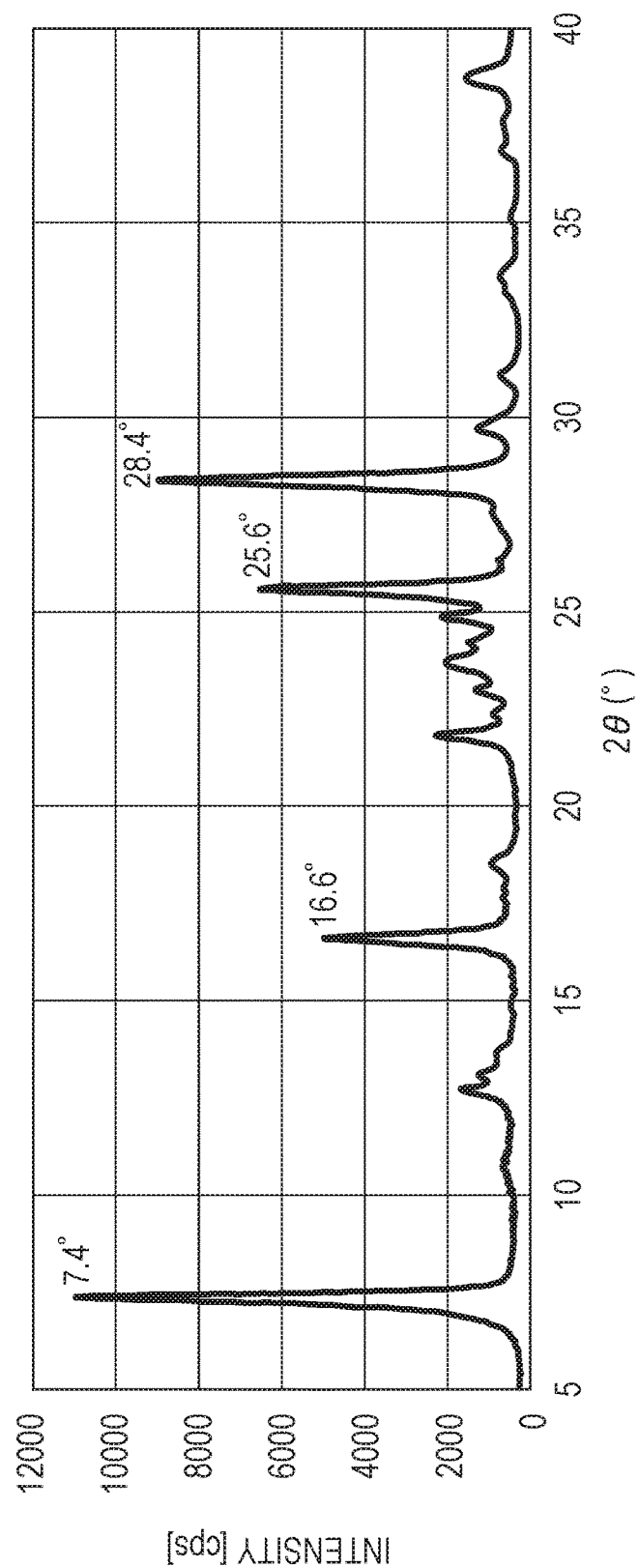
FIG. 4 illustrates a powder X-ray diffraction pattern of a chlorogallium phthalocyanine crystal used in Example.

At room temperature (23° C.), 0.5 parts of the chlorogallium phthalocyanine (ClGaPc) obtained above was subjected to dry milling treatment in a ball mill using 20 parts of glass beads having a diameter of 0.8 mm for 40 hours. Ten parts of N,N-dimethylformamide was added thereto, and wet milling treatment was performed at room temperature (23° C.) for 100 hours. A gallium phthalocyanine crystal was separated from the dispersion liquid using N,N-dimethylformamide and filtered, and the filter residue on the filter was thoroughly washed with tetrahydrofuran. The filter residue was vacuum-dried to obtain 0.44 parts of chlorogallium phthalocyanine crystal Ga-5. FIG. 4 illustrates a powder X-ray diffraction pattern of the obtained crystal.

$^1$H-NMR measurement [instrument: AVANCE III 500 (manufactured by Bruker Corporation)] was performed using deuterated sulfuric acid as a solvent. Consequently, it was confirmed that the crystal of Ga-5 contained 1.0 mass % of N,N-dimethylformamide.

Synthesis of Gallium Phthalocyanine Crystal Ga-6

A hydroxygallium phthalocyanine crystal Ga-6 was obtained in the same manner as in the synthesis of the gallium phthalocyanine crystal Ga-1, except that the milling treatment time was changed from 300 hours to 48 hours. This yielded 0.46 parts of hydroxygallium phthalocyanine crystal Ga-6. As a result of NMR measurement, it was confirmed that the crystal of Ga-6 contained 2.1 mass % of N,N-dimethylformamide in terms of proton ratio.

Synthesis of Gallium Phthalocyanine Crystal Ga-7

Figure 5:
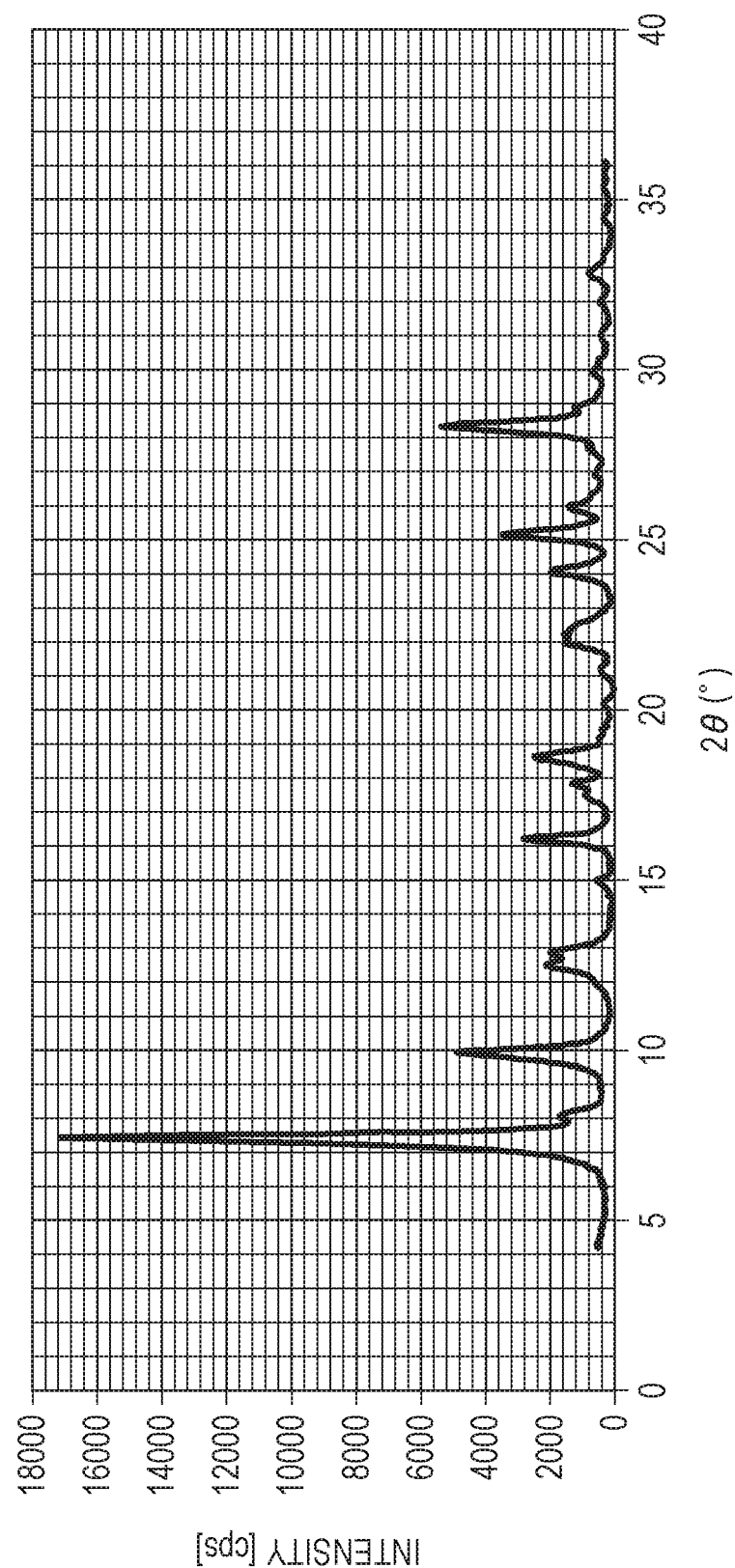
FIG. 5 illustrates a powder X-ray diffraction pattern of a hydroxygallium phthalocyanine crystal used in Example.

A hydroxygallium phthalocyanine crystal Ga-7 was obtained in the same manner as in the synthesis of the gallium phthalocyanine crystal Ga-1, except that 10 parts of N-methylformamide was changed to 10 parts of N,N-dimethylformamide and the milling treatment time was changed from 300 hours to 100 hours. This yielded 0.40 parts of hydroxygallium phthalocyanine crystal Ga-7. FIG. 5 illustrates a powder X-ray diffraction pattern of the obtained crystal. As a result of NMR measurement, it was confirmed that the crystal of Ga-7 contained 2.2 mass % of N,N-dimethylformamide in terms of proton ratio.

Production of Electrophotographic Photosensitive Member

Hereafter, the thickness of each layer of the electrophotographic photosensitive member was actually measured with an eddy-current thickness gauge (Fischerscope manufactured by Fischer Instruments K.K.) or calculated from the mass per unit area in terms of specific gravity.

Example III-1

A solution containing 60 parts of barium sulfate particles coated with tin oxide (trade name: Passtran PC1, manufactured by MITSUI MINING & SMELTING Co., Ltd.), 15 parts of titanium oxide particles (trade name: TITANIX JR, manufactured by TAYCA Corporation), 43 parts of resole phenolic resin (trade name: Phenolite J-325, manufactured by DIC Corporation, solid content: 70 mass %), 0.015 parts of silicone oil (trade name: SH28PA, manufactured by Dow Corning Toray Co., Ltd.), 3.6 parts of silicone resin (trade name: Tospearl 120, manufactured by Toshiba Silicone Co., Ltd.), 50 parts of 1-methoxy-2-propanol, and 50 parts of methanol was subjected to dispersion treatment using a ball mill for 20 hours to prepare a coating liquid for conductive layers.

The coating liquid for conductive layers was applied onto, by dipping, an aluminum cylinder (JIS-A3003, aluminum alloy) serving as a support and having a length of 261.5 mm and a diameter of 24 mm. The resulting wet coating was dried at 140° C. for 30 minutes to form a conductive layer having a thickness of 30 µm.

Subsequently, 10 parts of copolymer nylon resin (trade name: Amilan CM8000, manufactured by Toray Industries, Inc.) and 30 parts of methoxymethylated 6 nylon resin (trade name: Toresin EF-30T, manufactured by Teikoku Chemical Industries Co., Ltd.) were dissolved in a mixed solvent of methanol 400 parts/n-butanol 200 parts to prepare a coating solution for undercoat layers. The coating solution for undercoat layers was applied onto the conductive layer by dipping. The resulting wet coating was dried to form an undercoat layer (UCL-1) having a thickness of 0.8 m.

Subsequently, 10 parts of the gallium phthalocyanine crystal Ga-7 (charge generation material), 5 parts of polyvinyl butyral resin (trade name: S-LEC BX-1, manufactured by SEKISUI CHEMICAL Co., Ltd.), and 250 parts of cyclohexanone were dispersed in a sand mill using glass beads having a diameter of 1.0 mm for 6 hours. The resulting dispersion liquid was diluted by adding 250 parts of ethyl acetate to prepare a coating liquid for charge generating layers. The coating liquid for charge generating layers was applied onto the undercoat layer by dipping. The resulting wet coating was dried at 100° C. for 10 minutes to form a charge generating layer having a thickness of 0.23 µm.

Subsequently, 10 parts of Resin III-1 (Mv: 54,000, Mw: 74,000), which was a polycarbonate resin, 5 parts of a mixture (mixing ratio 9:1) of a compound (oxidation potential: 0.76 V) represented by formula (102) and a compound (oxidation potential: 0.74 V) represented by formula (201), the mixture serving as a charge transport material, and 0.38 parts of a resin having a siloxane structure, serving as a lubricant, and represented by formula (PCSi-1) below were dissolved in 70 parts of o-xylene (Xy) and 20 parts of dimethoxymethane (DMM) to prepare a coating solution for charge transporting layers. The coating solution for charge transporting layers was applied onto the charge generating layer by dipping. The resulting wet coating was dried at 125° C. for 1 hour to form a charge transporting layer having a thickness of 20 µm.

(PCSi-1)

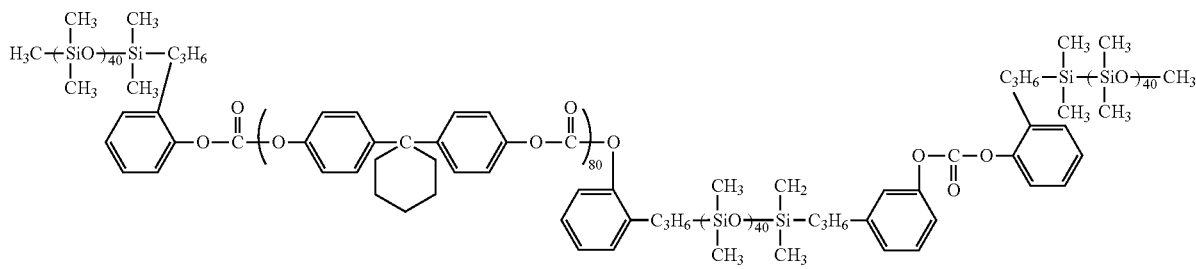

Thus, an electrophotographic photosensitive member in Example III-1 was produced.

Other Examples and Comparative Examples

An electrophotographic photosensitive member was produced by changing the presence or absence of the conductive layer, the type of undercoat layer, the type (the mass ratio in the case of two types) of charge generation material used for the charge generating layer, the type, viscosity-average molecular weight Mv, and weight-average molecular weight Mw of a resin in the charge transporting layer, the type (the mass ratio in the case of two types) of charge transport material, the numbers of parts of the charge transport material and resin, and the type and number of parts of solvent in Example III-1 to those listed in Table 9. Note that Resin E-1 is a polymer (Mv: 55,000, Mw: 76,000) containing only the structural unit 3-1-1. Methods for forming undercoat layers UCL-2 and UCL-3 and methods for forming charge generating layers using charge generation materials CGM-1 and CGM-2 will be described below.

Undercoat Layer UCL-2

Ten parts of an electron transporting compound represented by formula below,

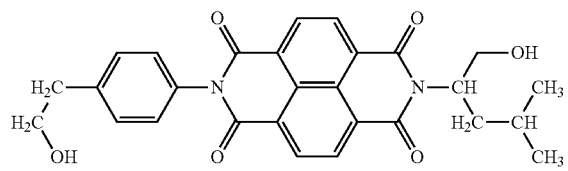

17 parts of a blocked isocyanate compound (trade name: Sumidur 3175, solid content: 75 mass %, manufactured by Sumitomo Bayer Urethane Co., Ltd.) serving as a crosslinking agent and represented by formula below,

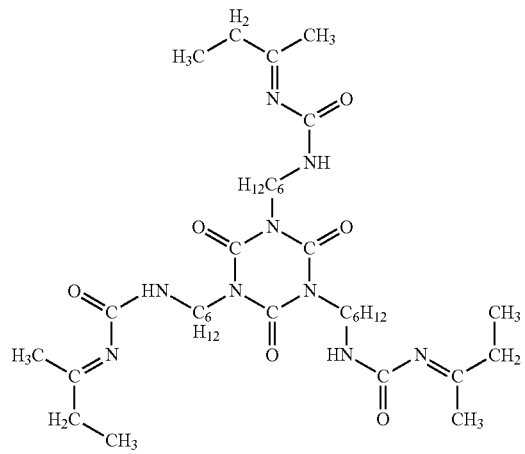

2 parts of polyvinyl butyral resin (trade name: S-LEC BX-1, manufactured by SEKISUI CHEMICAL Co., Ltd.), and 0.2 parts of zinc (II) butyrate serving as an additive were dissolved in a mixed solvent of 100 parts of tetrahydrofuran and 100 parts of 1-methoxy-2-propanol to prepare a coating solution for undercoat layers. The coating solution for undercoat layers was applied onto the conductive layer by dipping. The resulting wet coating was heated at 160° C. for 30 minutes. Consequently, the wet coating was dried and cured, and an undercoat layer UCL-2 having a thickness of 0.7 μm was formed.

Undercoat Layer UCL-3

One hundred parts of zinc oxide particles (average primary particle size: 50 nm, specific surface area: 19 m²/g, powder resistance: 4.7×10⁶ Ω·cm, manufactured by TAYCA Corporation) was mixed with 500 parts of toluene under stirring. To the resulting mixture, 1.25 parts of N-2-(amino-ethyl)-3-aminopropylmethyldimethoxysilane (trade name: KBM602, manufactured by Shin-Etsu Chemical Co., Ltd.) serving as a surface-treating agent was added, and stirring was performed for 6 hours. Subsequently, toluene was distilled off under reduced pressure, and drying was performed at 130° C. for 6 hours to obtain surface-treated zinc oxide particles. Then, 75 parts of the surface-treated zinc oxide particles, 16 parts of the blocked isocyanate compound (trade name: Sumidur 3175, solid content: 75 mass %, manufactured by Sumitomo Bayer Urethane Co., Ltd), 9 parts of polyvinyl butyral resin (trade name: S-LEC BM-1, manufactured by SEKISUI CHEMICAL Co., Ltd.), and 1 part of 2,3,4-trihydroxybenzophenone (manufactured by Tokyo Chemical Industry Co., Ltd.) were added to a mixed solvent of 60 parts of methyl ethyl ketone and 60 parts of cyclohexanone to prepare a dispersion liquid. The dispersion liquid was subjected to dispersion treatment at 23° C. for 3 hours in a vertical sand mill using glass beads having an average particle size of 1.0 mm at a rotational speed of 1,500 rpm. After the dispersion treatment, 5 parts of crosslinked poly(methyl methacrylate) particles (trade name: SSX-103, average particle size: 3 μm, manufactured by SEKISUI CHEMICAL Co., Ltd.) and 0.01 parts of silicone oil (trade name: SH28PA, manufactured by Dow Corning Toray Co., Ltd.) were added to the resulting dispersion liquid and stirred to prepare a coating liquid for undercoat layers. The coating liquid for undercoat layers was applied onto a support by dipping to form a wet coating. The wet coating was heated at 160° C. for 40 minutes for polymerization. Thus, an undercoat layer UCL-3 having a thickness of 30 μm was formed.

Charge Generating Layer Containing Charge Generation Material CGM-1

Twelve parts of Y-type oxytitanium phthalocyanine crystal (charge generation material) having a peak at a Bragg angle (2θ±0.20) of 27.3° in its CuKα X-ray diffraction pattern, 10 parts of polyvinyl butyral resin (trade name: S-LEC BX-1, manufactured by SEKISUI CHEMICAL Co., Ltd.), and 250 parts of cyclohexanone were subjected to dispersion treatment for 3 hours in a sand mill using glass beads having a diameter of 1.0 mm to prepare a dispersion liquid. Then, 500 parts of ethyl acetate was added to the dispersion liquid to prepare a coating liquid for charge generating layers. The coating liquid for charge generating layers was applied onto the undercoat layer by dipping to form a wet coating. The resulting wet coating was dried at 80° C. for 10 minutes to form a charge generating layer having a thickness of 0.20 μm.

Charge Generating Layer Containing Charge Generation Material CGM-2

Twenty parts of a bisazo pigment serving as a charge generation material CGM-2 and represented by formula below, 5 parts of polyvinyl butyral resin (trade name: S-LEC BX-1, manufactured by SEKISUI CHEMICAL Co., Ltd.), and 85 parts of cyclohexanone were subjected to dispersion treatment for 12 hours in a sand mill using glass beads having a diameter of 1.0 mm to prepare a dispersion liquid. Then, 150 parts of tetrahydrofuran was added to the dispersion liquid to prepare a coating liquid for charge generating layers. The coating liquid was applied onto the undercoat layer by spraying. The resulting wet coating was dried at 80° C. for 15 minutes to form a charge generating layer having a thickness of 0.15 μm.

Charge Generating Layer Containing Charge Generation Material CGM-4

Twelve parts of a bisazo pigment serving as a charge generation material CGM-4 and represented by formula below,

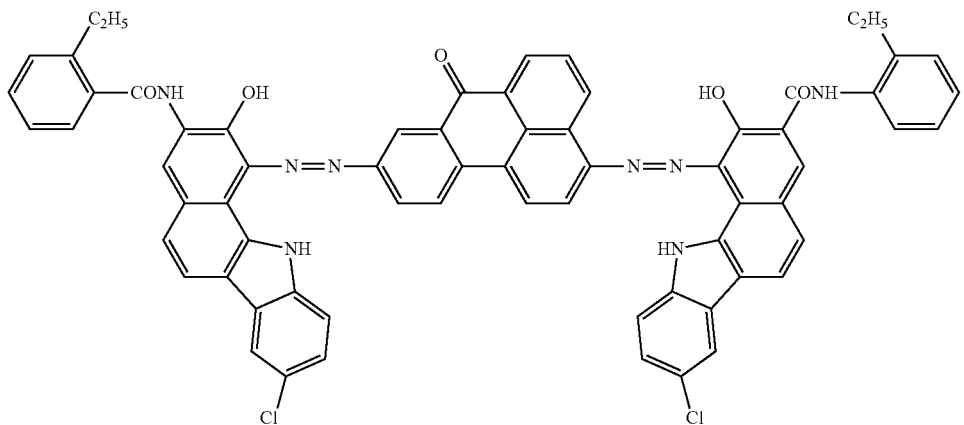

10 parts of polyvinyl butyral resin (trade name: S-LEC BX-1, manufactured by SEKISUI CHEMICAL Co., Ltd.), and 150 parts of tetrahydrofuran were subjected to dispersion treatment for 3 hours in a sand mill using glass beads having a diameter of 1.0 mm to prepare a coating liquid for charge generating layers. The coating liquid was applied onto the undercoat layer by dipping. The resulting wet coating was dried at 110° C. for 30 minutes to form a charge generating layer having a thickness of 0.30 μm.

Charge Generating Layer Containing Charge Generation Material CGM-3

Ten parts of a bisazo pigment serving as a charge generation material CGM-3 and represented by formula below,

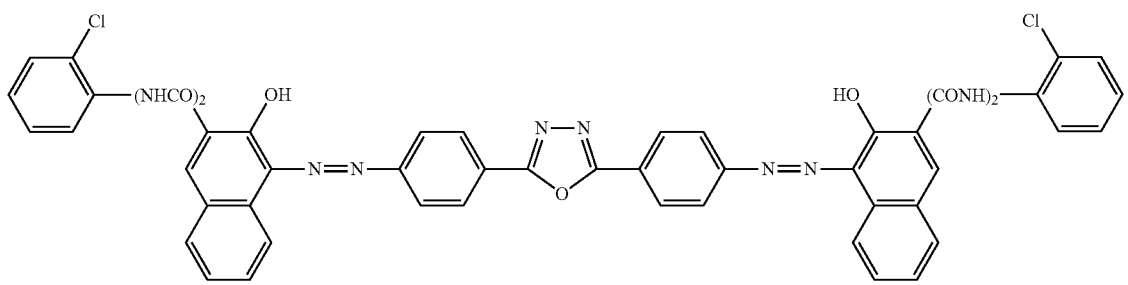

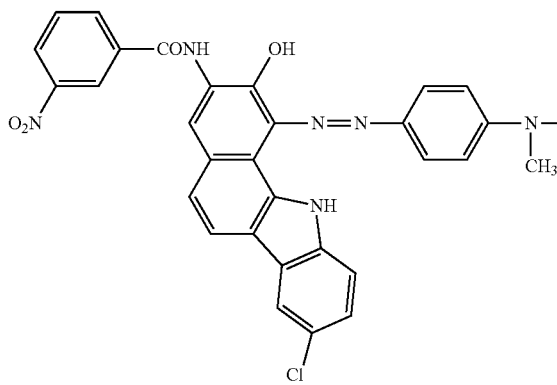
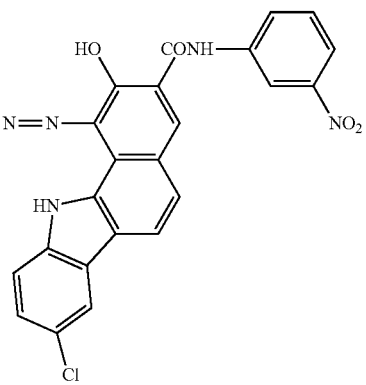

8 parts of polyvinyl benzal (benzal formation rate: 80%, weight-average molecular weight: 11000), and 320 parts of cyclohexanone were subjected to dispersion treatment for 24 hours in a sand mill using glass beads having a diameter of 1.0 mm to prepare a dispersion liquid. Then, 460 parts of methyl ethyl ketone was added to the dispersion liquid to prepare a coating liquid for charge generating layers. The coating liquid was applied onto the undercoat layer by dipping. The resulting wet coating was dried at 110° C. for 30 minutes to form a charge generating layer having a thickness of 0.20 μm.

Charge Generating Layer Containing Charge Generation Material CGM-2 and Gallium Phthalocyanine Crystal Ga-7

One part of a bisazo pigment serving as a charge generation material CGM-2 and represented by formula below, and layer by dipping. The resulting wet coating was dried at 100° C. for 10 minutes to form a charge generating layer having a thickness of 0.17 μm.

Evaluation

The following evaluation was performed using the produced electrophotographic photosensitive member or coating solution for charge transporting layers. Table 9 shows the evaluation results.

A laser beam printer CP-4525 (manufactured by Hewlett Packard) was modified such that the charged potential (dark-area potential) and exposure light amount of the electrophotographic photosensitive member could be adjusted, and was used as a test apparatus.

The produced electrophotographic photosensitive member was installed in a process cartridge (cyan) of the test

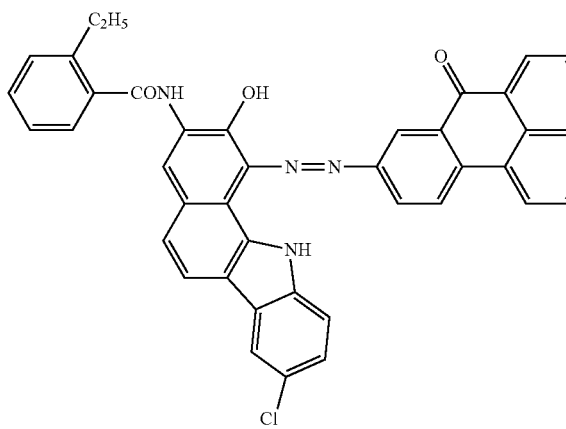
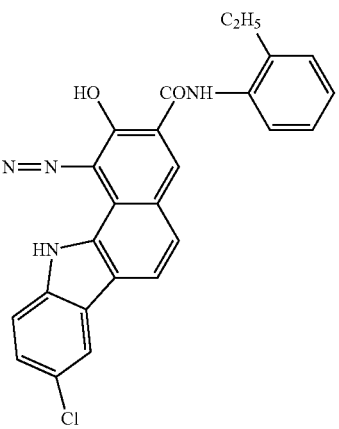

60 parts of cyclohexanone were subjected to dispersion treatment for 64 hours in a sand mill using glass beads having a diameter of 1.0 mm.

Subsequently, 100 parts of a cyclohexanone solution containing 5 mass % of polyvinyl butyral resin (trade name: S-LEC BX-1, manufactured by SEKISUI CHEMICAL Co., Ltd.) and 9 parts of the gallium phthalocyanine crystal Ga-7 were added to the dispersion liquid. The resulting mixture was subjected to dispersion treatment for 2 hours in a sand mill using glass beads having a diameter of 1.0 mm to prepare a dispersion liquid. To the dispersion liquid, 1000 parts of a liquid mixture of cyclohexanone:ethyl acetate=1:2 was added to prepare a coating liquid for charge generating layers. The coating liquid was applied onto the undercoat apparatus. A test chart having a printing rate of 4% was continuously printed on 10,000 sheets of A4 plain paper in an environment of 15° C. and 10% RH. Regarding the charging conditions, the bias applied was adjusted such that the charged potential (dark-area potential) of the electrophotographic photosensitive member was −600 V. The exposure conditions were adjusted such that the exposure light amount was 0.4 μJ/cm$^2$.

The light-area potentials of the electrophotographic photosensitive member before and after the above repeated use were measured by the following method. A developing device was removed from the process cartridge of the test apparatus. The light-area potential of the electrophotographic photosensitive member was measured using a surface electrometer (model 344, manufactured by Trek) with a potential measurement probe (trade name: model 6000B-8, manufactured by Trek) placed at a position of development. The potential measurement probe was positioned at the center of the electrophotographic photosensitive member in an axial direction of the electrophotographic photosensitive member. The distance between the surface of the electrophotographic photosensitive member and the measuring surface of the potential measurement probe was set to 3 mm.

The change (difference) in the light-area potential of the electrophotographic photosensitive member before and after the repeated use was used to evaluate the effect of suppressing the potential variation of the electrophotographic photosensitive member. The effect of suppressing the potential variation during the repeated use of the electrophotographic photosensitive member increases as the change in the light-area potential decreases.

TABLE 9

Production conditions of photosensitive member

| Example No. | Conductive layer Presence or absence | Undercoat layer Type | Charge generating layer Charge generation material Type <mixing ratio> | Charge generation material/resin (mass ratio) | Charge transporting layer Polycarbonate resin Type | Viscosity- average molecular weight Mv | Weight- average molecular weight Mw |
|---|---|---|---|---|---|---|---|
| Example III-1 | Presence | UCL-1 | Ga-7 | 10/5 | Resin III-1 | 51,000 | 75,000 |
| Example III-2 | Presence | UCL-1 | Ga-5 | 10/5 | Resin III-4 | 42,000 | 64,000 |
| Example III-3 | Presence | UCL-1 | Ga-6 | 10/5 | Resin III-5 | 52,000 | 76,000 |
| Example III-4 | Presence | UCL-1 | CGM-1 | 12/10 | Resin III-3 | 72,000 | 106,000 |
| Example III-5 | Presence | UCL-1 | Ga-1 | 10/5 | Resin III-2 | 52,000 | 79,000 |
| Example III-6 | Presence | UCL-1 | Ga-7 | 10/5 | Resin III-1 | 51,000 | 75,000 |
| Example III-7 | Presence | UCL-1 | Ga-7 | 10/5 | Resin III-1 | 51,000 | 75,000 |
| Example III-8 | Presence | UCL-1 | Ga-7 | 10/5 | Resin III-1 | 51,000 | 75,000 |
| Example III-9 | Presence | UCL-1 | Ga-7 | 10/5 | Resin III-1 | 51,000 | 75,000 |
| Example III-10 | Presence | UCL-1 | Ga-7 | 10/5 | Resin III-1 | 33,000 | 40,000 |
| Example III-11 | Presence | UCL-1 | Ga-3 | 10/5 | Resin III-3 | 82,000 | 119,000 |
| Example III-12 | Presence | UCL-1 | Ga-7 | 10/5 | Resin III-1 | 51,000 | 75,000 |
| Example III-13 | Presence | UCL-2 | Ga-2 | 10/5 | Resin III-26 | 55,000 | 80,000 |
| Example III-14 | — | UCL-3 | Ga-7/CGM-2 <1/9> | 10/5 | Resin III-11 | 57,000 | 83,000 |
| Example III-15 | Presence | UCL-1 | Ga-7 | 4/5 | Resin III-1 | 51,000 | 75,000 |
| Example III-16 | Presence | UCL-1 | Ga-7 | 15/5 | Resin III-1 | 51,000 | 75,000 |
| Example III-17 | Presence | UCL-1 | Ga-4 | 10/5 | Resin III-105 | 52,000 | 77,000 |
| Example III-18 | Presence | UCL-1 | Ga-7 | 10/5 | Resin III-107 | 55,000 | 79,000 |
| Example III-19 | Presence | UCL-1 | Ga-7 | 10/5 | Resin III-109 | 53,000 | 76,000 |
| Example III-20 | Presence | UCL-1 | CGM-2 | 20/10 | Resin III-1 | 51,000 | 75,000 |
| Example III-21 | Presence | UCL-1 | CGM-3 | 10/5 | Resin III-1 | 51,000 | 75,000 |
| Example III-22 | Presence | UCL-1 | CGM-4 | 12/8 | Resin III-1 | 51,000 | 75,000 |
| Comparative Example III-1 | Presence | UCL-1 | Ga-7 | 10/5 | Resin E-1 | 58,000 | 86,000 |
| Comparative Example III-2 | Presence | UCL-1 | Ga-7 | 10/5 | Resin E-1 | 58,000 | 86,000 |
| Comparative Example III-3 | Presence | UCL-1 | CGM-2 | 20/10 | Resin E-1 | 58,000 | 86,000 |
| Comparative Example III-4 | Presence | UCL-1 | CGM-3 | 10/5 | Resin E-1 | 58,000 | 86,000 |
| Comparative Example III-5 | Presence | UCL-1 | CGM-4 | 12/8 | Resin E-1 | 58,000 | 86,000 |

| Example No. | Charge transporting layer Charge transport material Type* | Charge transport material/resin (mass ratio) | Solvent Type | Amount used (parts) | Evaluation results Effect of suppressing potential variation: change in potential (V) |
|---|---|---|---|---|---|
| Example III-1 | (102)/(201) | 0.5 | Xy/DMM | 70/20 | 13 |
| Example III-2 | (102)/(201) | 0.5 | Xy/DMM | 70/20 | 14 |
| Example III-3 | (102)/(305) | 0.5 | Xy/DMM | 70/20 | 16 |
| Example III-4 | (603) | 0.5 | Xy/DMM | 70/20 | 18 |
| Example III-5 | (102) | 0.5 | Xy/DMM | 70/20 | 16 |
| Example III-6 | (102)/(201) | 0.7 | THF | 90 | 17 |
| Example III-7 | (102)/(201) | 0.9 | Xy/DMM | 70/20 | 22 |
| Example III-8 | (102)/(201) | 0.3 | Xy/DMM | 70/20 | 18 |
| Example III-9 | (102)/(201) | 0.2 | Xy/DMM | 70/20 | 23 |
| Example III-10 | (102)/(201) | 0.5 | Xy/DMM | 70/20 | 24 |
| Example III-11 | (102)/(305) | 0.5 | THF | 90 | 21 |
| Example III-12 | (305) | 0.5 | Xy/DMM | 70/20 | 32 |
| Example III-13 | (212) | 0.5 | Xy/DMM | 70/20 | 19 |
| Example III-14 | (102)/(305) | 0.5 | Xy/DMM | 70/20 | 17 |
| Example III-15 | (102)/(201) | 0.9 | Xy/DMM | 70/20 | 20 |
| Example III-16 | (102)/(201) | 0.3 | Xy/DMM | 70/20 | 21 |

TABLE 9-continued

| Production conditions of photosensitive member | | | | | |
|---|---|---|---|---|---|
| Example III-17 | (102)/(305) | 0.5 | THF | 90 | 21 |
| Example III-18 | (102)/(201) | 0.5 | Xy/DMM | 70/20 | 14 |
| Example III-19 | (102)/(201) | 0.5 | Xy/DMM | 70/20 | 13 |
| Example III-20 | (102)/(201) | 0.5 | Xy/DMM | 70/20 | 43 |
| Example III-21 | (102)/(201) | 0.5 | Xy/DMM | 70/20 | 41 |
| Example III-22 | (102)/(201) | 0.5 | Xy/DMM | 70/20 | 45 |
| Comparative Example III-1 | (102)/(201) | 0.5 | Xy/DMM | 70/20 | 53 |
| Comparative Example III-2 | (102)/(201) | 0.9 | Xy/DMM | 70/20 | 56 |
| Comparative Example III-3 | (102)/(201) | 0.5 | Xy/DMM | 70/20 | 58 |
| Comparative Example III-4 | (102)/(201) | 0.5 | Xy/DMM | 70/20 | 60 |
| Comparative Example III-5 | (102)/(201) | 0.5 | Xy/DMM | 70/20 | 59 |

*In the case of a mixture, the mass ratio is 9/1.

Example Corresponding to Fourth Embodiment

Production of Electrophotographic Photosensitive Member

Example IV-1

A solution containing 60 parts of barium sulfate particles coated with tin oxide (trade name: Passtran PC1, manufactured by MITSUI MINING & SMELTING Co., Ltd.), 15 parts of titanium oxide particles (trade name: TITANIX JR, manufactured by TAYCA Corporation), 43 parts of resole phenolic resin (trade name: Phenolite J-325, manufactured by DIC Corporation, solid content: 70 mass %), 0.015 parts of silicone oil (trade name: SH28PA, manufactured by Dow Corning Toray Co., Ltd.), 3.6 parts of silicone resin (trade name: Tospearl 120, manufactured by Toshiba Silicone Co., Ltd.), 50 parts of 1-methoxy-2-propanol, and 50 parts of methanol was subjected to dispersion treatment using a ball mill for 20 hours to prepare a coating liquid for conductive layers.

The coating liquid for conductive layers was applied onto, by dipping, an aluminum cylinder (JIS-A3003, aluminum alloy) serving as a support and having a length of 261.5 mm and a diameter of 24 mm. The resulting wet coating was dried at 140° C. for 30 minutes to form a conductive layer having a thickness of 30 μm.

Subsequently, 10 parts of copolymer nylon resin (trade name: Amilan CM8000, manufactured by Toray Industries, Inc.) and 30 parts of methoxymethylated 6 nylon resin (trade name: Toresin EF-30T, manufactured by Teikoku Chemical Industries Co., Ltd.) were dissolved in a mixed solvent of methanol 400 parts/n-butanol 200 parts to prepare a coating solution for undercoat layers. The coating solution for undercoat layers was applied onto the conductive layer by dipping. The resulting wet coating was dried to form an undercoat layer (UCL-1) having a thickness of 0.8 μm.

Subsequently, 10 parts of oxytitanium phthalocyanine crystal having a peak at a Bragg angle 2θ of 27.2° in its CuKα X-ray diffraction pattern, 5 parts of polyvinyl butyral resin (trade name: S-LEC BX-1, manufactured by SEKISUI CHEMICAL Co., Ltd.), and 250 parts of cyclohexanone were dispersed in a sand mill using glass beads having a diameter of 1.0 mm for 6 hours. The resulting dispersion liquid was diluted by adding 250 parts of ethyl acetate to prepare a coating liquid for charge generating layers. The coating liquid for charge generating layers was applied onto the undercoat layer by dipping. The resulting wet coating was dried at 100° C. for 10 minutes to form a charge generating layer having a thickness of 0.20 μm.

Subsequently, 10 parts of Resin IV-1 serving as a polycarbonate resin and 5 parts of a compound represented by formula (602) and serving as a charge transport material were dissolved in 35 parts of tetrahydrofuran and 35 parts of toluene to prepare a coating solution for charge transporting layers. The coating solution for charge transporting layers was applied onto the charge generating layer by dipping. The resulting wet coating was dried at 120° C. for 40 minutes to form a charge transporting layer having a thickness of 20 μm. Thus, an electrophotographic photosensitive member in Example IV-1 was produced.

Other Examples and Comparative Examples

An electrophotographic photosensitive member was produced by changing the polycarbonate resin, the charge transport material, and the ratio of the content of the charge transport material to the content of the polycarbonate resin in the charge transporting layer in Example IV-1 to those listed in Table 11. Table 10 shows the structures of polycarbonate resins used in Comparative Examples.

TABLE 10

| Structural units of resins and content of each structural unit in resin | | | | |
|---|---|---|---|---|
| | Formula (4-1) or Others | | Formula (4-2) or Others | |
| Resin No. | Type | Content in resin (mol %) | Type | Content in resin (mol %) |
| Resin IV-14 | (IV-3') | 80 | (4-2-1) | 20 |
| Resin IV-15 | (IV-4') | 30 | (4-2-3) | 70 |
| Resin IV-16 | (IV-2') | 60 | (4-2-7) | 40 |
| Resin IV-17 | (IV-1') | 50 | (4-2-1) | 50 |
| Resin IV-18 | (IV-1') | 60 | (4-2-4) | 40 |
| Resin IV-19 | (4-1-3) | 30 | (IV-5') | 70 |
| Resin IV-20 | (4-1-3) | 75 | (IV-6') | 25 |

The structural units of the polycarbonate resins used in Comparative Examples are shown below.

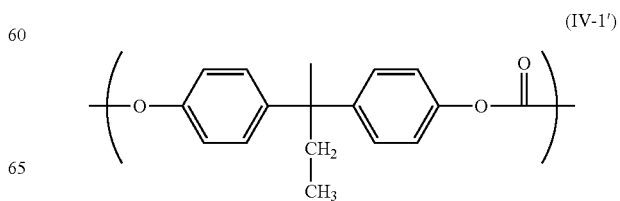

(IV-1')

-continued

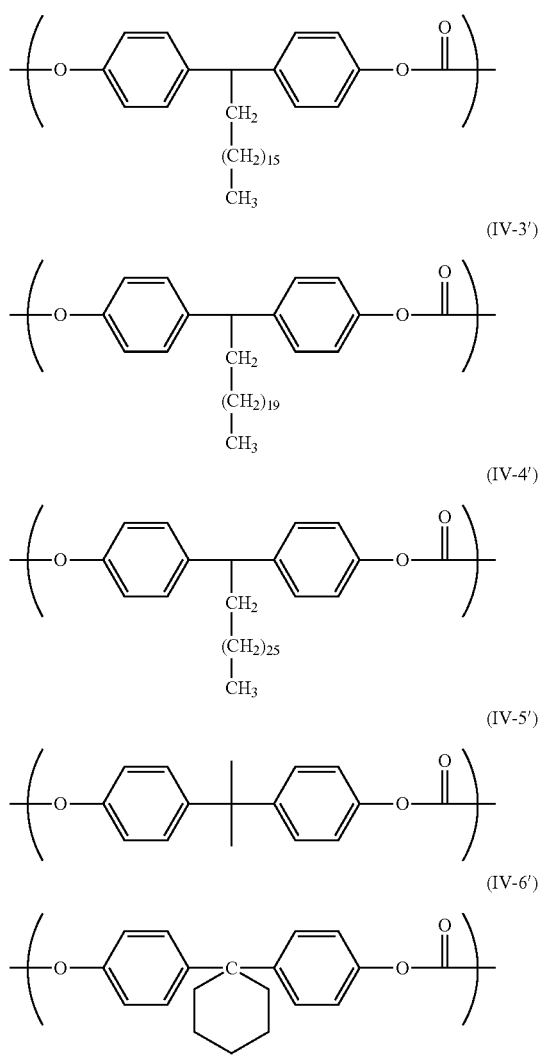

Evaluation

The following evaluations were performed using the electrophotographic photosensitive members produced above. Table 11 shows the evaluation results.

Effect of Suppressing Photomemory

A laser beam printer CP-4525 (manufactured by Hewlett Packard) was modified such that the charged potential (dark-area potential) of the electrophotographic photosensitive member could be adjusted. The charged potential (dark-area potential) was set to −600 V to obtain a test apparatus.

A part of the surface of the electrophotographic photosensitive member in the circumferential direction was shielded from light, and the resulting light-unshielded portion was irradiated with light having 2,000 lux using a white fluorescent lamp for 10 minutes. The electrophotographic photosensitive member was installed in a process cartridge (cyan) of the test apparatus. After 30 minutes from the completion of the irradiation with fluorescent light, "halftone images with a similar knight jump pattern" in FIG. 2 were output on A4 plain paper in an environment of 23° C. and 50% RH. Regions corresponding to the light-shielded portion (non-irradiated portion) and the light-unshielded portion (irradiated portion) on the halftone images were observed through visual inspection, and the effect of suppressing photomemory was evaluated from the difference in density. The evaluation criteria are as follows. In the following criteria, A to C are favorable levels, and D and E are unacceptable levels.

A: The difference in density was not observed.
B: The difference in density was slightly observed.
C: The difference in density was observed, but was not problematic in practical use.
D: The difference in density was observed, but the boundary between the regions was not clear.
E: The difference in density was clearly observed, and the boundary between the regions was partly clear.

Wear Resistance

A laser beam printer LBP-5050 manufactured by CANON KABUSHIKI KAISHA was used as a test apparatus. The evaluation was performed in an environment of 23° C. and 50% RH. The exposure (image exposure) of a 780 nm laser light source in the test apparatus was set to 0.3 $\mu J/cm^2$ on the surface of the electrophotographic photosensitive member. The surface potentials (dark-area potential and light-area potential) of the electrophotographic photosensitive member were measured at a position of a developing device, which was exchanged to a jig fixed such that a potential measurement probe was located at a position 130 mm from the end of the electrophotographic photosensitive member. The dark-area potential of a non-exposed portion of the electrophotographic photosensitive member was set to −450 V.

An image was continuously printed on 10,000 sheets of A4 plain paper. The "wear loss" was determined from the difference in thickness between the photosensitive members before and after the repeated image output. The thickness was measured with a thickness gauge (Fischer MMS eddy-current probe EAW 3.3, manufactured by Fischer Instruments K.K.).

TABLE 11

| | Polycarbonate resin | | | Structural unit | | Evaluation results | |
|---|---|---|---|---|---|---|---|
| | | Viscosity-average molecular weight Mv | Charge transport material Type* | Charge transport material/resin (mass ratio) | (4-1)/charge transport material (molar ratio) | Effect of suppressing photomemory | Wear resistance: wear loss (μm) |
| Example No. | Type | | | | | | |
| Example IV-1 | Resin IV-1 | 56,000 | (602) | 5/10 | 1.26 | A | 1.0 |
| Example IV-2 | Resin IV-2 | 55,000 | (602) | 6/10 | 1.60 | A | 1.2 |
| Example IV-3 | Resin IV-3 | 56,000 | (602) | 3/10 | 1.47 | A | 0.9 |
| Example IV-4 | Resin IV-4 | 50,000 | (602) | 5/10 | 1.67 | B | 1.0 |
| Example IV-5 | Resin IV-5 | 60,000 | (602) | 5/10 | 1.87 | A | 1.5 |
| Example IV-6 | Resin IV-6 | 54,000 | (602) | 3/10 | 2.96 | A | 1.4 |

TABLE 11-continued

| | Polycarbonate resin | | | | Structural unit | Evaluation results | |
| | | Viscosity- | | | | | |
| Example No. | Type | average molecular weight Mv | Charge transport material Type* | Charge transport material/resin (mass ratio) | (4-1)/charge transport material (molar ratio) | Effect of suppressing photomemory | Wear resistance: wear loss (μm) |
|---|---|---|---|---|---|---|---|
| Example IV-7 | Resin IV-7 | 54,000 | (602) | 5/10 | 1.64 | B | 1.3 |
| Example IV-8 | Resin IV-8 | 52,000 | (602) | 5/10 | 0.83 | B | 1.0 |
| Example IV-9 | Resin IV-1 | 56,000 | (602) | 9/10 | 0.70 | A | 2.0 |
| Example IV-10 | Resin IV-3 | 56,000 | (602) | 2/10 | 2.21 | B | 0.9 |
| Example IV-11 | Resin IV-9 | 49,000 | (602) | 4/10 | 2.77 | A | 1.8 |
| Example IV-12 | Resin IV-10 | 50,000 | (304) | 6/10 | 0.31 | B | 1.0 |
| Example IV-13 | Resin IV-11 | 45,000 | (304) | 12/10 | 0.18 | A | 1.9 |
| Example IV-14 | Resin IV-12 | 52,000 | (605) | 3/10 | 7.28 | C | 1.7 |
| Example IV-15 | Resin IV-2 | 55,000 | (102)/(201) | 5/10 | 1.39 | A | 1.1 |
| Example IV-16 | Resin IV-1 | 56,000 | (302) | 6/10 | 0.81 | B | 1.1 |
| Comparative Example IV-1 | Resin IV-13 | 53,000 | (602) | 6/10 | 1.61 | D | 2.5 |
| Comparative Example IV-2 | Resin IV-14 | 50,000 | (602) | 5/10 | 1.01 | E | 1.1 |
| Comparative Example IV-3 | Resin IV-15 | 45,000 | (602) | 4/10 | 2.15 | D | 1.9 |
| Comparative Example IV-4 | Resin IV-16 | 56,000 | (602) | 6/10 | 1.87 | E | 2.0 |
| Comparative Example IV-5 | Resin IV-17 | 60,000 | (602) | 5/10 | 2.47 | D | 1.8 |
| Comparative Example IV-6 | Resin IV-18 | 50,000 | (602) | 6/10 | 0.92 | A | 3.4 |
| Comparative Example IV-7 | Resin IV-19 | 51,000 | (602) | 4/10 | 2.86 | A | 3.2 |

*In the case of a mixture, the mass ratio is 9/1.

The present disclosure provides an electrophotographic photosensitive member that has high durability and exhibits sufficient performance. The present disclosure also provides a process cartridge and an electrophotographic apparatus that include the electrophotographic photosensitive member.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-151194 filed Aug. 1, 2016, which is hereby incorporated by reference herein in its entirety.

What is claimed is:

1. An electrophotographic photosensitive member comprising, in a following order:
   a support;
   a charge generating layer containing a charge generation material; and
   a charge transporting layer containing a charge transport material and serving as a surface layer,
   wherein the charge transporting layer contains:
      a polycarbonate resin (i) having a structural unit represented by formula (1-1), a structural unit represented by formula (1-2), and a structural unit represented by formula (1-3),
      when numbers of repetitions of the structural unit represented by the formula (1-1) and the structural unit represented by the formula (1-2) in the polycarbonate resin (i) are respectively a and b, a/b is 0.25 to 4.00,

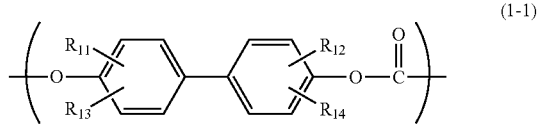

in the formula (1-1), $R^{11}$ to $R^{14}$ each independently represent a hydrogen atom, an alkyl group, an aryl group, or an alkoxy group,

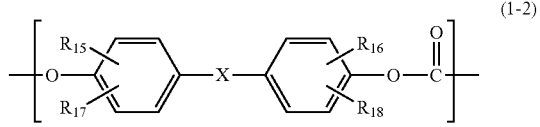

in the formula (1-2), $R^{15}$ to $R^{18}$ each independently represent a hydrogen atom, an alkyl group, an aryl group, or an alkoxy group, and X represents an oxygen atom, a sulfur atom, or a sulfonyl group,

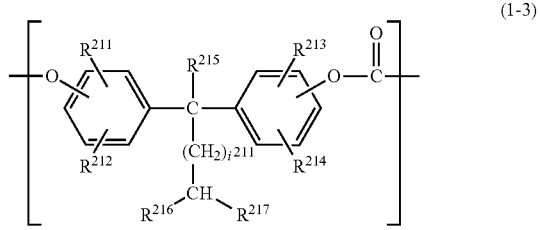

in the formula (1-3), $R^{211}$ to $R^{214}$ each independently represent a hydrogen atom, an alkyl group, an aryl group, or an alkoxy group; $R^{215}$ represents a hydrogen atom, an alkyl group, an aryl group, or an alkoxy group; $R^{216}$ and $R^{217}$ each independently represent an alkyl group having 1 to 9 carbon atoms; and $i^{211}$ represents an integer of 0 to 3.

2. The electrophotographic photosensitive member according to claim 1,
wherein
when numbers of repetitions of the structural unit represented by the formula (1-3) in the polycarbonate resin (i) is c, c/(a+b+c) is 0.40 to 0.80.

3. The electrophotographic photosensitive member according to claim 1,
wherein
a content on a mass basis of the charge transport material in the charge transporting layer is 0.5 times or more and 0.9 times or less a content on a mass basis of the polycarbonate resin (i).

4. The electrophotographic photosensitive member according to claim 1, wherein the charge transport material is a triarylamine compound.

5. The electrophotographic photosensitive member according to claim 1, wherein the charge transporting layer contains a resin having a siloxane structure.

6. A process cartridge detachably attachable to a main body of an electrophotographic apparatus, the process cartridge comprising:
an electrophotographic photosensitive member; and
at least one device selected from the group consisting of a charging device, a developing device, and a cleaning device,
wherein the process cartridge integrally supports the electrophotographic photosensitive member and the at least one device,
the electrophotographic photosensitive member includes a support, a charge generating layer containing a charge generation material, and a charge transporting layer containing a charge transport material in this order, the charge transporting layer serving as a surface layer, and
the charge transporting layer contains:
a polycarbonate resin (i) having a structural unit represented by formula (1-1), a structural unit represented by formula (1-2), and a structural unit represented by formula (1-3),
when numbers of repetitions of the structural unit represented by the formula (1-1) and the structural unit represented by the formula (1-2) in the polycarbonate resin (i) are respectively a and b, a/b is 0.25 to 4.00,

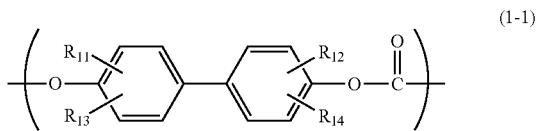

in the formula (1-1), $R^{11}$ to $R^{14}$ each independently represent a hydrogen atom, an alkyl group, an aryl group, or an alkoxy group,

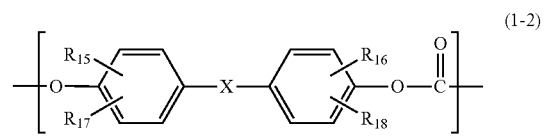

in the formula (1-2), $R^{15}$ to $R^{18}$ each independently represent a hydrogen atom, an alkyl group, an aryl group, or an alkoxy group, and X represents an oxygen atom, a sulfur atom, or a sulfonyl group,

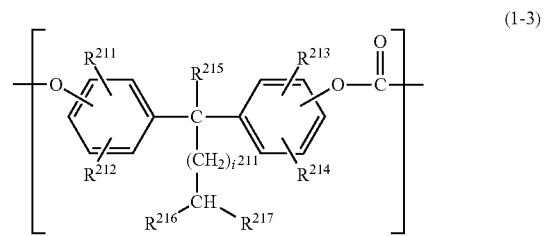

in the formula (1-3), $R^{211}$ to $R^{214}$ each independently represent a hydrogen atom, an alkyl group, an aryl group, or an alkoxy group; $R^{215}$ represents a hydrogen atom, an alkyl group, an aryl group, or an alkoxy group; $R^{216}$ and $R^{217}$ each independently represent an alkyl group having 1 to 9 carbon atoms; and $i^{211}$ represents an integer of 0 to 3.

7. An electrophotographic apparatus comprising:
an electrophotographic photosensitive member;
a charging device;
an exposure device;
a developing device; and
a transfer device,
wherein the electrophotographic photosensitive member includes a support, a charge generating layer containing a charge generation material, and a charge transporting layer containing a charge transport material in this order, the charge transporting layer serving as a surface layer, and
the charge transporting layer contains:
a polycarbonate resin (i) having a structural unit represented by formula (1-1), a structural unit represented by formula (1-2), and a structural unit represented by formula (1-3),
when numbers of repetitions of the structural unit represented by the formula (1-1) and the structural unit represented by the formula (1-2) in the polycarbonate resin (i) are respectively a and b, a/b is 0.25 to 4.00,

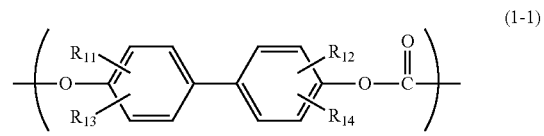

in the formula (1-1), $R^{11}$ to $R^{14}$ each independently represent a hydrogen atom, an alkyl group, an aryl group, or an alkoxy group,

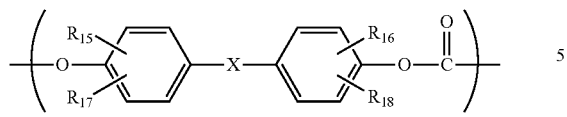

(1-2)

in the formula (1-2), $R^{15}$ to $R^{18}$ each independently represent a hydrogen atom, an alkyl group, an aryl group, or an alkoxy group, and X represents an oxygen atom, a sulfur atom, or a sulfonyl group,

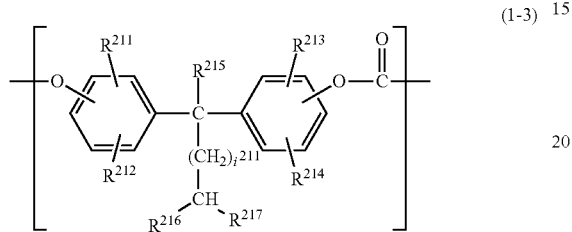

(1-3)

in the formula (1-3), $R^{211}$ to $R^{214}$ each independently represent a hydrogen atom, an alkyl group, an aryl group, or an alkoxy group; $R^{215}$ represents a hydrogen atom, an alkyl group, an aryl group, or an alkoxy group; $R^{216}$ and $R^{217}$ each independently represent an alkyl group having 1 to 9 carbon atoms; and $i^{211}$ represents an integer of 0 to 3.

* * * * *